(12) United States Patent
Brunner

(10) Patent No.: US 11,560,025 B2
(45) Date of Patent: Jan. 24, 2023

(54) PROCESS FOR TIRE DISMOUNT

(71) Applicant: Champion Tire & Wheel, Inc., Cornelius, NC (US)

(72) Inventor: Albert Brunner, Charlotte, NC (US)

(73) Assignee: Champion Tire & Wheel, Inc., Cornelius, NC (US)

( * ) Notice: Subject to any disclaimer, the term of this patent is extended or adjusted under 35 U.S.C. 154(b) by 385 days.

(21) Appl. No.: 16/757,837

(22) PCT Filed: Oct. 25, 2018

(86) PCT No.: PCT/US2018/057499
§ 371 (c)(1),
(2) Date: Apr. 21, 2020

(87) PCT Pub. No.: WO2019/089342
PCT Pub. Date: May 9, 2019

(65) Prior Publication Data
US 2021/0188023 A1    Jun. 24, 2021

Related U.S. Application Data

(60) Provisional application No. 62/746,148, filed on Oct. 16, 2018, provisional application No. 62/621,696, filed on Jan. 25, 2018, provisional application No. 62/579,109, filed on Oct. 30, 2017.

(51) Int. Cl.
*B60C 25/13* (2006.01)
*B60C 25/05* (2006.01)

(52) U.S. Cl.
CPC .......... *B60C 25/13* (2013.01); *B60C 25/0506* (2013.01)

(58) Field of Classification Search
CPC ..... B60C 25/13; B60C 25/132; B60C 25/135; B60C 25/138; B60C 25/0506
See application file for complete search history.

(56) References Cited

U.S. PATENT DOCUMENTS

| | | |
|---|---|---|
| 2,903,050 A | 9/1959 | Lewis |
| 3,818,967 A | 6/1974 | Dunn |
| 8,973,640 B1 | 3/2015 | Hanneken |
| 2018/0215212 A1* | 8/2018 | Kerwin ............... B60C 25/0515 |

FOREIGN PATENT DOCUMENTS

| | | |
|---|---|---|
| DE | 593037 C | 2/1934 |
| DE | 877413 C | 6/1953 |
| EP | 0310844 A1 | 4/1989 |
| JP | H10 86617 A | 4/1998 |

\* cited by examiner

*Primary Examiner* — David B. Thomas
(74) *Attorney, Agent, or Firm* — Edwin A. Sisson, Attorney at Law, LLC; Jeffrey J. Banyas

(57) ABSTRACT

Described herein is a method for dismounting a tire from a wheel assembly. The method may comprise inserting at least a first finger and a second finger between a top bead of a tire and a top bead seat of a wheel, pulling a portion of at least the top bead past a plane defined by the outer edge of the top bead seat, and moving the first finger in a first rotational direction away from the second finger. Also described herein is a finger for dismounting a tire from a wheel. The finger may comprise at least one roller having two opposing ends, each end connected to a corresponding end of a roller nest of the finger. Also described herein is an apparatus for removing a tire from a wheel. The apparatus may comprise a wheel alignment assembly, a tire dismount assembly, a bead lifter, and a rotation assembly.

17 Claims, 37 Drawing Sheets

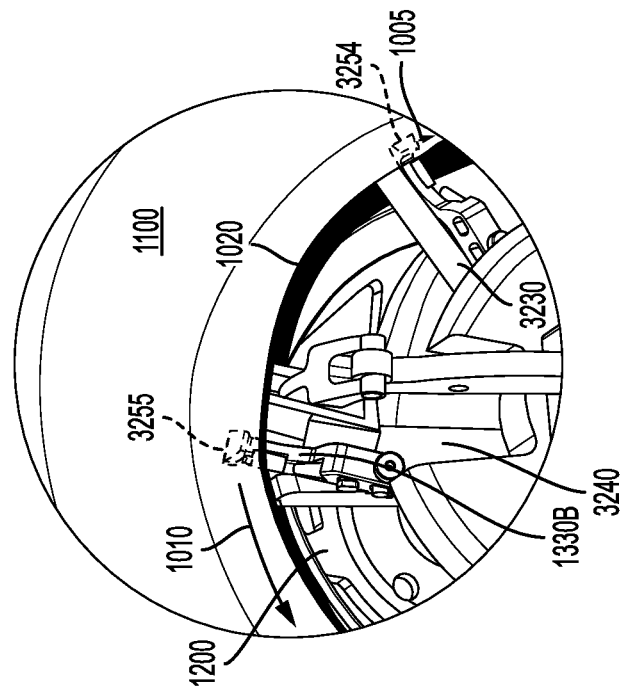
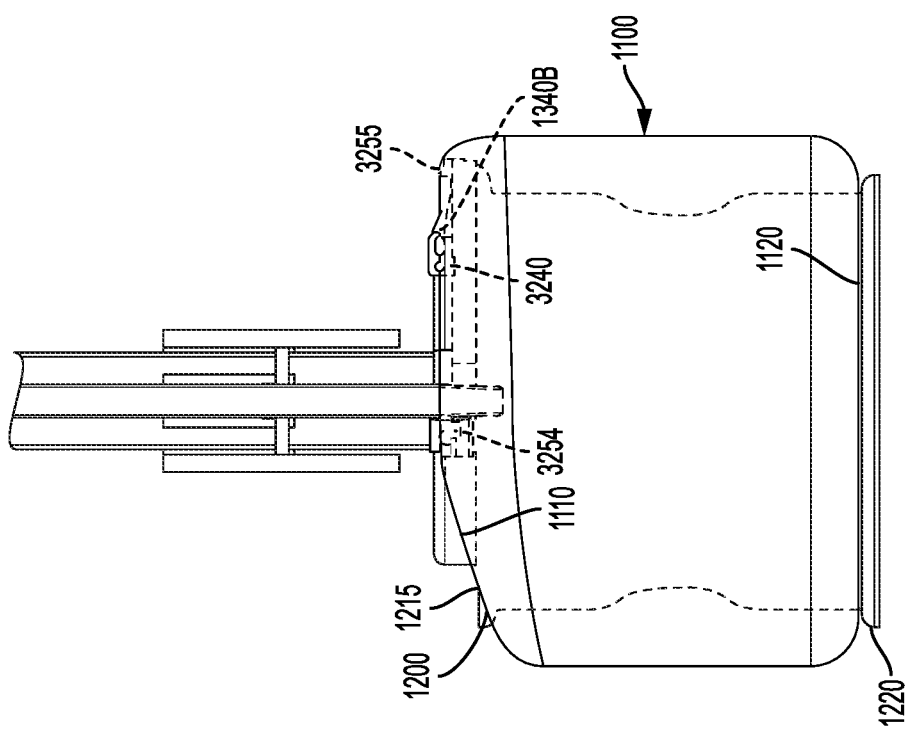
FIG. 3B
FIG. 3A

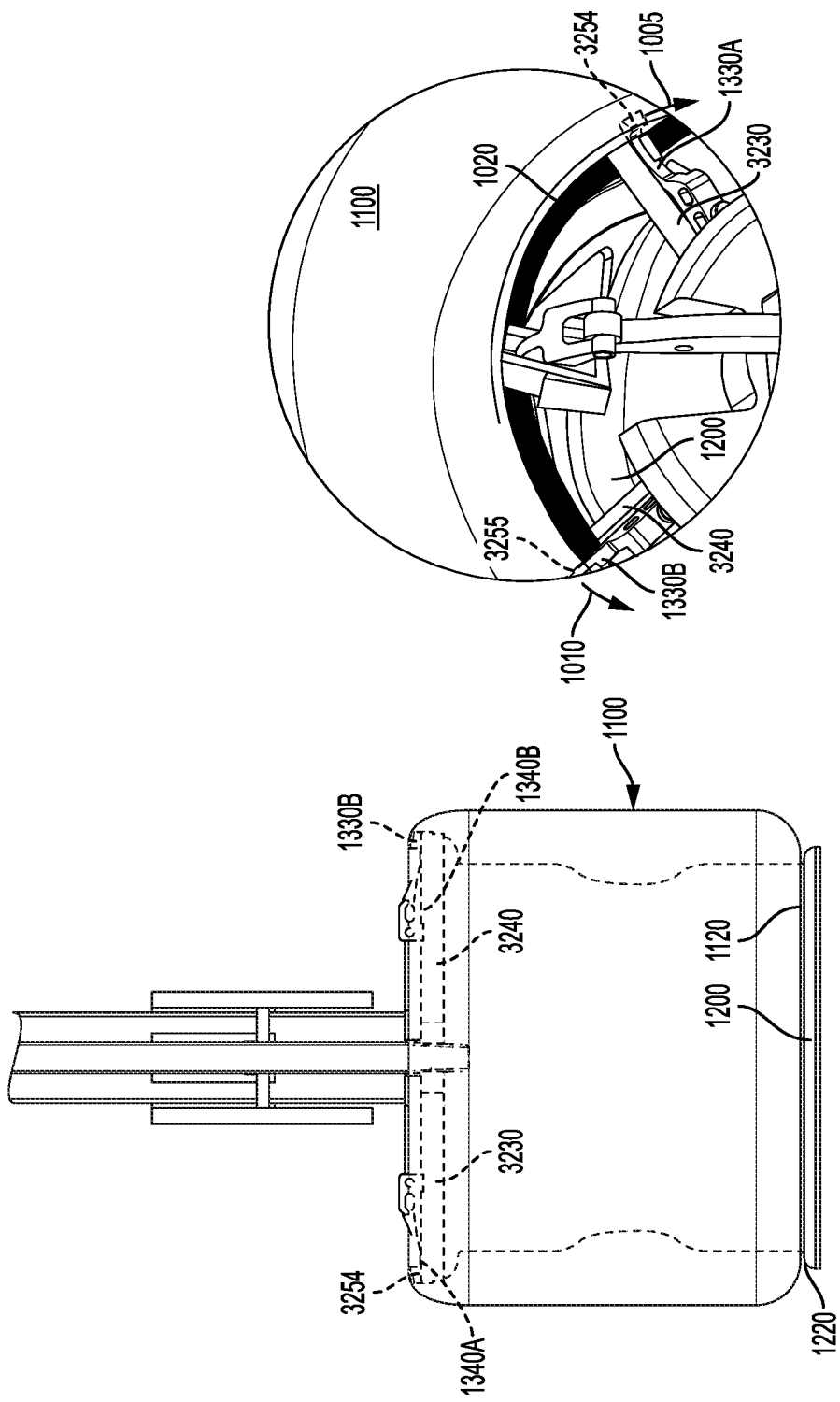

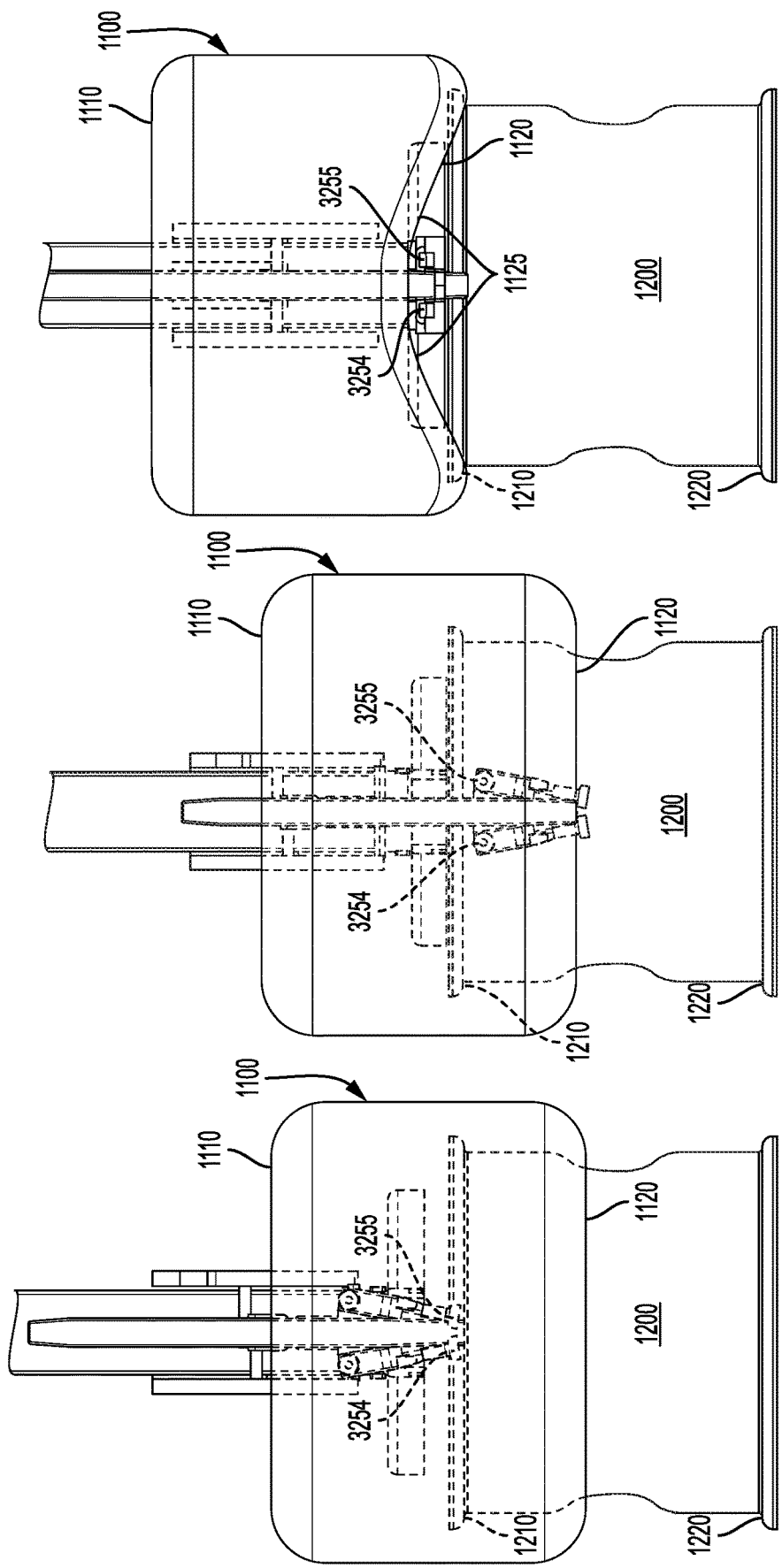

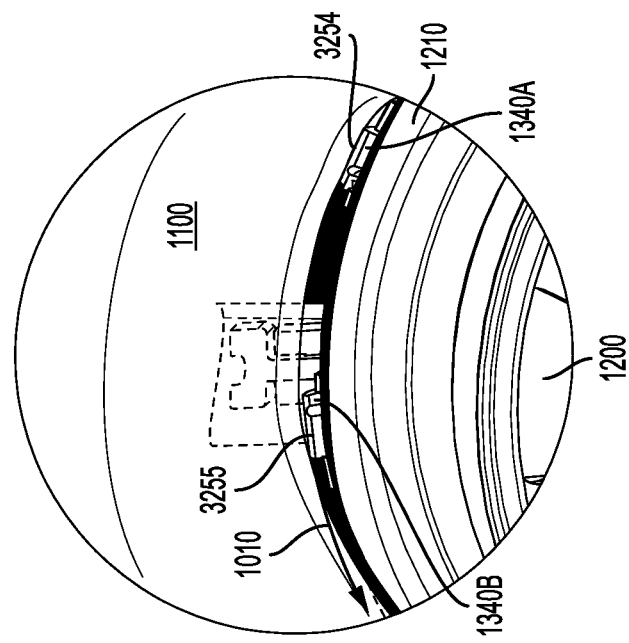
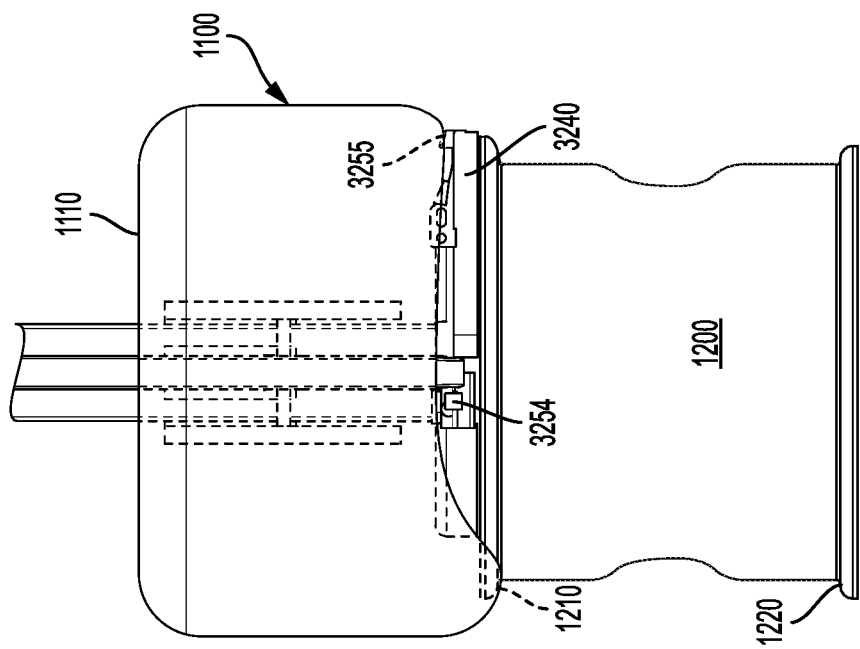
FIG. 7B
FIG. 7A

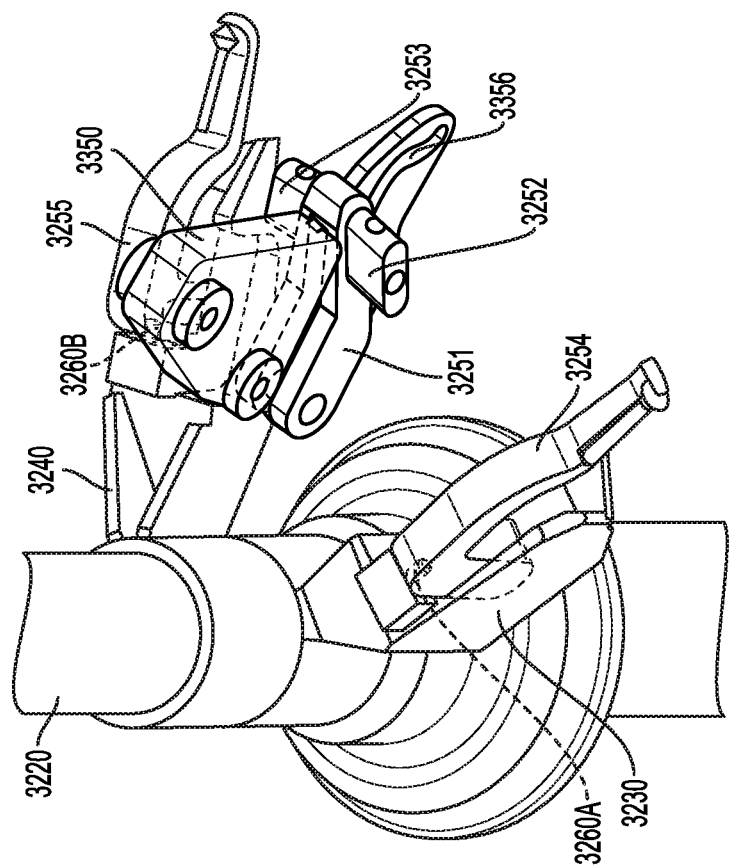
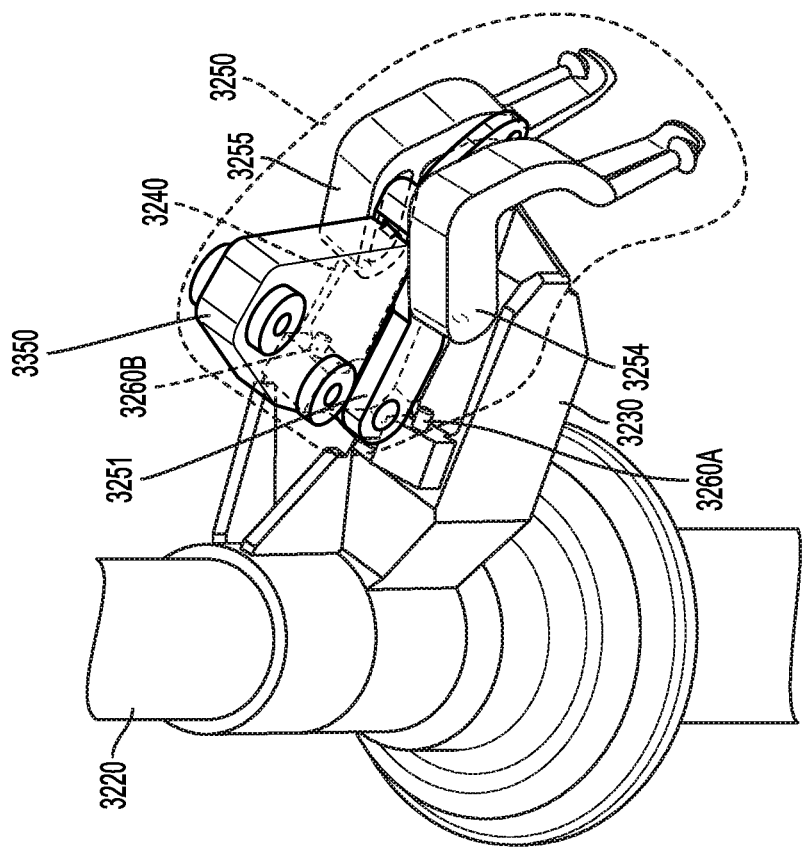
FIG. 33B
FIG. 33A

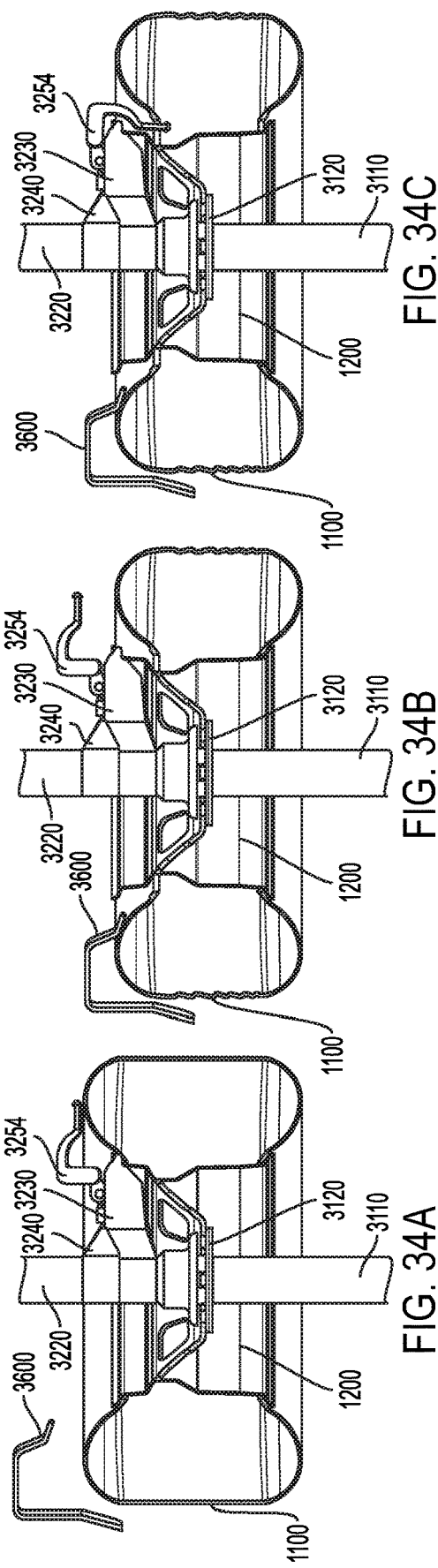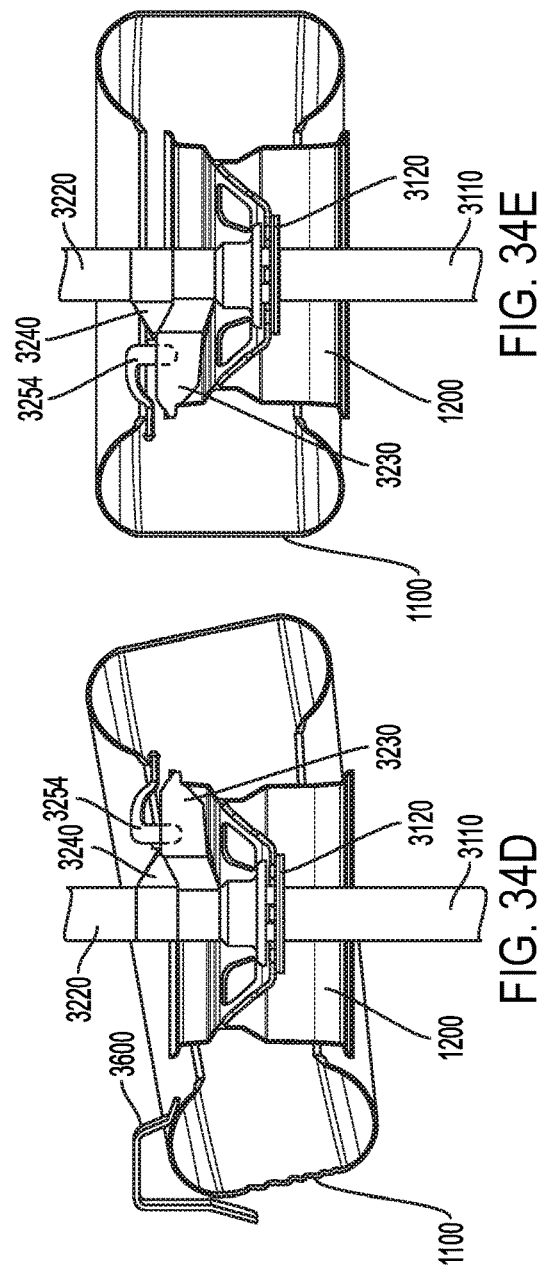

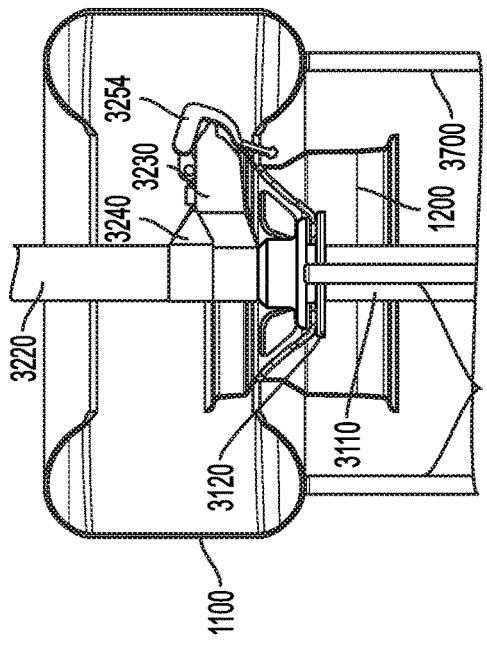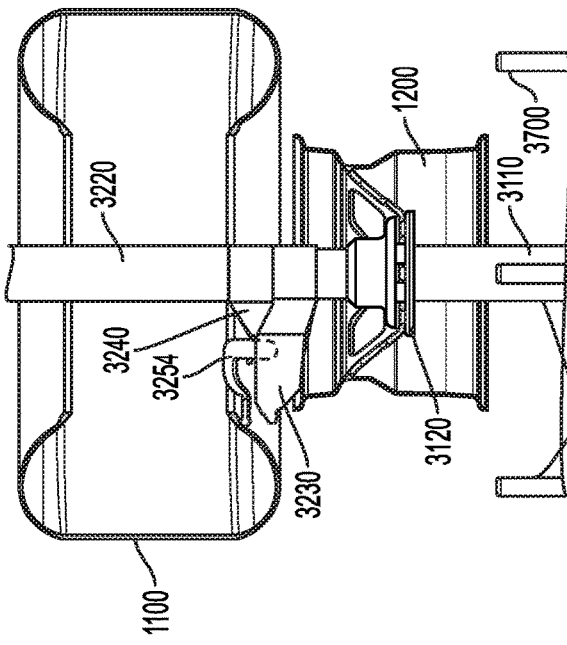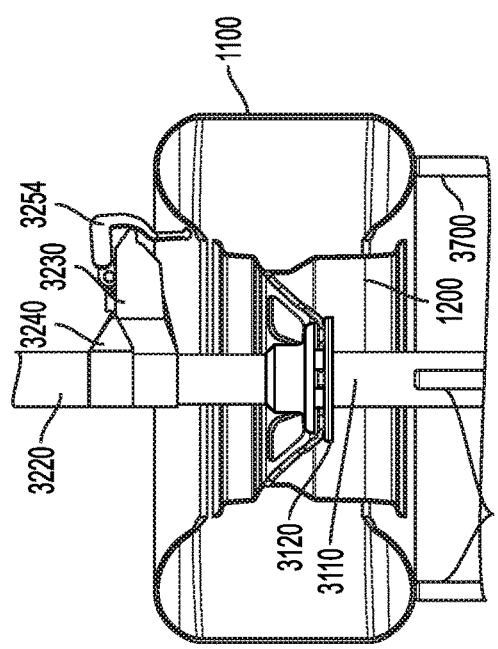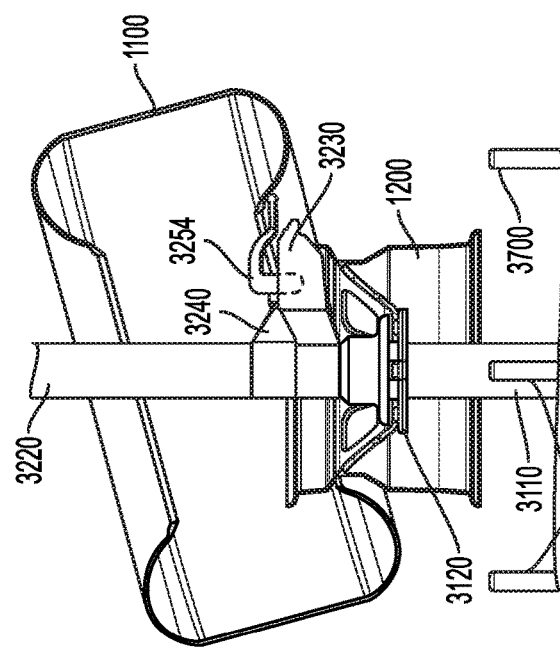

PROCESS FOR TIRE DISMOUNT

CROSS REFERENCES AND PRIORITIES

This Application claims priority from International Application No. PCT/US2018/057499 filed on 25 Oct. 2018, U.S. Provisional Application No. 62/579,109 filed on 30 Oct. 2017, U.S. Provisional Application No. 62/621,696 filed on 25 Jan. 2018, and United States Provisional Application No. 62/746,148 filed on 16 Oct. 2018, the teachings of each of which are incorporated by reference herein in their entirety.

BACKGROUND

Methods and apparatus for dismounting a tire from a wheel assembly are well known in the art. The typical process involves breaking the seals between the tire bead and the bead seat of the wheel on each side of the tire and wheel assembly. Once the seals are broken, a bar or lever is inserted into a void encompassed by the wheel assembly and the tire between the first tire bead and the first bead seat. The bar or lever is then pivoted outwardly using the edge of the wheel as a fulcrum in order to lift a portion of the first tire bead past the outer edge of the corresponding first bead seat. The remaining portion of said first tire bead is extended past the outer edge of said first bead seat by either rotating the bar or lever around the outer edge of the first bead seat while the tire and wheel assembly remains stationary, or rotating the tire and wheel assembly while leaving the bar or lever in between the outer edge of said first tire bead and said first tire bead seat.

Once the first tire bead is fully lifted past the outer edge of its corresponding bead seat, the second tire bead is advanced away from its corresponding bead seat and towards the first bead seat. The bar or lever is then inserted into a void encompassed by the wheel assembly and the tire between the second tire bead and the first bead seat. Again, the bar or lever is pivoted outwardly using the edge of the wheel as a fulcrum in order to lift a portion of the second tire bead past the outer edge of the first bead seat, and the process is repeated.

In practice, the known methods and equipment are often damaging to the wheel. The force required to lift the tire bead(s) past the bead seat using the edge of the wheel as a fulcrum can dent or bend a portion of the wheel. Additionally, the force required to rotate the bar or lever; or rotate the tire with the bar or lever in place, around the outer edge of the bead seat can cause scratching, scoring, or bending of the outer edge of the wheel. In either case, the damage can result in poor sealing between the tire bead(s) and bead seat(s) when a new tire is mounted to the wheel, which can result in dangerous air pressure leaks. The scratching, scoring and/or bending also affect the aesthetic appearance of the wheel. Often, the result is a wheel which requires repair or even replacement.

In addition, in practice the process of rotating the tire and wheel assembly around a stationary, or rotating the finger around a stationary tire and wheel assembly, in order to lift the tire bead past the outer edge of the bead seat requires a great deal of force to overcome the friction between the rubber tire bead and the metal wheel. The force required can damage the wheel, the finger, or both. In some cases, the finger can become stuck between the tire bead and the outer edge of the bead seat. In other cases, the finger can leaves scratches, gouges, or score marks on the wheel which requires expensive repair or replacement. In still other cases, the finger can fracture or break, requiring that the apparatus be shut down and the finger replaced.

The need exists, therefore, for an improved method and apparatus for dismounting a tire from a wheel assembly which reduces or eliminates damage to the wheel, as well as for an improved finger for dismounting a tire from a wheel assembly which reduces or eliminates the damage to the finger, wheel or tire.

SUMMARY

A method for dismounting a tire from a wheel assembly is disclosed. The wheel assembly may comprise a top bead seat having an outer edge and a bottom bead seat, and the tire having a top bead and a bottom bead wherein the top bead and the bottom bead may sit between the top bead seat and the bottom bead seat. The method may comprise the steps of: a. inserting at least a first finger and a second finger between the top bead and the top bead seat inside a void encompassed by the wheel assembly, the top bead and the bottom bead, b. using the first finger and the second finger to pull a portion of at least the top bead past a plane defined by the outer edge of the top bead seat, and c. moving the first finger in a first rotational direction away from the second finger without the first rotational direction crossing the plane defined by the outer edge of the top bead seat.

In some embodiments, step c of the method may further comprise moving the second finger in a second rotational direction opposite that of the first finger. In some embodiments, the total number of degrees of rotation between the first finger and the second finger in step c of the method may be in a range of between 90° and 360° in a plane parallel to the plane defined by the outer edge of the top bead seat.

In some embodiments, the first finger and the second finger may not touch the outer edge of the top bead seat during steps a, b, and c of the method.

In some embodiments, the first finger, the second finger, or both may advance the top bead away from the outer edge of the top bead seat during step c of the method.

In some embodiments, the method may further comprise the steps of: d. using the first finger and the second finger to pull a portion of at least the bottom bead past the plane defined by the outer edge of the top bead seat, and e. moving the first finger in a first rotational direction away from the second finger without the first rotational direction crossing the plane defined by the outer edge of the top bead seat.

In some embodiments, step e of the method may further comprise moving the second finger in a second rotational direction opposite that of the first finger. In some embodiments, a total number of degrees of rotation between the first finger and the second finger in step e of the method may be in a range of between 90° and 360° in a plane parallel to the plane defined by the outer edge of the top bead seat.

In some embodiments, the first finger and the second finger may not touch the outer edge of the top bead seat during steps d and e of the method.

In some embodiments, the first finger, the second finger, or both may advance the bottom bead away from the outer edge of the top bead seat during step e of the method.

In some embodiments, the method may include advancing the bottom bead away from the bottom bead seat and towards the top bead seat prior to step d of the method.

A finger useful for dismounting a tire from a wheel is also disclosed. The finger may comprise: a finger mount section having a finger mount section first end and a finger mount section second end opposite the finger mount section first end, a finger neck section having a finger neck section first end and a finger neck section second end opposite the finger neck section first end, and a finger horizontal section having a finger horizontal section first end and a finger horizontal section second end opposite the finger horizontal section first end, wherein the finger mount section second end is attached to the finger neck section first end, the finger neck section second end is attached to the finger horizontal section first end, and the finger horizontal section second end comprises a chisel point and a grab face. Said finger may also comprise at least one roller having a roller first end and a roller second end. In some embodiments the finger horizontal section comprises a first roller nest having a first roller nest first and which corresponds with the finger horizontal section first end and a first roller nest second end which corresponds with the finger horizontal section second end, the roller first end is connected with the first roller nest first end, and the roller second end is connected with the first roller nest second end.

In some embodiments of the finger, the finger horizontal section may have a top surface, the at least one roller may have an exterior surface, and the connections between the roller first end and the first roller nest first end, and the roller second end and the first roller nest second end may be such that the exterior surface of the roller extends past the top surface of the finger horizontal section.

In some embodiments of the finger, the at least one roller may be cylindrical. In some embodiments, the at least one roller may have a sloped exterior surface having a first diameter at the roller first end and a second diameter at the roller second end. In some embodiments the first diameter may be smaller than the second diameter.

In some embodiments of the finger, the at least one roller may comprise a two-piece roller which may have a first roller piece and a second roller piece. In some embodiments, the first roller piece may be cylindrical and the second roller piece may be cylindrical. In some embodiments, the first roller piece may be cylindrical and the second roller piece may have a sloped exterior surface. In some embodiments the first roller piece may have a sloped exterior surface and the second roller piece may be cylindrical. In some embodiments, the first roller piece may have a sloped exterior surface and the second roller piece may have a sloped exterior surface.

In some embodiments of the finger, the finger may comprise a first central axis running from the finger mount section first end to the finger horizontal section second end, and the at least one roller may be connected to the finger at an angle which is not parallel to the first central axis. In some embodiments, the finger may comprise a second central axis running from a top surface of the finger to a bottom surface of the finger, and the at least one roller may be connected to the finger at an angle which is not parallel to the second central axis.

In some embodiments of the finger, the connection between the roller first end and the first roller nest first end may be a pivotable connection. In some embodiments, the connection between the roller second end and first roller nest second end is a pivotable connection.

In some embodiments of the finger, the finger may further comprise a second roller which may have a second roller first end and a second roller second end while one of the finger horizontal section or the finger neck section may further comprise a second roller nest having a second roller nest first end and a second roller nest second end. In some embodiments the second roller first end may be connected with the second roller nest first end, and the second roller second end may be connected with the second roller nest second end.

In some embodiments of the finger, the finger horizontal section may have a top surface, the finger neck section may have a top surface, the second roller may have an exterior surface, and the connections between the second roller first end and the second roller nest first end, and the second roller second end and the second roller nest second end may be such that the exterior surface of the second roller extends past the top surface of the finger horizontal section or the top surface of the finger neck section.

In some embodiments of the finger, the second roller may be cylindrical. In some embodiments, the second roller may have a sloped exterior surface having a first diameter at the second roller first end and a second diameter at the second roller second end. In some embodiments the first diameter may be smaller than the second diameter.

In some embodiments of the finger, the second roller may comprise a two-piece roller which may have a second roller first piece and a second roller second piece. In some embodiments, the second roller first piece may be cylindrical and the second roller second piece may be cylindrical. In some embodiments, the second roller first piece may be cylindrical and the second roller second piece may have a sloped exterior surface. In some embodiments the second roller first piece may have a sloped exterior surface and the second roller second piece may be cylindrical. In some embodiments, the second roller first piece may have a sloped exterior surface and the second roller second piece may have a sloped exterior surface.

In some embodiments of the finger, the finger may comprise a first central axis running from the finger mount section first end to the finger horizontal section second end, and the second roller may be connected to the finger at an angle which is not parallel to the first central axis. In some embodiments, the finger may comprise a second central axis running from a top surface of the finger to a bottom surface of the finger, and the second roller may be connected to the finger at an angle which is not parallel to the second central axis.

In some embodiments of the finger, the connection between the second roller first end and the second roller nest first end may be a pivotable connection. In some embodiments, the connection between the second roller second end and second roller nest second end is a pivotable connection.

An apparatus for removing a tire from a wheel is also disclosed. The apparatus may comprise a wheel alignment assembly, a tire dismount assembly, and a rotation assembly.

The wheel alignment assembly may comprise a shaft, a base pad which may comprise a hub, and a first lock mechanism. The shaft may have a shaft first end and a shaft second end opposite the shaft first end. The base pad may be connected to the shaft at a shaft location proximate to the shaft second end. The first lock mechanism may be located at the shaft second end.

The tire dismount assembly may comprise an inner rotator shaft which may have an inner rotator shaft first end and an inner rotator shaft second end. The tire dismount assembly may also comprise an outer rotator shaft which may have an outer rotator shaft first end and an outer rotator shaft second end. The tire dismount assembly may further comprise a first sweeper arm which may be connected to the inner rotator shaft at an inner rotator shaft location proximate to the inner rotator shaft first end. The tire dismount assembly may further comprise a second sweeper arm which may be connected to the outer rotator shaft at an outer rotator shaft location proximate to the outer rotator shaft first end.

The tire dismount assembly may further comprise a finger assembly which may be connected to a bead lifter. The finger assembly may comprise a shoe wing which may comprise a first wing and a second wing. The finger assembly may further comprise a first finger which may be removably connected to the first wing. The finger assembly may further comprise a second finger which may be removably connected to the second wing. The bead lifter may be capable of applying a series of linear forces to the finger assembly.

The rotation assembly may be capable of applying a first rotational force in a first rotational direction to the inner rotator shaft. The rotation assembly may also be capable of applying a second rotational force in a second rotational direction to the outer rotator shaft. The first rotational direction may be opposite the second rotational direction.

The inner rotator shaft may comprise a second lock mechanism. The second lock mechanism may be located at the inner rotator shaft first end. The second lock mechanism may be configured to interact with the first lock mechanism.

In some embodiments, the apparatus may further comprise a frame. The frame may comprise a top, and a bottom which may be opposite of and substantially parallel to the top. The frame may also comprise a first side which may be attached to and span a distance between a first edge of the top and a first edge of the bottom. The frame may also comprise a second side which may be attached to and span a distance between a second edge of the top and a second edge of the bottom. The frame may also comprise a third side which may be attached to and span a distance between a third edge of the top and a third edge of the bottom. The frame may also comprise a fourth side which may be attached to and span a distance between the fourth edge of the top and a fourth edge of the bottom.

In some embodiments, the shaft first end may be connected to the frame at or near a first location corresponding to one of the top, the bottom, the first side, the second side, the third side, or the fourth side. In some embodiments, the rotation assembly may be connected to the frame at or near a second location corresponding to one of the top, the bottom, the first side, the second side, the third side, or the fourth side. Preferably the first location opposes the second location.

In some embodiments, the apparatus may further comprise a first bead positioner. In some embodiments, the apparatus may further comprise a second bead positioner.

In some embodiments, the shaft may comprise a first linear force applicator located at the shaft first end. The first linear force applicator may be selected from the group consisting of a hydraulic cylinder, a gas charged hydraulic cylinder, a pneumatic cylinder, a linear actuator, a machine screw linear actuator, a ball and screw linear actuator, and a roller screw linear actuator.

In some embodiments, the first lock mechanism may comprise at least one first lock mechanism tooth. In some embodiments, the second lock mechanism may comprise a radial groove within an inside diameter of the inner rotator shaft. Each first lock mechanism too may be configured to interact with the radial groove.

In some embodiments, the bead lifter may comprise a vertical actuator, a vertical cam, a vertical cam guide, a horizontal actuator, a horizontal cam, and a horizontal cam guide.

The vertical actuator may comprise a vertical piston disposed within a vertical piston chamber. The vertical cam may comprise a vertical cam first section connected parallel to or substantially parallel to the vertical actuator. The vertical cam may also comprise a vertical cam second section extending inwardly from the vertical cam first section towards the outer rotator shaft. The vertical cam guide may comprise a vertical cam guide slot. The vertical cam guide may be connected to and span a distance between the vertical piston and the vertical cam second section.

The horizontal actuator may comprise a horizontal piston disposed within a horizontal piston chamber. The horizontal piston chamber may have a horizontal piston chamber first end and a horizontal piston chamber second end. The horizontal cam may comprise a first horizontal cam slot and a second horizontal cam slot. The first horizontal cam slot may have a first horizontal cam slot first end and a first horizontal cam slot second end. The second horizontal cam slot may have a second horizontal cam slot first end and a second horizontal cam slot second end. The horizontal cam guide may be connected to the vertical piston and the horizontal actuator.

The horizontal cam may be attached to the finger assembly by a first pin and a second pin. The first pin may pass through the first horizontal cam slot. The second pin may pass through the second horizontal cam slot.

In some embodiments, the vertical actuator may be a type of actuator selected from the group consisting of a pneumatic actuator, a hydraulic actuator, a gas charged hydraulic actuator, a linear actuator, a machine screw linear actuator, a ball and screw linear actuator, and a roller screw linear actuator. In some embodiments, the horizontal actuator may be a type of actuator selected from the group consisting of a pneumatic actuator, a hydraulic actuator, a gas charged hydraulic actuator, a linear actuator, a machine screw linear actuator, a ball and screw linear actuator, and a roller screw linear actuator.

In some embodiments, the rotation assembly may comprise a second linear force applicator, a yoke, a first draw bar, a second draw bar, a first link, and a second link. The second linear force applicator may have a second linear force applicator first end and a second linear force applicator second end. The yoke may have a yoke first end, a yoke second end, and a yoke attachment point which may be located between the yoke first end and the yoke second end. The first draw bar may have a first draw bar first end and a first draw bar second end. The second draw bar may have a second draw bar first end and a second draw bar second end. The first link may have a first link first end and a first link second end. The second link may have a second link first end and a second link second end.

The second linear force applicator second end may be connected to the yoke attachment point. The yoke first end may be pivotably connected to the first draw bar first end. The yoke second end may be pivotably connected to the second draw bar first end. The first draw bar first end may be pivotably connected to the first link first end. The second draw bar first end may be pivotably connected to the second link first end. The first link second end may be pivotably connected to the inner rotator shaft second end. The second link second end may be pivotably connected to the outer rotator shaft second end.

The second liner force applicator may be selected from the group consisting of a hydraulic cylinder, a gas charged hydraulic cylinder, a pneumatic cylinder, a linear actuator, a machine screw linear actuator, a ball and screw linear actuator and a roller screw linear actuator.

In some embodiments, the rotation assembly may comprise a first electric motor and a second electric motor. The first electric motor may be connected to a first gear. The first gear may be connected to a first rotation device selected from the group consisting of a gear rack, a fiber strap, and a chain. The second electric motor may be connected to a second gear. The second gear may be connected to a second rotation device selected from the group consisting of a gear rack, a fiber strap, and a chain. The inner rotator shaft second end may comprise an inner rotator shaft gear. The inner rotator shaft gear may be connected to the first rotation device. The outer rotator shaft second end may comprise an outer rotator shaft gear. The outer rotator shaft gear may be connected to the second rotation device.

BRIEF DESCRIPTION OF FIGURES

FIG. 3A is a side view of the tire and wheel assembly of FIG. 1A with the apparatus with the first finger rotated away from the second finger.

FIG. 3B is a perspective view of the tire and wheel assembly of FIG. 1A with the apparatus with the first finger rotated away from the second finger.

FIG. 4A is a side view of the tire and wheel assembly of FIG. 1A with the apparatus with the first finger and the second finger rotated away from one another.

FIG. 4B is a perspective view of the tire and wheel assembly of FIG. 2B with the apparatus with the first finger and the second finger rotated away from one another.

FIG. 5A is a side view of the tire and wheel assembly of FIG. 1A with the apparatus with the bottom bead lifted away from the bottom bead seat and towards the top bead seat.

FIG. 5B is a side view of the tire and wheel assembly of FIG. 5A with the apparatus with the first finger and the second finger inserted between the bottom bead and the top bead seat.

FIG. 5C is a side view of the tire and wheel assembly of FIG. 5A with the apparatus with the first finger and the second finger having pulled a portion of the bottom bead past the plane defined by the outer edge of the top bead seat.

FIG. 7A is a side view of the tire and wheel assembly of FIG. 5A with the apparatus with the first finger rotated away from the second finger.

FIG. 7B is a perspective view of the tire and wheel assembly of FIG. 6A with the apparatus with the first finger rotated away from the second finger.

FIG. 33A and FIG. 33B are detailed perspective views of a finger assembly disclosed herein.

FIG. 34A to FIG. 34E are cut-away side views of an embodiment of one step of the apparatus removing a tire from a wheel.

FIG. 35A to FIG. 35D are cut-away side view of an embodiment of one step of the apparatus removing a tire from a wheel.

DETAILED DESCRIPTION

Figure 1A:
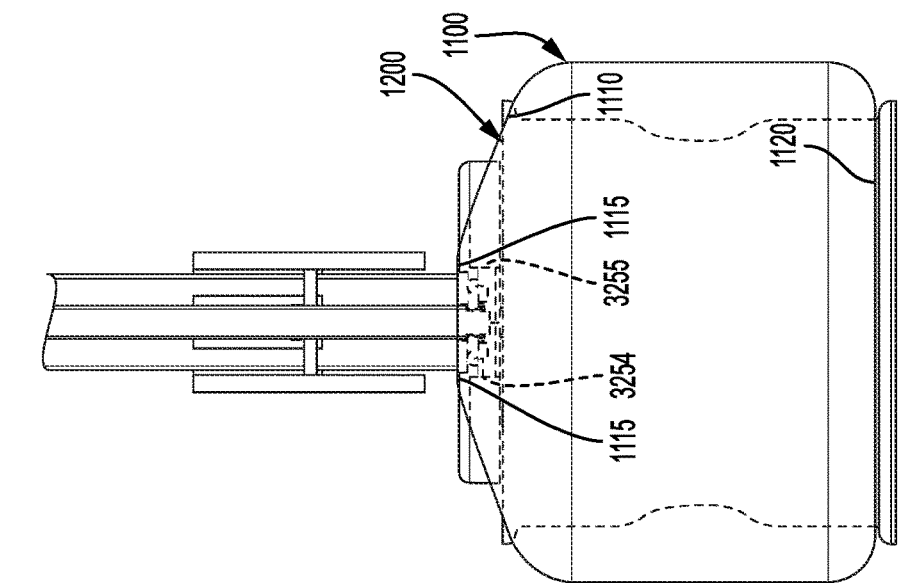
FIG. 1A is a side view of a tire and wheel assembly with an apparatus capable of dismounting a tire from a wheel assembly according to the method disclosed herein.

Disclosed herein is a method for dismounting a tire from a wheel assembly. Also disclosed herein is a finger for dismounting a tire from a wheel assembly. Also disclosed herein is an apparatus for removing a tire from a wheel. The method, finger, and apparatus are described below with reference to the Figures. As described herein and in the claims, the following numbers refer to the following structures as noted in the Figures.

1005 refers to a first rotational direction.
1010 refers to a second rotational direction.
1020 refers to a void.
1100 refers to a tire.
1110 refers to a tire top bead.
1115 refers to a tire top bead portion.
1120 refers to a tire bottom bead.
1125 refers to a tire bottom bead portion.
1200 refers to a wheel assembly.
1210 refers to a top bead seat.
1215 refers to a top bead seat outer edge.
1220 refers to a bottom bead seat.
1310A refers to a first finger first end.
1310B refers to a second finger first end.
1320A refers to a first finger second end.
1320B refers to a second finger second end.
1330A refers to a first finger top surface.
1330B refers to a second finger top surface.
1340A refers to a first finger bottom surface.
1340B refers to a second finger bottom surface.
2010 refers to a finger and roller assembly.
2100 refers to a finger.
2110 refers to a finger mount section.
2112 refers to a finger mount section first end.
2114 refers to a finger mount section second end.
2120 refers to a finger neck section.
2121 refers to a finger neck section first longitudinal edge.
2122 refers to a finger neck section first end.
2123 refers to a finger neck section second longitudinal edge.
2124 refers to a finger neck section second end.
2125 refers to a finger neck section top surface.
2127 refers to a finger neck section bottom surface.
2129 refers to a finger neck section height dimension.
2130 refers to a finger horizontal section.
2131 refers to a finger horizontal section first longitudinal edge.
2132 refers to a finger horizontal section first end.
2133 refers to a finger horizontal section second longitudinal edge.
2134 refers to a finger horizontal section second end.
2135 refers to a finger horizontal section top surface.
2136 refers to a chisel point.
2137 refers to a finger horizontal section bottom surface.
2138 refers to a grab face.
2139 refers to a finger horizontal section height dimension.
2140 refers to a first roller nest.
2142 refers to a first roller nest first end.
2144 refers to a first roller nest second end.
2150 refers to a second roller nest.
2152 refers to a second roller nest first end.
2154 refers to a second roller nest second end.
2160 refers to a finger central axis.
2170 refers to a finger second central axis.
2200 refers to a first roller.
2210 refers to a first roller first end.
2220 refers to a first roller second end.
2230 refers to a first roller sloped exterior surface.
2240 refers to a first roller exterior surface.
2250 refers to a two-piece roller first piece.
2260 refers to a two-piece roller second piece.
2270 refers to a first roller central axis.
2300 refers to a second roller.
2310 refers to a second roller first end.
2320 refers to a second roller second end.
2330 refers to a second roller sloped exterior surface.
2340 refers to a second roller exterior surface.
2350 refers to a second roller two-piece roller first piece.
2360 refers to a second roller two-piece roller second piece.
2370 refers to a second roller central axis.
3010 refers to an apparatus.
3100 refers to a wheel alignment assembly.
3110 refers to a shaft.
3112 refers to a shaft first end.
3114 refers to a shaft second end.
3116 refers to a first linear force applicator.
3120 refers to a base pad.
3130 refers to a hub.
3135 refers to a stud.
3140 refers to a first lock mechanism.
3142 refers to a first lock mechanism tooth.
3144 refers to a first lock mechanism spring.
3200 refers to a tire dismount assembly.
3210 refers to an inner rotator shaft.
3212 refers to an inner rotator shaft first end.
3214 refers to an inner rotator shaft second end.
3216 refers to a second lock mechanism.
3218 refers to a radial groove of a second lock mechanism.
3220 refers to an outer rotator shaft.
3222 refers to an outer rotator shaft first end.
3224 refers to an outer rotator shaft second end.
3230 refers to a first sweeper arm.
3240 refers to a second sweeper arm.
3250 refers to a finger assembly.
3251 refers to a shoe wing.
3252 refers to a first wing.
3253 refers to a second wing.
3254 refers to a first finger.
3255 refers to a second finger.
3260A refers to a first pin lock.
3260B refers to a second pin lock.
3300 refers to a bead lifter.
3310 refers to a vertical actuator.
3312 refers to a vertical piston.
3314 refers to a vertical piston chamber.
3320 refers to a vertical cam.
3322 refers to a vertical cam first section.
3324 refers to a vertical cam second section.
3330 refers to a vertical cam guide.
3332 refers to a vertical cam guide slot.
3334 refer to a vertical cam pin.
3340 refers to a horizontal actuator.
3342 refers to a horizontal piston.
3344 refers to a horizontal piston chamber.
3346 refers to a horizontal piston chamber first end.

3348 refers to a horizontal piston chamber second end.
3350 refers to a horizontal cam.
3352 refers to a first horizontal cam slot.
3353 refers to a first horizontal cam slot first end.
3354 refers to a first horizontal cam slot second end.
3356 refers to a second horizontal cam slot.
3357 refers to a second horizontal cam slot first end.
3358 refers to a second horizontal cam slot second end.
3360 refers to a horizontal cam guide.
3370 refers to a first pin.
3380 refers to a second pin.
3400 refers to a rotation assembly.
3410 refers to a second linear force applicator.
3412 refers to a second linear force applicator first end.
3414 refers to a second linear force applicator second end.
3420 refers to a yoke.
3422 refers to a yoke first end.
3424 refers to a yoke second end.
3426 refers to a yoke attachment point.
3430 refers to a first draw bar.
3432 refers to a first draw bar first end.
3434 refers to a first draw bar second end.
3440 refers to a second draw bar.
3442 refers to a second draw bar first end.
3444 refers to a second draw bar second end.
3450 refers to a first link.
3452 refers to a first link first end.
3454 refers to a first link second end.
3460 refers to a second link.
3462 refers to a second link first end.
3464 refers to a second link second end.
3500 refers to a frame.
3510 refers to a frame top.
3511 refers to a first edge of the frame top.
3512 refers to a second edge of the frame top.
3513 refers to a third edge of the frame top.
3514 refers to a fourth edge of the frame top.
3520 refers to a frame bottom.
3521 refers to a first edge of the frame bottom.
3522 refers to a second edge of the frame bottom.
3523 refers to a third edge of the frame bottom.
3524 refers to a fourth edge of the frame bottom.
3530 refers to a frame first side.
3540 refers to a frame second side.
3550 refers to a frame third side.
3560 refers to a frame fourth side.
3600 refers to a first bead positioner.
3700 refers to a second bead positioner.

The Method

Figure 2C:
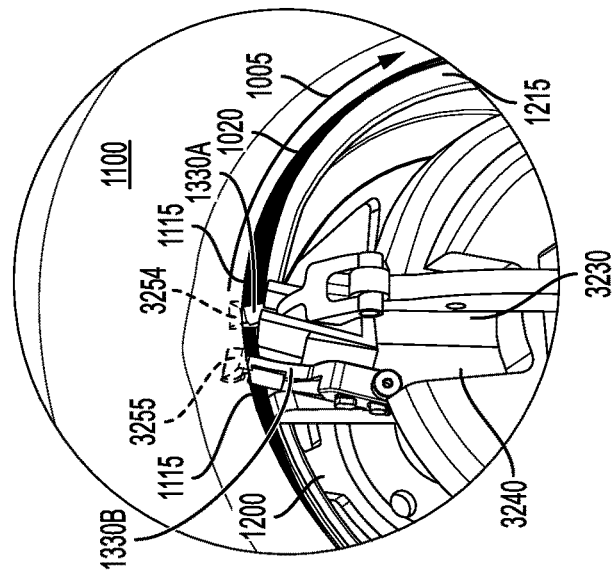
FIG. 2C is a perspective view of the tire and wheel assembly of FIG. 2A with the apparatus with a first finger and a second finger having pulled a portion of the top bead past a plane defined by the outer edge of the top bead seat.
Figure 2B:
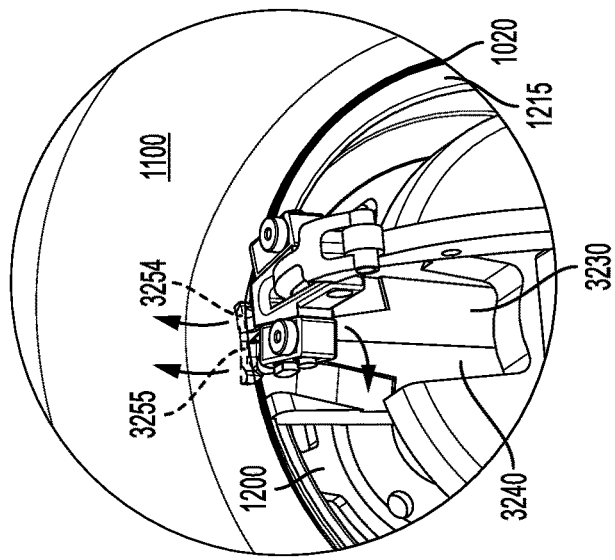
FIG. 2B is a perspective view of the tire and wheel assembly of FIG. 2A with the apparatus with a first finger and a second finger inserted between the top bead and the top bead seat.
Figure 2A:
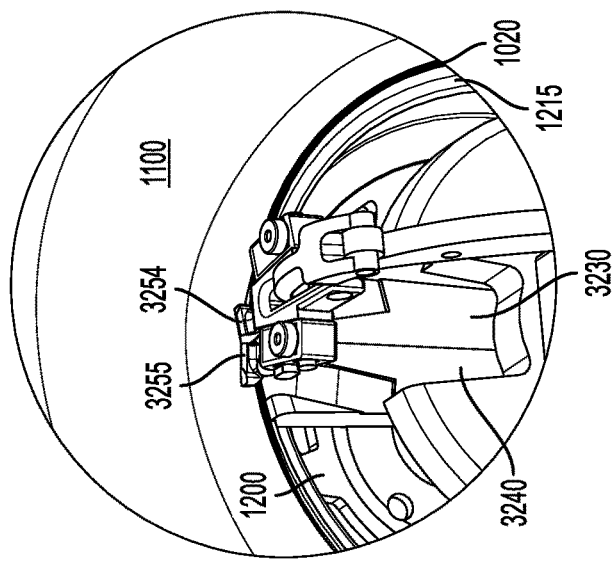
FIG. 2A is a perspective view of a tire and wheel assembly with an apparatus capable of dismounting the tire from the wheel assembly according to the method disclosed herein.

Disclosed herein, and shown in the Figures, is a method for dismounting a tire (1100) from a wheel assembly (1200). As shown in FIG. 1A and FIG. 2A, the tire comprises a top bead (1110) and a bottom bead (1120). The wheel assembly comprises a top bead seat (1210) and a bottom bead seat (1220). When the tire is mounted to the wheel assembly, the top bead (1110) forms a seal against the top bead seat (1210) while the bottom bead (1120) forms a seal against the bottom bead seat (1220). Prior to dismounting the tire from the wheel assembly, the seal between the top bead (1110) and the top bead seat (1210), and the seal between the bottom bead (1120) and the bottom bead seat (1220) are broken by any of the conventional techniques known in the art and those yet to be discovered.

As used herein and in the claims, the terms "top bead" and "bottom bead" can refer to the bead on either side of the tire while the terms "top bead seat" and "bottom bead seat" can refer to the bead seat on either side of the wheel. For instance, the "top bead" and "top bead seat" can be the tire bead and wheel bead seat which faces the exterior of the vehicle when the tire and wheel assembly is mounted to a traditional four-wheeled vehicle while the "bottom bead" and "bottom bead seat" can be the tire bead and wheel bead seat which faces the interior of the vehicle when the tire and wheel assembly is mounted to a traditional four-wheeled vehicle. Alternatively, the "bottom bead" and "bottom bead seat" can be the tire bead and wheel bead seat which faces the exterior of the vehicle when the tire and wheel assembly is mounted to a traditional four-wheeled vehicle while the "top bead" and "top bead seat" can be the tire bead and wheel bead seat which faces the interior of the vehicle when the tire and wheel assembly is mounted to a traditional four-wheeled vehicle.

Figure 1B:
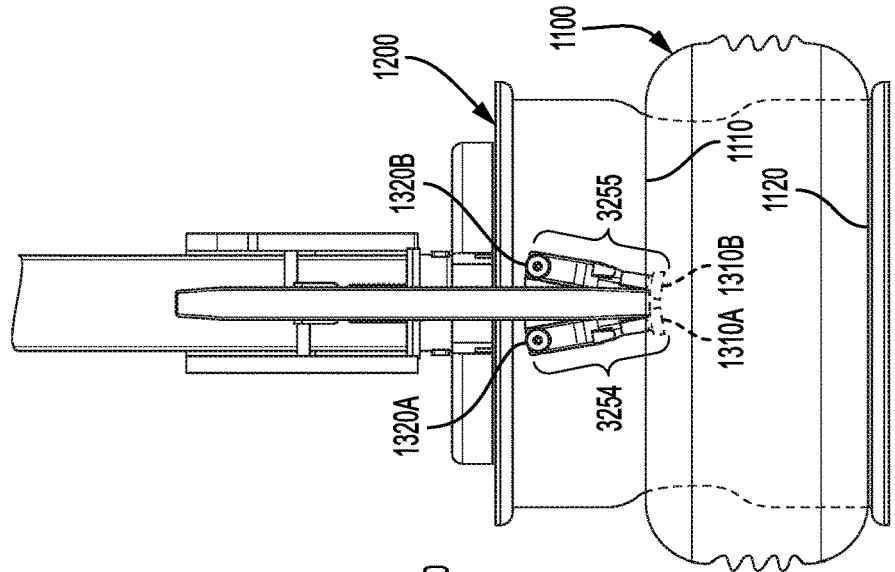
FIG. 1B is a side view of the tire and wheel assembly of FIG. 1A with the apparatus with a first finger and a second finger inserted between the top bead and the top bead seat.
Figure 1C:
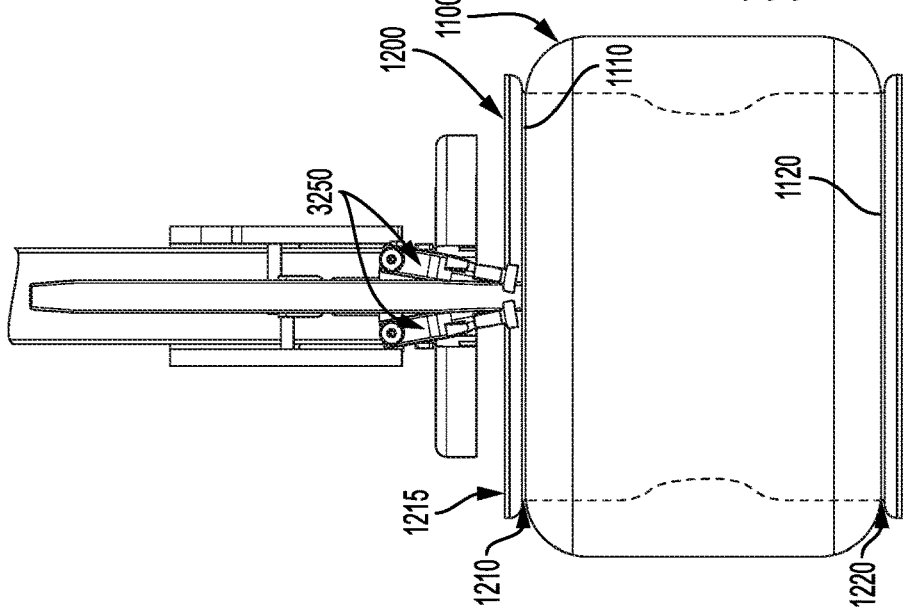
FIG. 1C is a side view of the tire and wheel assembly of FIG. 1A with the apparatus with a first finger and a second finger having pulled a portion of the top bead past a plane defined by the outer edge of the top bead seat.

In one embodiment, the method may comprise at least three steps. The first step as shown in FIG. 1B and FIG. 2B may comprise inserting at least a first finger (3254) and a second finger (3255) between the top bead (1110) and the top bead seat (1210) inside a void encompassed by the wheel assembly (1200), the top bead (1110) and the bottom bead (1120). The second step as shown in FIG. 1C and FIG. 2C may comprise using the first finger (3254) and the second finger (3255) to pull a portion (1115) of at least the top bead (1110) past a plane defined by the outer edge (1215) of the top bead seat. The third step as shown in FIG. 3A and FIG. 3B may comprise moving the first finger (3254) in a first rotational direction (1005) away from the second finger (3255) without the first rotational direction (1005) crossing the plane defined by the outer edge (1215) of the top bead seat.

In the first step as shown in FIG. 1B and FIG. 2B, the first finger (3254) and the second finger (3255) are preferably parallel or substantially parallel to one another with one edge of the first finger (3254) abutting against one edge of the second finger (3255). In this sense, the first finger (3254) and the second finger (3255) can be considered to form a finger assembly (3250) comprising the first finger (3254) and the second finger (3255) as shown in FIG. 1A and FIG. 2A.

The first finger (3254) and the second finger (3255) preferably begin the first step outside of the tire and wheel assembly as shown in FIG. 1A and FIG. 2A with a first finger first end (1310A) and a second finger first end (1310B) facing towards the tire and wheel assembly as shown in FIG. 1B. The first finger (3254) and second finger (3255) are then advanced towards the tire and wheel assembly at a point corresponding to a first position between the top bead (1110) and the top bead seat (1210) as shown in FIG. 1B. The first finger (3254) and the second finger (3255) are then advanced past the top bead (1110) and into the void (1020) encompassed by the wheel assembly, the top bead (1110) and the bottom bead (1120) as shown in FIG. 1B and FIG. 2B.

The first finger (3254) and the second finger (3255) each preferably have a top surface (1330A and 1330B) comprising a concave surface beginning at or substantially near the corresponding finger first end (1310A and 1310B) and running at least a portion of the finger length dimension towards the corresponding finger second end (1320A and 1320B). The concave surface gives each finger a "hook" shape which improves the fingers ability to grip or catch a portion (1115 and 1125) of the tire bead(s) in order to pull said portion of the tire beads as called for in the second and fourth steps. While not required, the first finger (3254), the second finger (3255) or both may also have a bottom surface (1340A and 1340B) comprising a convex surface beginning at or substantially near the corresponding finger first end (1310A and 1310B) and running at least a portion of the finger length dimension towards the corresponding finger second end (1320A and 1320B).

In the second step as shown in FIG. 1C and FIG. 2C, the first finger (3254) and the second finger (3255) are articulated in a manner such that they pull a portion (1115) of at least the top bead (1110) past a plane defined by the outer edge (1215) of the top bead seat. In general, the articulation will move the finger second ends (1320A and 1320B) from a first position extended beyond the wheel and tire assembly as shown in FIG. 1B and FIG. 2B to a second position which is closer to the wheel and tire assembly as shown in FIG. 1C and FIG. 2C. This will result in the finger first ends (1310A and 1310B) gripping or catching the portion (1115) of the top bead (1110) and extending it away from a first position between the top bead seat and the bottom bead seat as shown in FIG. 1B and FIG. 2B, and towards a second position which is past a plane defined by the outer edge (1215) of the top bead seat as shown in FIG. 1C and FIG. 2C.

Articulation of the fingers in the second step can be achieved in a variety of ways. In one embodiment, the articulation is achieved using a series of cams. In an alternative embodiment, the articulation is achieved using a series of electric motors and servos. In still another embodiment, the articulation is achieved manually by a force placed on or near the finger second ends (1320A and 1320B) by a human hand.

In the third step as shown in FIG. 3A and FIG. 3B, the first finger (3254) and the second finger (3255) are separated from one another with at least the first finger (3254) moving in a first rotational direction (1005) away from the second finger (3255) without crossing the plane defined by the outer edge of the top bead seat. This rotational movement pulls the remaining parts of the top bead (1110), which were not pulled past the plane defined by the outer edge (1215) of the top bead seat in step two, past the outer edge (1215) of the top bead seat. At the end of the third step, preferably the entire top bead (1110) is past the outer edge (1215) the top bead seat (1210) such that the top bead is dismounted from the wheel.

In one embodiment shown in FIG. 4A and FIG. 4B, the third step comprises moving the second finger (3255) in a second rotational direction (1010) opposite that of the first finger (3254) thereby reducing the distance that each finger has to travel in order to pull the entire top bead (1110) past the plane defined by the outer edge (1215) of the top bead seat (1210). The second finger (3255) can be moved in the second rotational direction (1010) either before, after or simultaneously with the first finger (3254) being moved in the first rotational direction (1005). Preferably, the second finger (3255) is moved in the second rotational direction (1010) simultaneously or substantially simultaneously with the first finger (3254) being moved in the first rotational direction (1005). Doing so reduces the amount of time required to pull the entire top bead (1110) past the plane defined by the outer edge (1215) of the top bead seat (1210).

Rotating the first finger (3254), the second finger (3255) or both in the third step can be achieved in a variety of ways. In one embodiment, the first finger (3254) is disposed into a first sweeper arm (3230 as shown in FIG. 2A to FIG. 2C). The first sweeper arm (3230) is then rotated in the first rotational direction (1005). In an alternative embodiment, the first finger (3254) is disposed into the first sweeper arm (3230) while the second finger (3255) is disposed into a second sweeper arm (3240 as shown in FIG. 2C). The first sweeper arm (3230) is then rotated in the first rotational direction (1005) with the second sweeper arm (3240) rotated in the second rotational direction (1010). In another embodiment, rotating the fingers can be accomplished using a series of electric motors and servos (not shown). In still another embodiment (not shown), rotating the fingers can be accomplished manually by applying forces to the fingers by hand in the corresponding rotational direction.

In a preferred embodiment of the third step, the first finger (3254) (and optionally the second finger (3255)) are rotated in a path parallel to or substantially parallel to the plane defined by the outer edge (1215) of the top bead seat (1210) as shown in FIG. 3A, FIG. 3B, FIG. 4A and FIG. 4B. In an alternative embodiment of the third step, the first finger (3254) (and optionally the second finger (3255)) are rotated in an inclined path away from the plane defined by the outer edge (1215) of the top bead seat (1210) resulting in a greater distance between the finger and the outer edge (1215) of the top bead seat (1210) at the end of the fingers rotation than the distance between the finger and the outer edge (1215) at the beginning of the fingers rotation. In one embodiment of the third step, both the first finger (3254) and the second finger (3255) follow a parallel or substantially parallel path. In an alternative embodiment of the third step, both the first finger (3254) and the second finger (3255) follow an inclined path. In still another embodiment of the third step, one of the first finger (3254) and the second finger (3255) follows a parallel or substantially parallel path while the other finger follows an inclined path. In one embodiment, an inclined path may be achieved by angling a tip of either the first finger and/or the second finger from a point below the plane defined by the outer edge of the top bead seat, passing through said plane towards a center section of the wheel during the rotation step. While the finger(s) is/are rotating, the top bead may advance upwardly along the length of the finger(s) towards the end opposite of the tip of the respective finger(s). In this manner, the rotation step may pull the top bead further way from the outer edge of the top bead seat.

It is preferred that both the first finger and the second finger do not cross the plane defined by the outer edge (1215) of the top bead seat during the third step. If both fingers cross the plane defined by the outer edge (1215) of the top bead seat during the third step, the entire top bead can fall back between the top bead seat (1210) and the bottom bead seat (1220) requiring that the second step be repeated.

In one embodiment, the total number of degrees of rotation between the first finger (3254) and the second finger (3255) in the third step is in the range of between 90° and 360° in a plane parallel to the plane defined by the outer edge (1215) of the top bead seat (1210). In one embodiment, the total number of degrees of rotation can be accomplished by rotating the first finger (3254) the entire total degrees of rotation, i.e. the first finger (3254) rotates between 90° and 360° while the second finger (3255) remains stationary. In a separate embodiment, the total number of degrees of rotation can be accomplished by rotating the first finger (3254) in the first rotational direction (1005) for a degrees of rotation in the range of between 1° and 359°, and rotating the second finger (3255) in the second rotational direction (1010) for a degrees of rotation in the range of between 1° and 359° with the limitation that the total degrees of rotation is in the range of between 90° and 360°.

It is preferred that the first finger (3254) and the second finger (3255) do not touch the outer edge (1215) of the top bead seat during the first three steps of the method. More preferably, the first finger (3254) and the second finger (3255) do not touch any portion of the top bead seat (1210) during the first three steps of the method. Most preferably, the first finger (3254) and the second finger (3255) do not touch any part of the wheel assembly during the first three steps of the method.

In order to prevent the first finger (3254) and the second finger (3255) from touching the wheel assembly (1200), the first finger (3254) and the second finger (3255) preferably pivot using a fulcrum that is not a part of the wheel assembly (1200). This fulcrum can be a pivot point on a series of cams about which the first finger (3254) and/or the second finger (3255) articulate. In an alternative embodiment, the fulcrum can be an attachment point between the first finger (3254) and/or the second finger (3255) and a motor and servo assembly wherein the first finger (3254) and/or the second finger articulate using the force from the motor without using any part of the wheel assembly as a fulcrum.

In one embodiment of the third step, rotating the first finger (3254) in the first rotational direction (1005), the second finger (3255) in the second rotational direction (1010), or both is done in a plane parallel or substantially parallel to the plane defined by the outer edge (1215) of the top bead seat (1210). In an alternative embodiment of the third step, rotating the first finger (3254) in the first rotational direction (1005), the second finger (3255) in the second rotational direction (1010), or both is done in a plane inclined relative to the plane defined by the outer edge (1215) of the top bead seat (1210) such that the first finger (3254), the second finger (3255), or both advance the top bead (1110) away from the outer edge (1215) of the top bead seat (1210). In some embodiments, the tire and wheel assembly may be rotated in addition to—or instead of—rotating the first finger and/or the second finger. In some embodiments, the tire and wheel assembly may be rotated in addition to—or instead of—rotating the first finger and/or the second finger.

In one embodiment, dismounting the tire (1100) from the wheel assembly (1200) comprises two additional steps. Step four as shown in FIG. 5A to FIG. 5C and FIG. 6A to FIG. 6C comprises using the first finger (3254) and the second finger (3255) to pull a portion of at least the bottom bead (1120) past the plane defined by the outer edge (1215) of the top bead seat (1210). Step five as shown in FIG. 7A and FIG. 7B comprises moving the first finger (3254) in a first rotational direction (1005) away from the second finger (3255) without the first rotational direction (1005) crossing the plane defined by the outer edge of the top bead seat (1210).

Figure 6C:
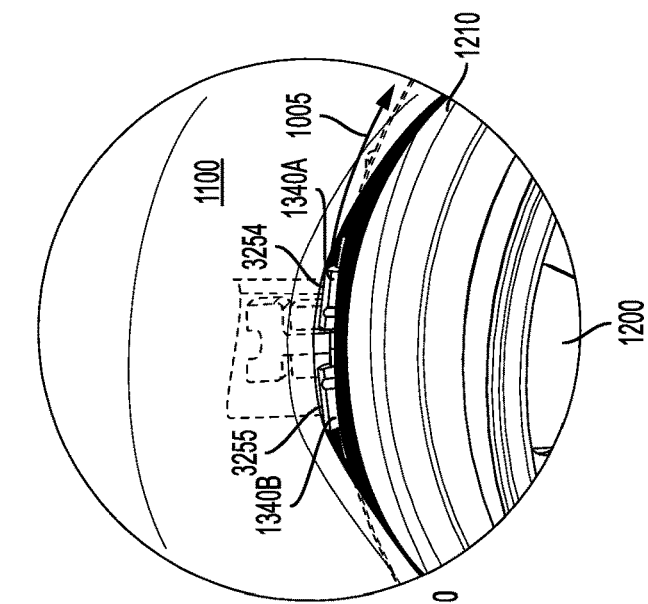
FIG. 6C is a perspective view of the tire and wheel assembly of FIG. 6A with the apparatus with the first finger and the second finger having pulled a portion of the bottom bead past the plane defined by the outer edge of the top bead seat.
Figure 6B:
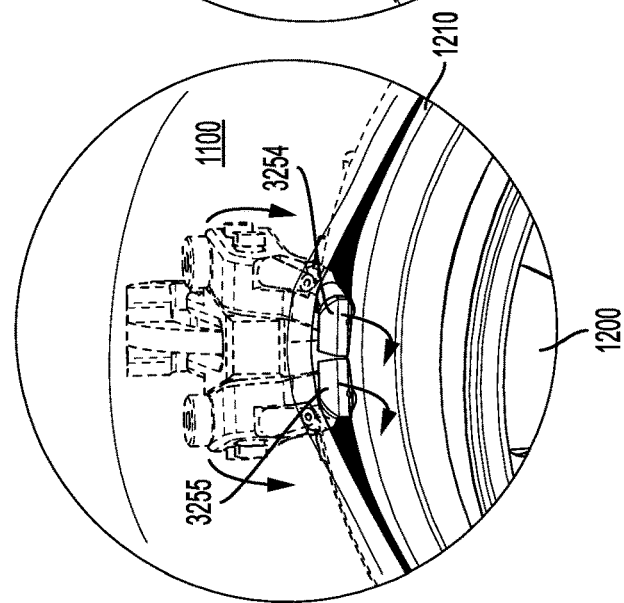
FIG. 6B is a perspective view of the tire and wheel assembly of FIG. 6A with the apparatus with the first finger and the second finger inserted between the bottom bead and the top bead seat.
Figure 6A:
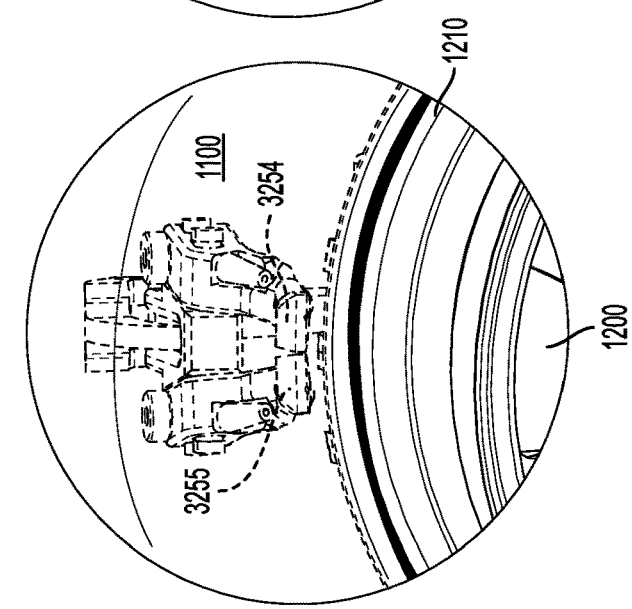
FIG. 6A is a perspective view of the tire and wheel assembly of FIG. 2A with the apparatus with the bottom bead lifted away from the bottom bead seat and towards the top bead seat.

In the fourth step as shown in FIG. 5A to FIG. 5C and FIG. 6A to FIG. 6C, the first finger (3254) and the second finger (3255) are articulated in a manner such that they pull a portion (1125) of the bottom bead (1120) past a plane defined by the outer edge (1215) of the top bead seat. In general, the articulation will move the finger second ends (1320A and 1320B) from a first position extended beyond the wheel and tire assembly as shown to a second position which is closer to the wheel and tire assembly. This will result in the finger first ends (1310A and 1310B) gripping or catching the portion (1125) of the bottom bead (1120) and extending it away from a first position between the top bead seat and the bottom bead seat as shown in FIG. 5B and FIG. 6B, and towards a second position which is past a plane defined by the outer edge (1215) of the top bead seat as shown in FIG. 5C and FIG. 6C.

Articulation of the fingers in the fourth step can be achieved in a variety of ways. In one embodiment, the articulation is achieved using a series of cams. In an alternative embodiment, the articulation is achieved using a series of electric motors and servos. In still another embodiment, the articulation is achieved manually by a force placed on or near the finger second ends (1320A and 1320B) by a human hand.

In the fifth step as shown in FIG. 7A and FIG. 7B, the first finger (3254) and the second finger (3255) are separated from one another with at least the first finger (3254) moving in a first rotational direction (1005) away from the second finger (3255) without crossing the plane defined by the outer edge of the top bead seat. This rotational movement pulls the remaining parts of the bottom bead (1120), which were not pulled past the plane defined by the outer edge (1215) of the top bead seat in step four, past the outer edge (1215) of the top bead seat. At the end of the fifth step, preferably the entire top bead (1110) and bottom bead (1120) are both past the outer edge (1215) the top bead seat (1210) such that the tire is fully dismounted from the wheel.

Figure 8B:
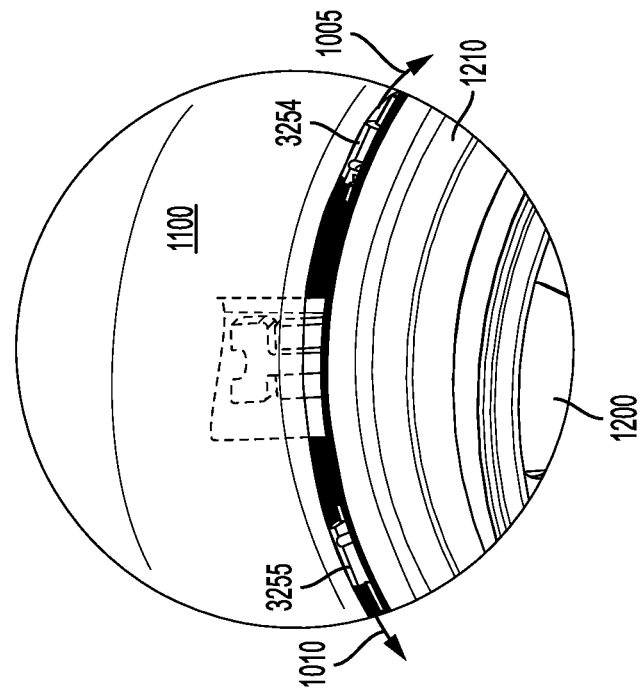
FIG. 8B is a perspective view of the tire and wheel assembly of FIG. 6A with the apparatus with the first finger and the second finger rotated away from one another.
Figure 8A:
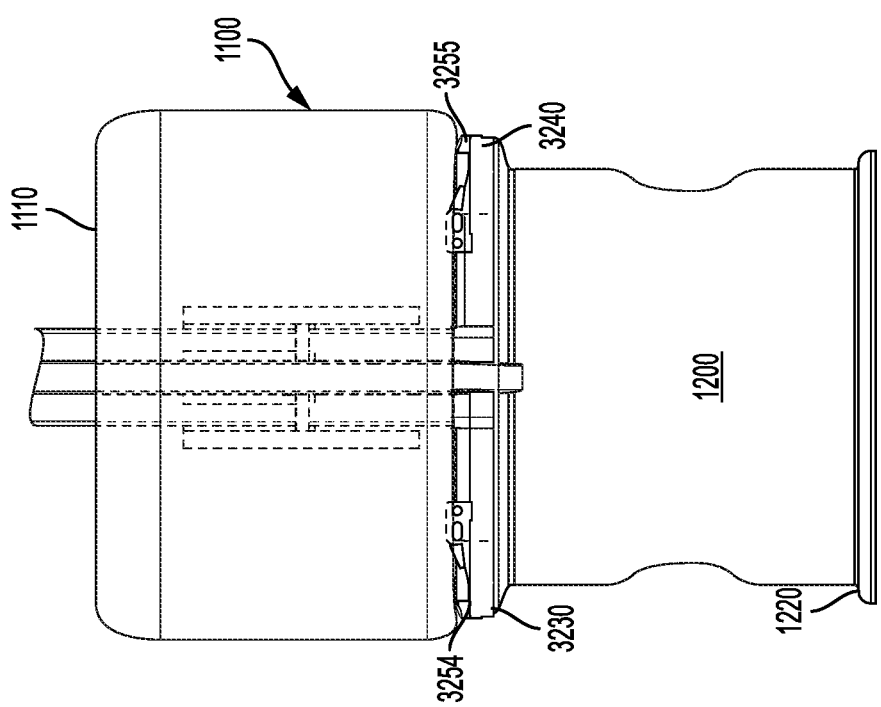
FIG. 8A is a side view of the tire and wheel assembly of FIG. 5A with the apparatus with the first finger and the second finger rotated away from one another.

In one embodiment as shown in FIG. 8A and FIG. 8B, the fifth step comprises moving the second finger (3255) in a second rotational direction (1010) opposite that of the first finger (3254) thereby reducing the distance that each finger has to travel in order to pull the entire bottom bead (1120) past the plane defined by the outer edge (1215) of the top bead seat (1210). The second finger (3255) can be moved in the second rotational direction (1010) either before, after or simultaneously with the first finger (3254) being moved in the first rotational direction (1005). Preferably, the second finger (3255) is moved in the second rotational direction (1010) simultaneously or substantially simultaneously with the first finger (3254) being moved in the first rotational direction (1005). Doing so reduces the amount of time required to pull the entire bottom bead (1120) past the plane defined by the outer edge (1215) of the top bead seat (1210).

Rotating the first finger (3254), the second finger (3255) or both in the fifth step can be achieved in a variety of ways. In one embodiment, the first finger (3254) is disposed into a first sweeper arm (3230). The first sweeper arm (3230) is then rotated in the first rotational direction (1005). In an alternative embodiment, the first finger (3254) is disposed into the first sweeper arm (3230) while the second finger (3255) is disposed into a second sweeper arm (3240). The first sweeper arm (3230) is then rotated in the first rotational direction (1005) with the second sweeper arm (3240) rotated in the second rotational direction (1010). In another embodiment, rotating the fingers can be accomplished using a series of electric motors and servos (not shown). In still another embodiment (not shown), rotating the fingers can be accomplished manually by applying forces to the fingers by hand in the corresponding rotational direction.

In a preferred embodiment of the fifth step, the first finger (3254) (and optionally the second finger (3255)) are rotated in a path parallel to or substantially parallel to the plane defined by the outer edge (1215) of the top bead seat (1210). In an alternative embodiment of the fifth step, the first finger (3254) (and optionally the second finger (3255)) are rotated in an inclined path away from the plane defined by the outer edge (1215) of the top bead seat (1210) resulting in a greater distance between the finger and the outer edge (1215) of the top bead seat (1210) at the end of the fingers rotation than the distance between the finger and the outer edge (1215) at the beginning of the fingers rotation. In one embodiment of the fifth step, both the first finger (3254) and the second finger (3255) follow a parallel or substantially parallel path. In an alternative embodiment of the fifth step, both the first finger (3254) and the second finger (3255) follow an inclined path. In still another embodiment of the fifth step, one of the first finger (3254) and the second finger (3255) follows a parallel or substantially parallel path while the other finger follows an inclined path. In one embodiment, an inclined path may be achieved by angling a tip of either the first finger and/or the second finger from a point below the plane defined by the outer edge of the top bead seat, through said plane and towards a center section of the wheel during the rotation step. While the finger(s) is/are rotating, the top bead may advance upwardly along the length of the finger(s) towards the end opposite of the tip of the respective finger(s). In this manner, the rotation step may pull the top bead further way from the outer edge of the top bead seat.

It is preferred that both the first finger and the second finger do not cross the plane defined by the outer edge (1215) of the top bead seat during the fifth step. If both fingers cross the plane defined by the outer edge (1215) of the top bead seat during the fifth step, the entire bottom bead can fall back between the top bead seat (1210) and the bottom bead seat (1220) requiring that the fourth step be repeated.

In one embodiment, the total number of degrees of rotation between the first finger (3254) and the second finger (3255) in the fifth step is in the range of between 90° and 360° in a plane parallel to the plane defined by the outer edge (1215) of the top bead seat (1210). In one embodiment, the total number of degrees of rotation can be accomplished by rotating the first finger (3254) the entire total degrees of rotation, i.e. the first finger (3254) rotates between 90° and 360° while the second finger (3255) remains stationary. In a separate embodiment, the total number of degrees of rotation can be accomplished by rotating the first finger (3254) in the first rotational direction (1005) for a degrees of rotation in the range of between 1° and 359°, and rotating the second finger (3255) in the second rotational direction (1010) for a degrees of rotation in the range of between 1° and 359° with the limitation that the total degrees of rotation is in the range of between 90° and 360°.

It is preferred that the first finger (3254) and the second finger (3255) do not touch the outer edge (1215) of the top bead seat during steps four and five of the method. More preferably, the first finger (3254) and the second finger (3255) do not touch any portion of the top bead seat (1210) during steps four and five of the method. Most preferably, the first finger (3254) and the second finger (3255) do not touch any part of the wheel assembly during steps four and five of the method.

In one embodiment, the method includes advancing the bottom bead (1120) away from the bottom bead seat (1220) and towards the top bead seat (1210) prior to the fourth step. This can be accomplished by manually by a person forcing the tire in a direction where the bottom bead (1120) becomes closer to the top bead seat (1210). In an alternative embodiment, the first finger (3254) and/or the second finger (3255) is used to advance the bottom bead away from the bottom bead seat (1220) by lifting against an inner surface of the tire (1100). In yet another embodiment, a secondary finger is used to advance the bottom bead away from the bottom bead seat by lifting against an inner surface of the tire (1100).

In one embodiment, the method includes pulling the portion of the top bead (1115) and the portion of the bottom bead (1125) past the outer edge of the top bead seat (1215) simultaneously. In this regard, the second step in the process described above can be considered to simultaneously comprise the fourth step. Once the second and fourth steps are achieved simultaneously, the third and fifth steps of the process can also be conducted simultaneously.

Some tires (1100) may comprise an inner liner. The inner liner is used either as the primary container of compressed air, or as a secondary safety measure designed to allow the automobile to continue driving even if the tire (1100) is punctured or otherwise flattens. The inner liner will have an inner liner top bead corresponding to the tire top bead (1110) and an inner liner bottom bead corresponding to the tire bottom bead (1120). When the tire comprises an inner liner, the process should also allow for removing the inner liner from the wheel assembly (1200).

Removing the inner liner can be accomplished using the same basic process steps described herein. Specifically, inserting at least a first finger (3254) and a second finger (3255) between the inner liner top bead and the top bead seat (1210), articulating the first finger (3254) and the second finger (3255) to lift a portion of the inner liner top bead past a plane defined by the outer edge of the top bead seat (1215) and rotating the first finger (3254) and/or the second finger (3255).

In one embodiment, the tire beads (1110 and 1120) and the inner liner beads are removed in separate process steps. In other words, the tire top bead (1110) is removed first followed by the inner liner top bead, then the inner liner bottom bead, and finally the tire bottom bead (1120).

In a separate embodiment, multiple beads are removed simultaneously. For instance, the tire top bead (1110) and the inner liner top bead can be removed simultaneously. This can be followed by removing the inner liner bottom bead and the tire bottom bead (1120) either individually or simultaneously. In another example, the tire top bead (1110) can be removed individually, followed by removal of the inner liner top bead and the inner liner bottom bead simultaneously, finishing with removal of the tire bottom bead (1120). In still another example, the tire top bead (1110) can be removed individually, followed by removal of all three of the inner liner top bead, the inner liner bottom bead, and the tire bottom bead (1120) simultaneously. In yet another example, the tire top bead (1110) can be removed individually followed by removing the inner liner top bead individually, finishing with removing the inner liner bottom bead and the tire bottom bead (1120) simultaneously. In a final example, the tire top bead (1110), the inner liner top bead and the inner liner bottom bead are removed simultaneously followed by individual removal of the tire bottom bead (1120).

The Finger

Also disclosed herein is a finger (2100) for dismounting a tire from a wheel assembly. The finger (2100) comprises at least one roller (2200).

Figure 9:
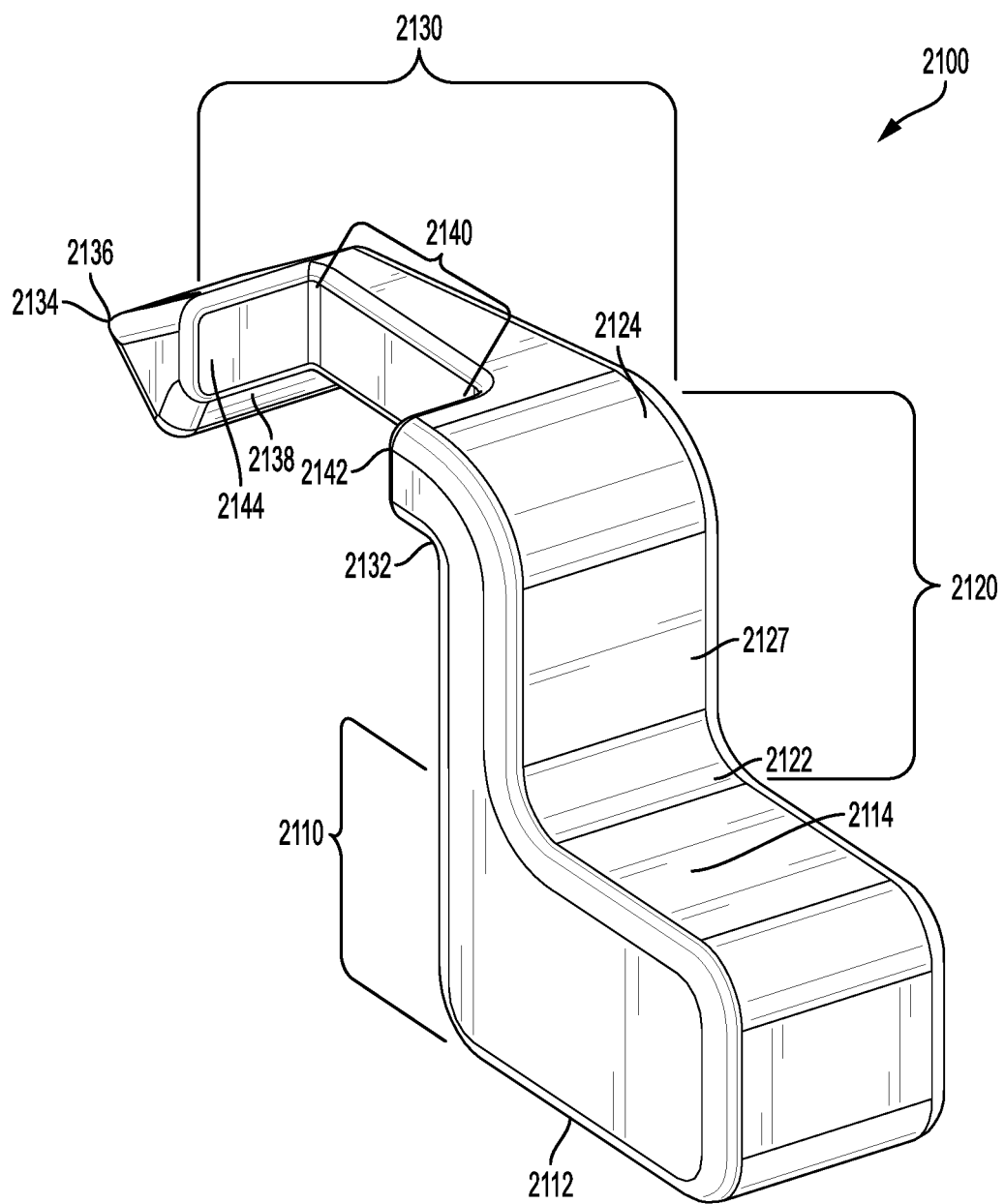
FIG. 9 is a perspective view of a finger without a roller.

As shown in FIG. 9, the finger (2100) has a finger mount section (2110) having a finger mount section first end (2112) and a finger mount section second end (2114) opposite the finger mount section first end. The finger (2100) also has a finger neck section (2120) having a finger neck section first end (2122) and a finger neck section second end (2124). The finger also has a finger horizontal section (2130) having a finger horizontal section first end (2132) and a finger horizontal section second end (2134).

As shown in FIG. 9, the finger mount section second end (2114) is attached to the finger neck section first end (2122). The finger neck section second end (2124) is attached to the finger horizontal section first end (2132).

The finger neck section may be attached to the finger mount section at an angle relative to a horizontal plane of the finger mount section. Said angle may be in the range of between 0 degrees and 90 degrees relative to the horizontal plane of the finger mount section.

Similarly, the finger neck section may be attached to the finger horizontal section at an angle relative to a horizontal plane of the finger horizontal section. Said angle may be in the range of between 0 degrees and 90 degrees relative to the horizontal plane of the finger mount section. It is preferred that the finger mount section and the finger horizontal section be parallel to, or substantially parallel to one another, while the finger mount section lies in a different horizontal plane than the finger horizontal section horizontal plane.

Figure 10:
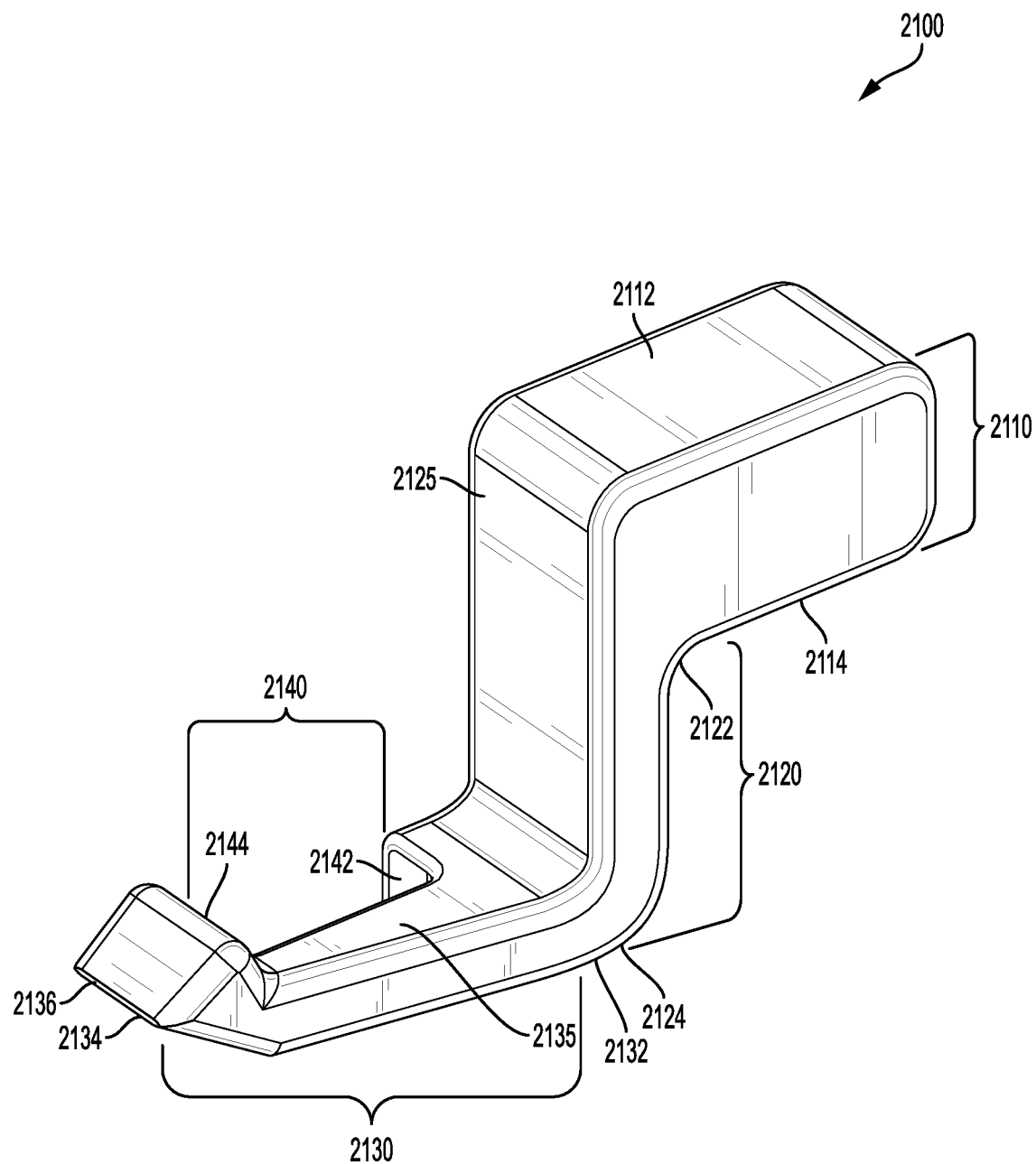
FIG. 10 is a different perspective view of a finger without a roller.

In some embodiments, such as that shown in FIG. 10, the finger neck section will comprise a top surface (2125) which is flat. In some embodiments, not shown, the finger neck section will comprise a top surface (2125) which is concave. In some embodiments, not shown, the finger neck section will comprise a top surface (2125) which is convex.

In some embodiments, such as that shown in FIG. 9, the finger neck section will comprise a bottom surface (2127) which is flat. In some embodiments, not shown, the finger neck section will comprise a bottom surface (2127) which is concave. In some embodiments, not shown, the finger neck section will comprise a bottom surface which is convex. The configuration of the finger neck section top surface (2125) relative to the finger neck section bottom surface (2127) is not considered important. For example, in some embodiments, the finger neck section top surface (2125) may be concave while the finger neck section bottom surface (2127) is convex. In another example, the finger neck section top surface (2125) may be concave while the finger neck section bottom surface (2127) is flat. In some embodiments, not shown, the finger neck section top surface (2125), the finger neck section bottom surface, or both may be in an S-shape running from the finger neck section first end (2122) to the finger neck section second end (2124). The S-shape may be thought of as a concave section starting at one end of the finger neck section and running to a first position along the finger neck section top surface or bottom surface, followed by a convex section starting from the first position along the finger neck section and extending to the other end of the finger neck section.

Figure 11:
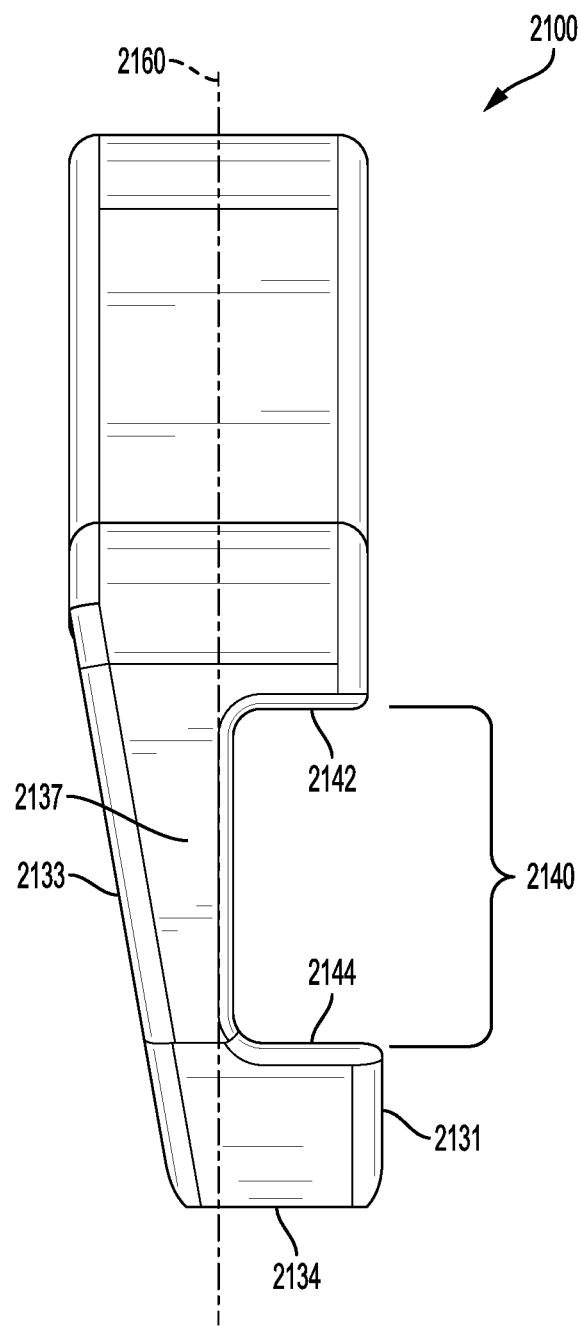
FIG. 11 is a bottom view of a finger without a roller.

As shown in FIG. 9, the finger horizontal section second end (2134) comprises a chisel point (2136) and a grab face (2138). In practice, the chisel point (2136) allows the finger to gradually move the tire bead away from the wheel flange so that the finger may be inserted between the tire bead and wheel. The chisel point (2136) may be free of sharp edges. In one such embodiment, the chisel point (2136) may have rounded edges. In practice, the grab face (2138) contacts the tire bead and/or the inner surface of the tire once the finger is inserted between the tire bead and the wheel, and prevents or reduces the likelihood that the tire bead will become disengaged from the finger while the finger is lifting the tire bead above the wheel flange. In some embodiments, the bottom surface (2137) of the finger horizontal section may be flat as shown in FIG. 11. In other embodiments, not shown, the bottom surface (2137) of the finger horizontal section may comprise an angled section. In other embodiments, not shown, the bottom surface (2137) may include a bull nose.

As shown in FIG. 9 to FIG. 11, the finger horizontal section (2130) also comprises a first roller nest (2140) having a first roller nest first end (2142) and a first roller nest second end (2144). The first roller nest (2140) can be described as a cut-out or a void area in the finger horizontal section. The first roller nest first end (2142) corresponds with the finger horizontal section first end (2132) while the first roller nest second end (2144) corresponds with the finger horizontal section second end (2134). The cut-out or void area can be located at a first longitudinal edge of the finger horizontal section (2131), at a second longitudinal edge of the finger horizontal section (2133), or in a central region of the finger horizontal section between the first longitudinal edge (2131) and the second longitudinal edge (2133).

Figure 12:
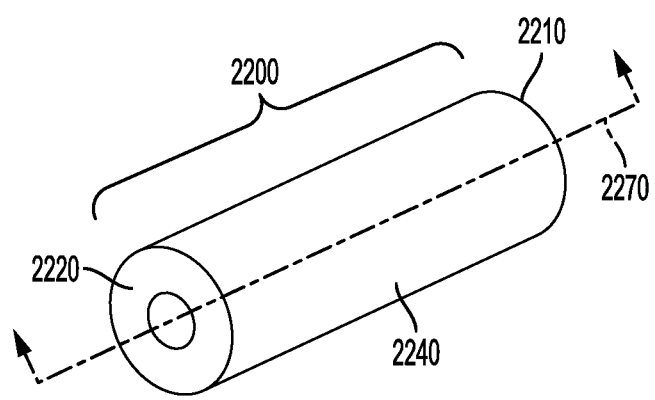
FIG. 12 is a perspective view of one embodiment of a first roller.
Figure 13:
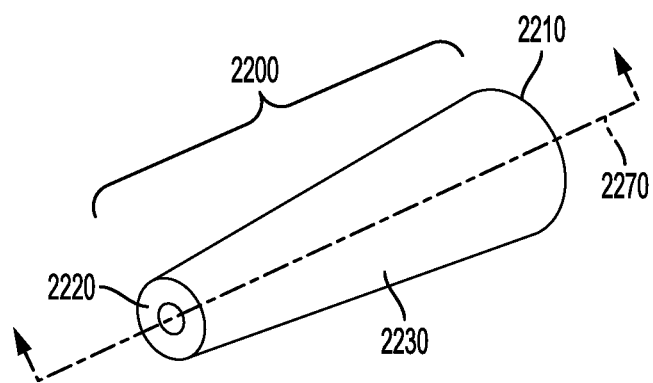
FIG. 13 is a perspective view of a separate embodiment of a first roller.

As shown in FIG. 12 and FIG. 13, the at least one roller (2200) has a roller first end (2210) and a roller second end (2220). When connected to the finger (2100), the roller first end (2210) is connected with the first roller nest first end (2142) while the roller second end (2220) is connected with the first roller nest second end (2144).

Figure 14:
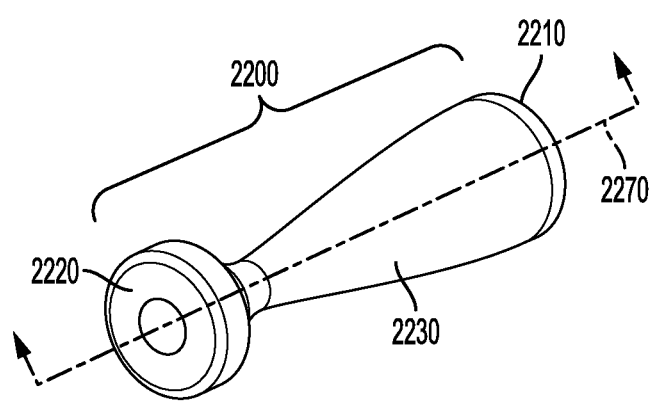
FIG. 14 is a perspective view of a separate embodiment of a first roller.
Figure 15:
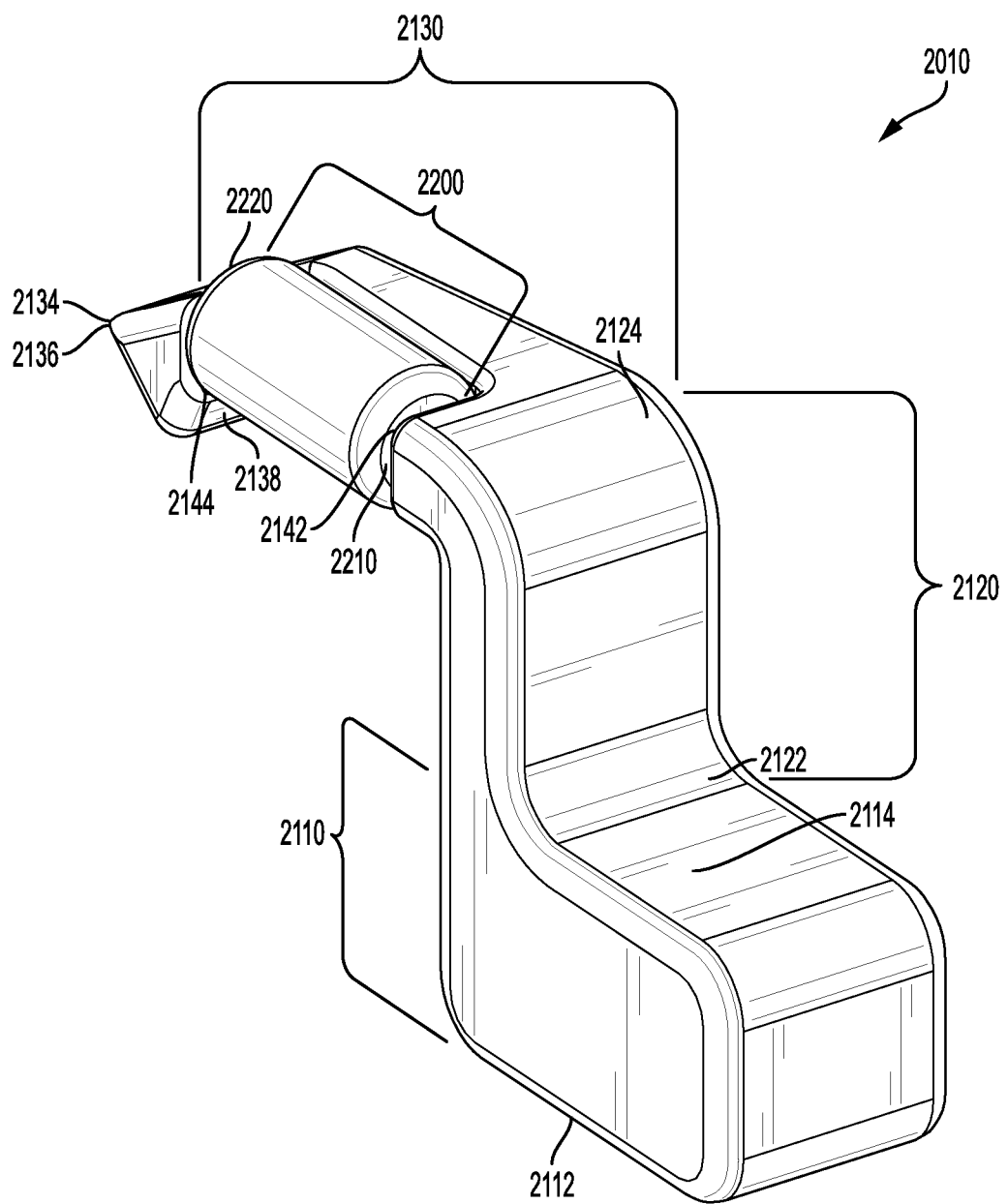
FIG. 15 is a perspective view of a finger with a first roller.
Figure 16:
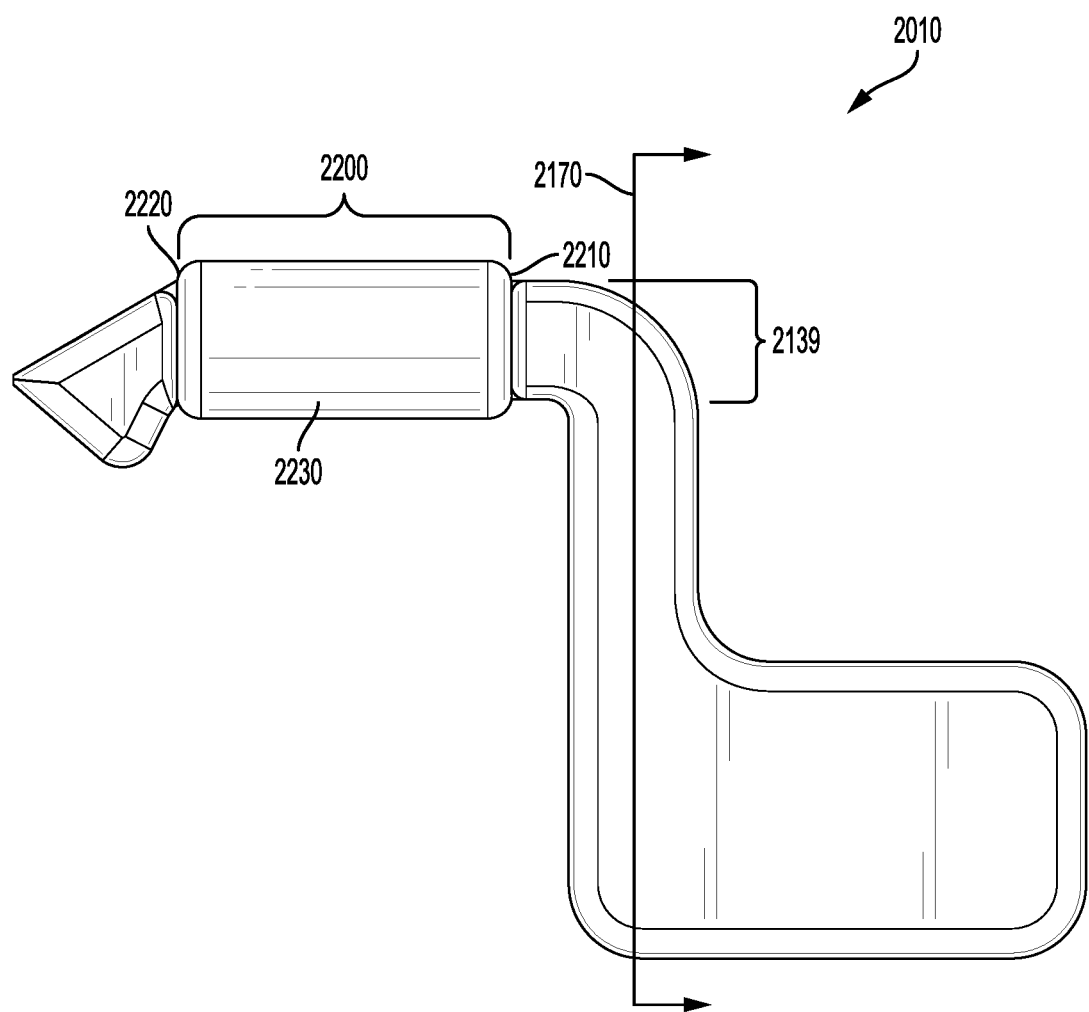
FIG. 16 is a side view of a finger with a first roller.

FIG. 15 and FIG. 16 show the connection between the at least one roller (2200) and the first roller nest (2140). As shown in FIG. 15 and FIG. 16, the finger horizontal section has a top surface (2135) and a bottom surface (2137). The at least one roller (2200) will have an exterior surface (2240) as shown in FIG. 12 to FIG. 14. In some embodiments, the connection between the roller first end (2210) and the first roller nest first end (2142), and the connection between the roller second end (2220) and the first roller nest second end (2144) are configured such that the exterior surface (2240) of the at least one roller (2200) extends past the top surface (2135) of the finger horizontal section (2130).

The at least one roller can have several different configurations. FIG. 12 shows the at least one roller (2200) that is cylindrical or substantially cylindrical. FIG. 13 shows the at least one roller (2200) having a sloped exterior surface (2230). In embodiments where the at least one roller (2200) has a sloped exterior surface (2230) such as shown in FIG. 13, the at least one roller will have a first diameter at the roller first end (2210), and a second diameter at the roller second end (2220). The first diameter may be smaller than the second diameter such that the sloped exterior surface (2230) slopes inward as the roller extends towards the finger neck section (2120). Alternatively, the first diameter may be larger than the second diameter such that the sloped exterior surface (2230) slopes inward as the roller extends away from the finger neck section (2120).

FIG. 14 shows the at least one roller (2200) having a sloped exterior surface (2230) where the exterior surface (2230) slopes inward as the roller extends from the roller second end (2220) towards the roller first end (2210), but then extends back outward as the exterior surface (2230) approaches the roller first end (2210). It will be understood by one of ordinary skill that the exterior surface (2230) of the first roller (2200) can take many forms with varying sections extending inward and then outward or outward and then inward as the exterior surface moves from one end of the first roller to the other.

Figure 17:
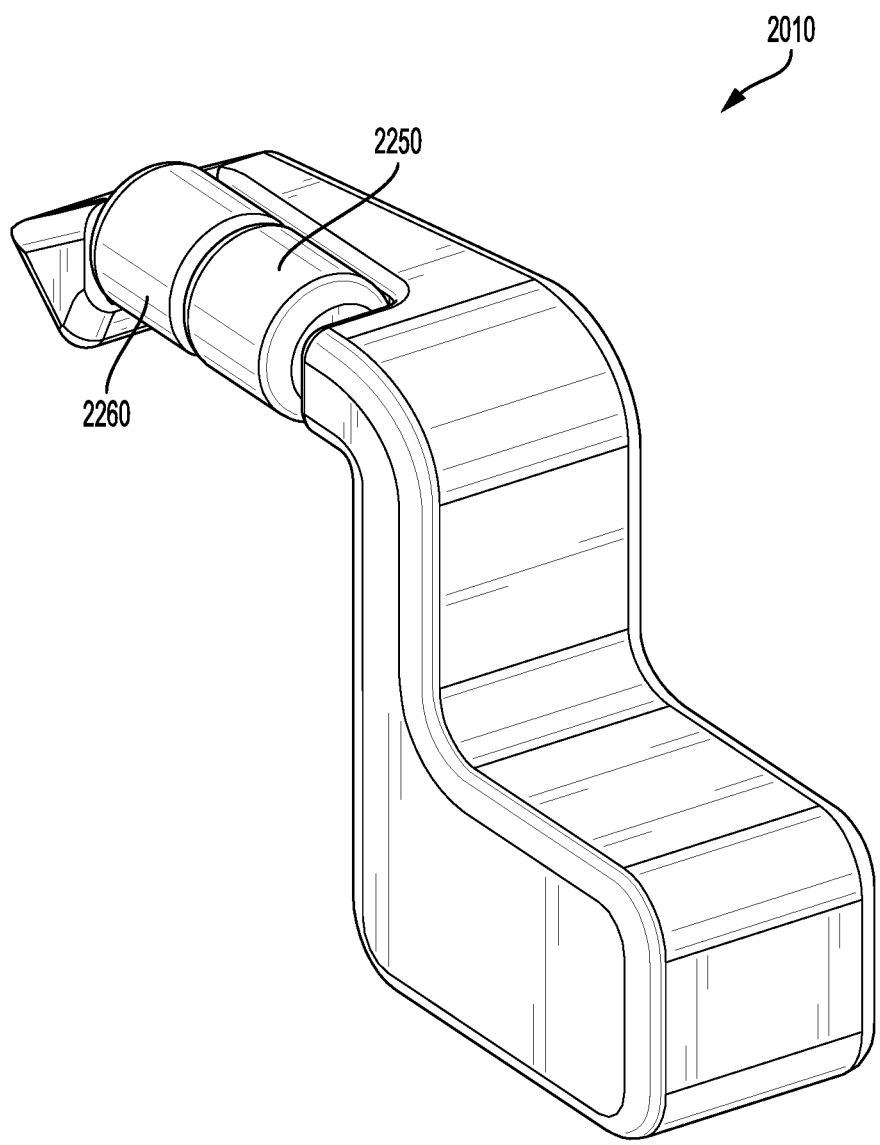
FIG. 17 is a perspective view of a finger with a two-piece first roller.

In some embodiments, as shown in FIG. 17, the at least one roller (2200) will comprise a two-piece roller having a first roller piece (2250) and a second roller piece (2260). In some such embodiments, both the first roller (2250) and the second roller (2260) may be cylindrical. In other such embodiments, the first roller (2250) may be cylindrical while the second roller (2260) may have a sloped exterior surface. In still other such embodiments, the first roller (2250) may have a sloped exterior surface while the second roller (2260) may be cylindrical. In other such embodiments, both the first roller (2250) and the second roller (2260) may have a sloped exterior surface.

As shown in FIG. 11, the finger (2100) has a first central axis (2160) running from the finger mount section first end (2112) to the finger horizontal section second end (2134) while the at least one roller (2200) has a central axis (2270) running from the at least one roller first end (2210) to the at least one roller second end (2220) as shown in FIG. 12 to FIG. 14. In some embodiments, the at least one roller (2200) may be connected to the finger (2100) such that the central axis (2270) of the at least one roller is at an angle which is not parallel to the first central axis (2160) of the finger. The angle may be in the range of between 0° and 30°.

As shown in FIG. 16, the finger (2100) also has a second central axis (2170) running from the top surface of the finger to the bottom surface of the finger, while the at least one roller (2200) has a central axis (2270) running from the at least one roller first end (2210) to the at least one roller second end (2220) as shown in FIG. 12 to FIG. 14. In some embodiments, the at least one roller (2200) may be connected to the finger (2100) such that the central axis (2270) of the at least one roller is at an angle which is not parallel to the second central axis (2170) of the finger. The angle may be in the range of between 0° and 30°.

In some embodiments, the connection between the roller first end (2210) and the first roller nest first end (2142) is a pivotable connection. In some embodiments, the connection between the roller second end (2220) and the first roller nest second end (2144) is a pivotable connection. In some embodiments, both the connection between the roller first end (2210) and the first roller nest first end (2142), and the connection between the roller second end (2220) and the first roller nest second end (2144) are pivotable connections. The pivotable connection(s) allow the at least one roller (2200) to flex and pivot along an axis perpendicular to the finger central axis (2160) as the tire and wheel assembly are rotated around a fixed finger, or as the finger is rotated around the fixed tire and wheel assembly, to extend the tire bead past the top surface of the first tire bead seat. Examples of pivotable connections include an axle and hole connection wherein the inside diameter of a hole in the roller is larger than the outside diameter of the axle allowing the roller to pivot along the axle, a spring loaded axle connection, a cam action axle connection, and an eccentric mount connection.

Figure 19:
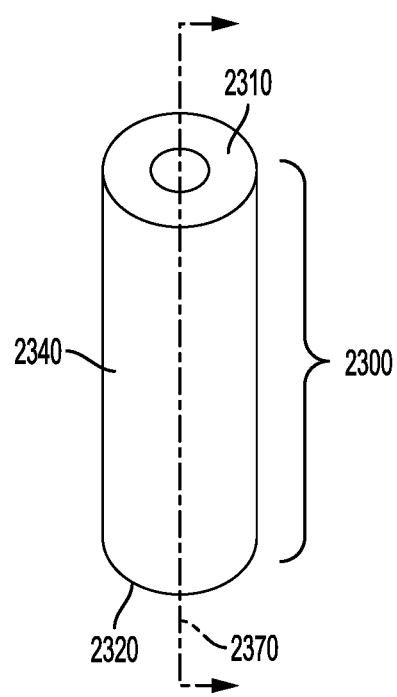
FIG. 19 is a perspective view of one embodiment of a second roller.
Figure 20:
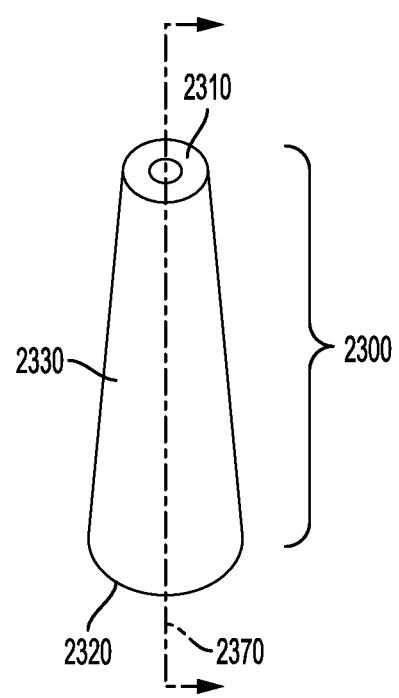
FIG. 20 is a perspective view of a separate embodiment of a second roller.
Figure 21:
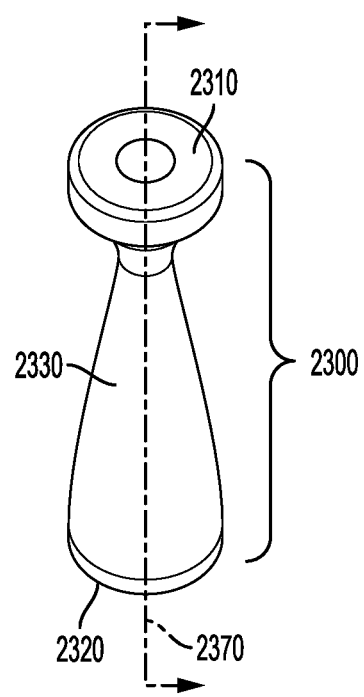
FIG. 21 is a perspective view of a separate embodiment of a second roller.

In some embodiments, there may be a second roller (2300). As shown in FIG. 19 to FIG. 21, the second roller (2300) may comprise a second roller first end (2310) and a second roller second end (2320) opposite the second roller first end.

Figure 18:
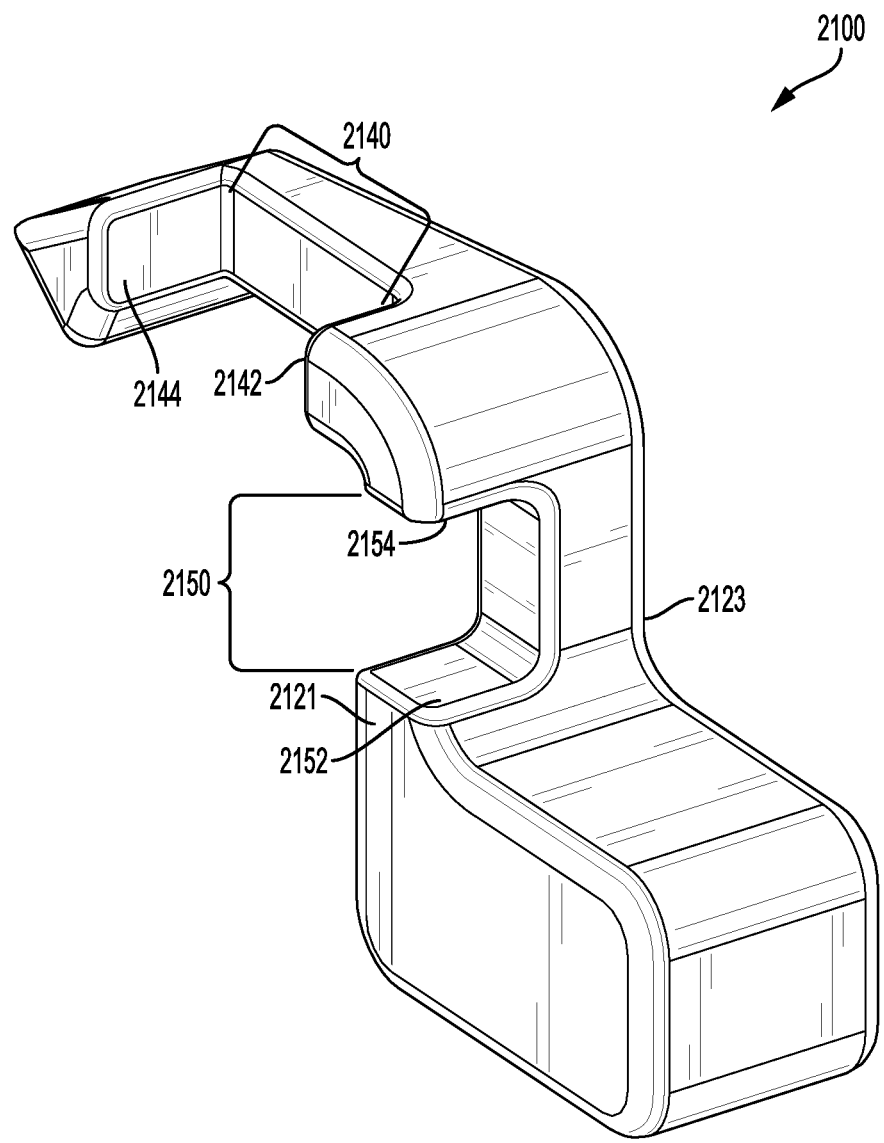
FIG. 18 is a perspective view of a finger without a roller.

In embodiments having a second roller (2300), there will be a second roller nest (2150) as shown in FIG. 18. The second roller nest (2150) may be located in either the finger neck section (2120) or the finger horizontal section (2130). The second roller nest may have a second roller nest first end (2152) and a second roller nest second end (2154). The second roller nest (2150) can be described as a cut-out or a void area in the finger neck section (2120) or the finger horizontal section (2130). The second roller nest first end (2152) corresponds with the finger neck section first end (2122) or the finger horizontal section first end (2132) depending upon the location of the second roller nest. The second roller nest second end (2154) corresponds with the finger neck section second end (2124) or the finger horizontal section second end (2134) depending upon the location of the second roller nest. The cut-out or void area can be located at a first longitudinal edge of the finger neck section (2121) or the finger horizontal section (2131), at a second longitudinal edge of the finger neck section (2123) or the finger horizontal section (2133), in a central region of the finger neck section between the first longitudinal edge (2121) and the second longitudinal edge (2133), or in a central region of the finger horizontal section between the first longitudinal edge (2131) and the second longitudinal edge (2133).

Figure 22:
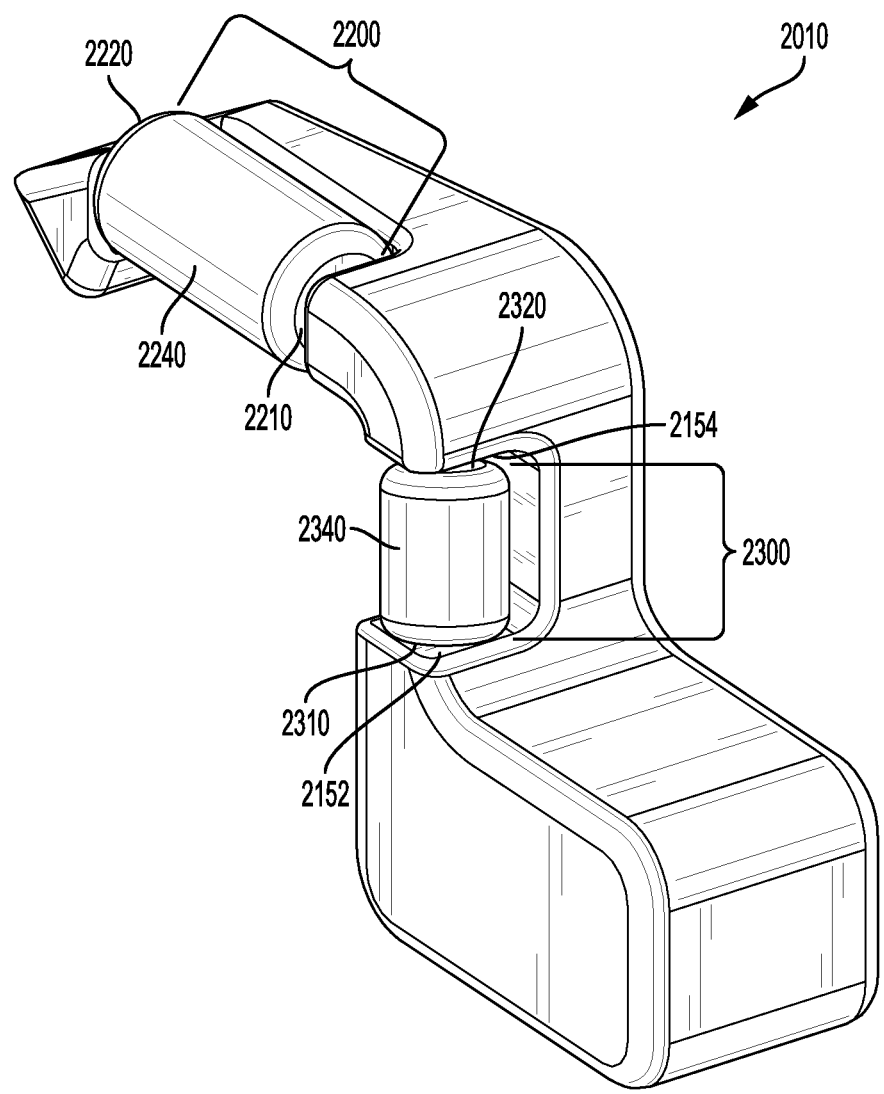
FIG. 22 is a perspective view of a finger with a first roller and a second roller.
Figure 23:
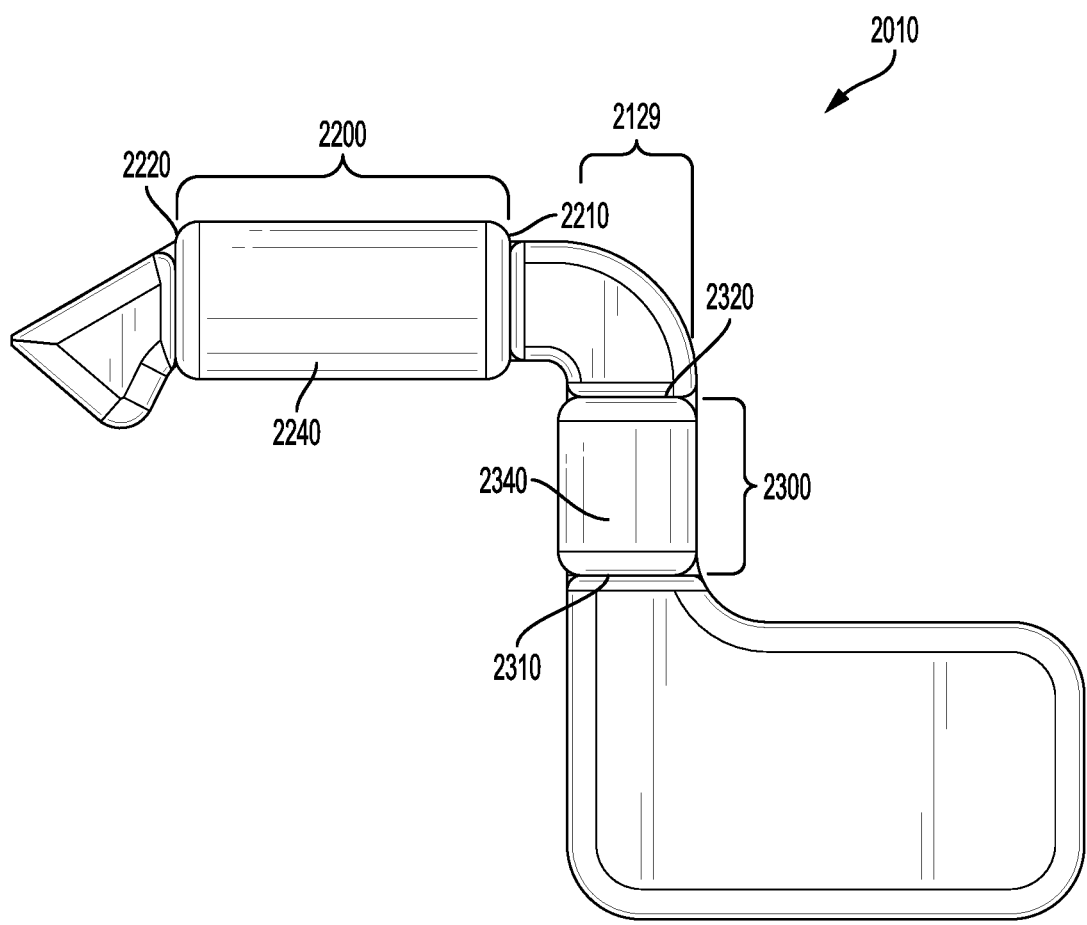
FIG. 23 is a side view of a finger with a first roller and a second roller.

As shown in FIG. 22 and FIG. 23, in embodiments having a second roller (2300), the second roller first end (2310) is connected with the second roller nest first end (2152) while the second roller second end (2320) is connected with the second roller nest second end (2154).

FIG. 22 and FIG. 23 show the connection between the second roller (2300) and the second roller nest (2150). As shown in FIG. 23, the finger horizontal section has a top surface (2135) and a bottom surface (2137). Similarly, the finger neck section has a top surface (2125) and a bottom surface (2127). The second roller (2300) will have an exterior surface (2340). In some embodiments, the connection between the second roller first end (2310) and the second roller nest first end (2152), and the connection between the second roller second end (2320) and the second roller nest second end (2154) are configured such that the exterior surface (2340) of the second roller (2300) extends past the top surface of the finger horizontal section (2135) and/or the top surface of the finger neck section (2125).

The second roller (2300) can have several different configurations. FIG. 19 shows the second roller (2300) that is cylindrical or substantially cylindrical. FIG. 20 shows the second roller (2300) having a sloped exterior surface (2330). In embodiments where the second roller (2300) has a sloped exterior surface (2330) such as shown in FIG. 20, the second roller will have a first diameter at the second roller first end (2310), and a second diameter at the second roller second end (2320). The first diameter may be smaller than the second diameter such that the sloped exterior surface (2330) slopes inward as the roller extends towards the finger mount section (2110). Alternatively, the first diameter may be larger than the second diameter such that the sloped exterior surface (2330) slopes inward as the roller extends away from the finger mount section (2110).

FIG. 21 shows the second roller (2300) having a sloped exterior surface (2330) where the exterior surface (2330) slopes inward as the roller extends from the second roller second end (2320) towards the second roller first end (2310), but then extends back outward as the exterior surface (2330) approaches the second roller first end (2310). It will be understood by one of ordinary skill that the exterior surface (2330) of the second roller (2300) can take many forms with varying sections extending inward and then outward or outward and then inward as the exterior surface moves from one end of the first roller to the other.

Figure 24:
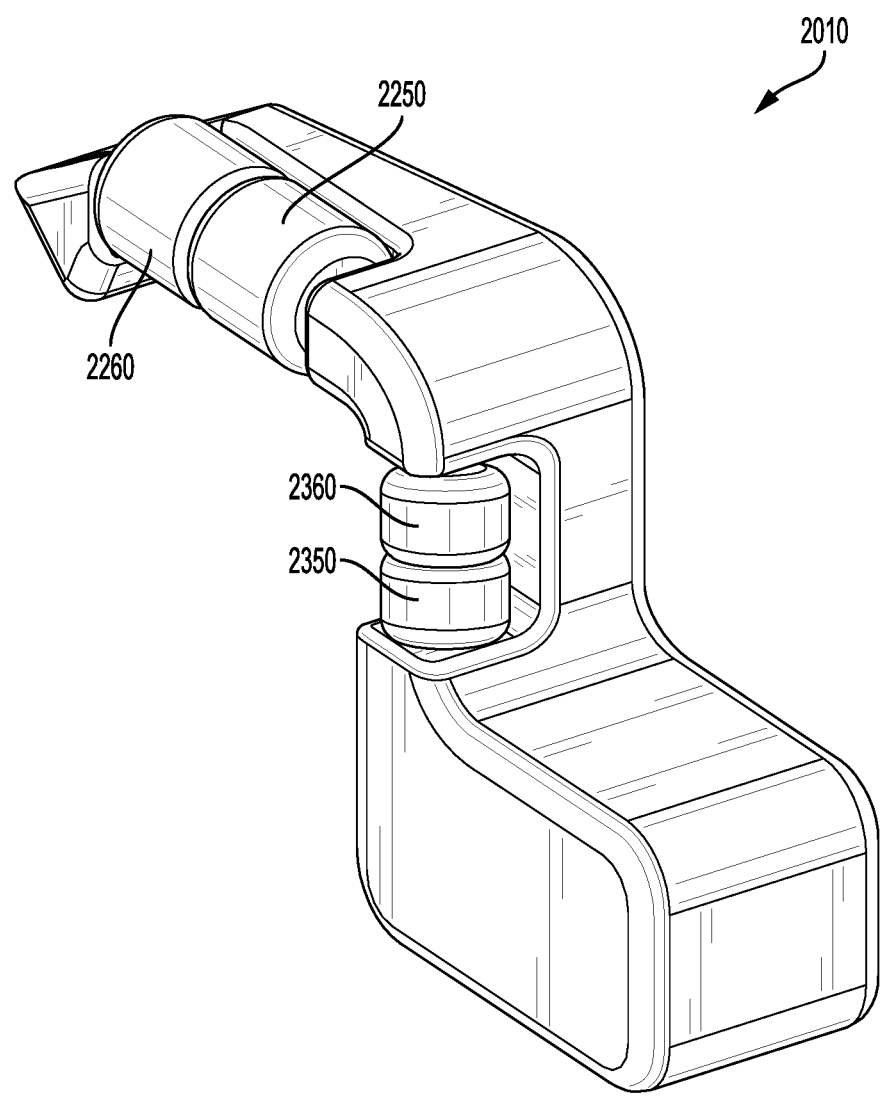
FIG. 24 is a perspective view of a finger with a two-piece second roller.

In some embodiments, as shown in FIG. 24, the second roller (2300) will comprise a two-piece roller having a second roller first piece (2350) and a second roller second piece (2360). In some such embodiments, both the second roller first piece (2350) and the second roller second piece (2360) may be cylindrical. In other such embodiments, the second roller first piece (2350) may be cylindrical while the second roller second piece (2360) may have a sloped exterior surface. In still other such embodiments, the second roller first piece (2350) may have a sloped exterior surface while the second roller second piece (2360) may be cylindrical. In other such embodiments, both the second roller first piece (2350) and the second roller second piece (2360) may have a sloped exterior surface.

As shown in FIG. 1, the finger (2100) has a first central axis (2160) running from the finger mount section first end (2112) to the finger horizontal section second end (2134) while the second roller (2300) has a central axis (2370) running from the second roller first end (2310) to the second roller second end (2320) as shown in FIG. 19 and FIG. 20. In some embodiments, the second roller (2300) may be connected to the finger (2100) such that the central axis (2370) of the second roller is at an angle which is not parallel to the first central axis (2160) of the finger. The angle may be in the range of between 0° and 30°.

As shown in FIG. 16, the finger (2100) also has a second central axis (2170) running from the top surface of the finger to the bottom surface of the finger, while the second roller (2300) has a central axis (2370) running from the second roller first end (2310) to the second roller second end (2320) as shown in FIG. 19 to FIG. 21. In some embodiments, the second roller (2300) may be connected to the finger (2100) such that the central axis (2370) of the second roller is at an angle which is not parallel to the second central axis (2170) of the finger. The angle may be in the range of between 0° and 90°.

In some embodiments, the connection between the second roller first end (2310) and the second roller nest first end (2152) is a pivotable connection. In some embodiments, the connection between the second roller second end (2320) and the second roller nest second end (2154) is a pivotable connection. In some embodiments, both the connection between the second roller first end (2310) and the second roller nest first end (2152), and the connection between the second roller second end (2320) and the second roller nest second end (2154) are pivotable connections. The pivotable connection(s) allow the second roller (2300) to flex and pivot along an axis perpendicular to the finger central axis (2160) as the tire and wheel assembly are rotated around a fixed finger, or as the finger is rotated around the fixed tire and wheel assembly, to extend the tire bead past the top surface of the first tire bead seat. Examples of pivotable connections include Examples of pivotable connections include an axle and hole connection wherein the inside diameter of a hole in the roller is larger than the outside diameter of the axle allowing the roller to pivot along the axle, a spring loaded axle connection, a cam action axle connection, and an eccentric mount connection.

The finger and the roller may each individually may be made of several different types of materials. The materials of construction for the finger and the roller are not considered important. For example, the finger and the roller may each individually be selected from the group consisting of steel, heat treated steel, case hardened steel, aluminum, titanium, ceramics, ceramic coated metals, plastics, and reinforced plastics.

In practice it is preferred to have a low profile finger with low profile rollers. By a low profile finger, it is meant that the finger mount section height dimension (2119), the finger neck section height dimension (2129), and/or the finger horizontal section height dimension (2139) are as small a dimension as possible while still providing the rigidity needed to overcome the frictional forces between a tire bead and a wheel assembly to lift the tire bead above the top surface of a tire bead seat on said wheel assembly. Similarly, by low profile rollers, it is meant that the largest diameter of the rollers are as small a dimension as possible. It should also be noted that the chisel point (2136) and grab face should extend from the finger horizontal section top surface (2135) as little as possible while still providing the ability for the grab surface to interact with a tire bead when inserted between the tire bead and a wheel assembly in order to lift a portion of the tire bead above the top surface of a tire bead seat on said wheel assembly.

The finger disclosed herein may be useful for a variety of processes and apparatus' for dismounting a tire from a wheel. One example of such a process is the process disclosed in U.S. Pat. No. 3,584,672, the teachings of which are incorporated by reference herein in their entirety.

The Apparatus

Figure 25:
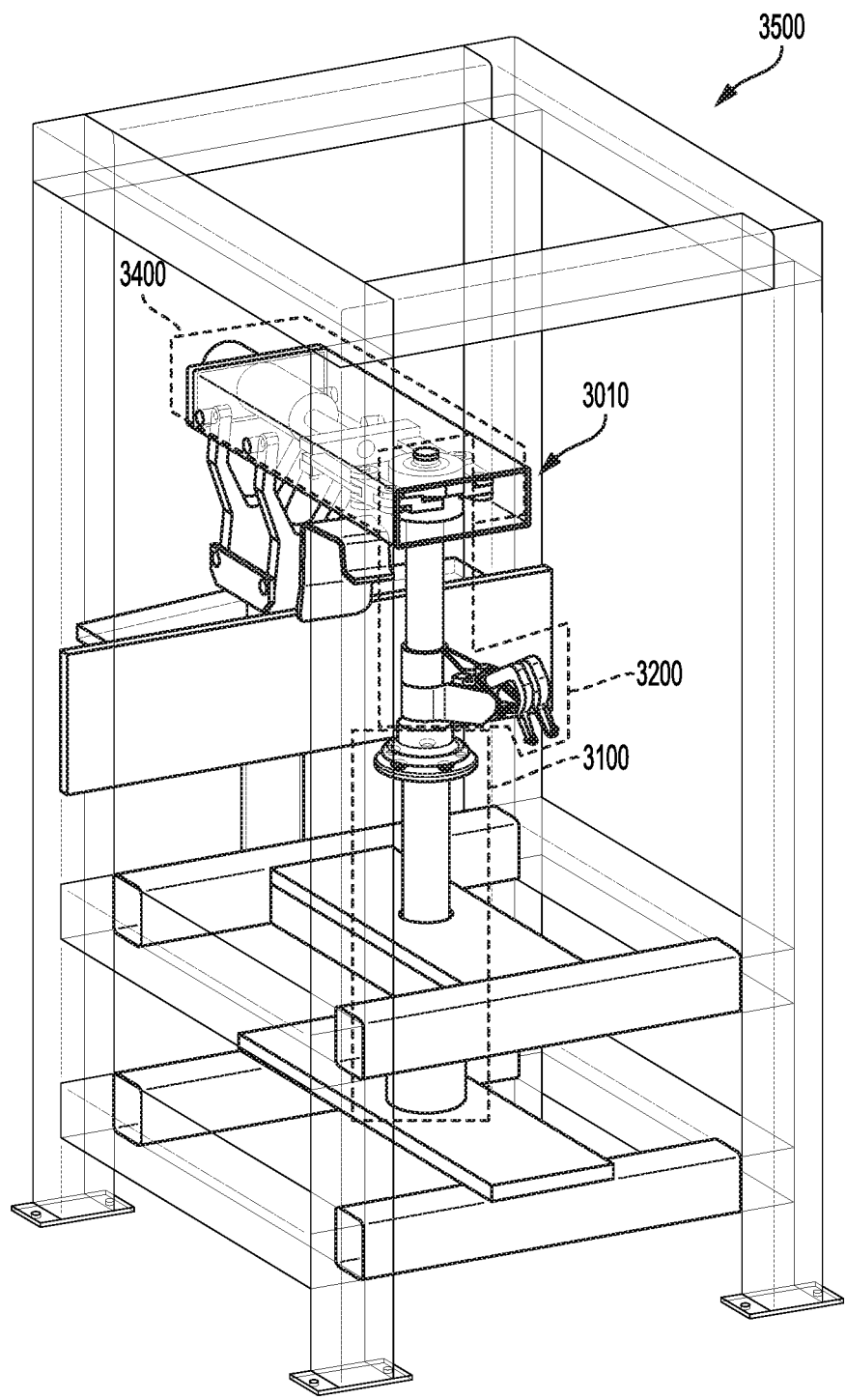
FIG. 25 is a perspective view of an embodiment of the apparatus for removing a tire from a wheel disclosed herein.
Figure 26:
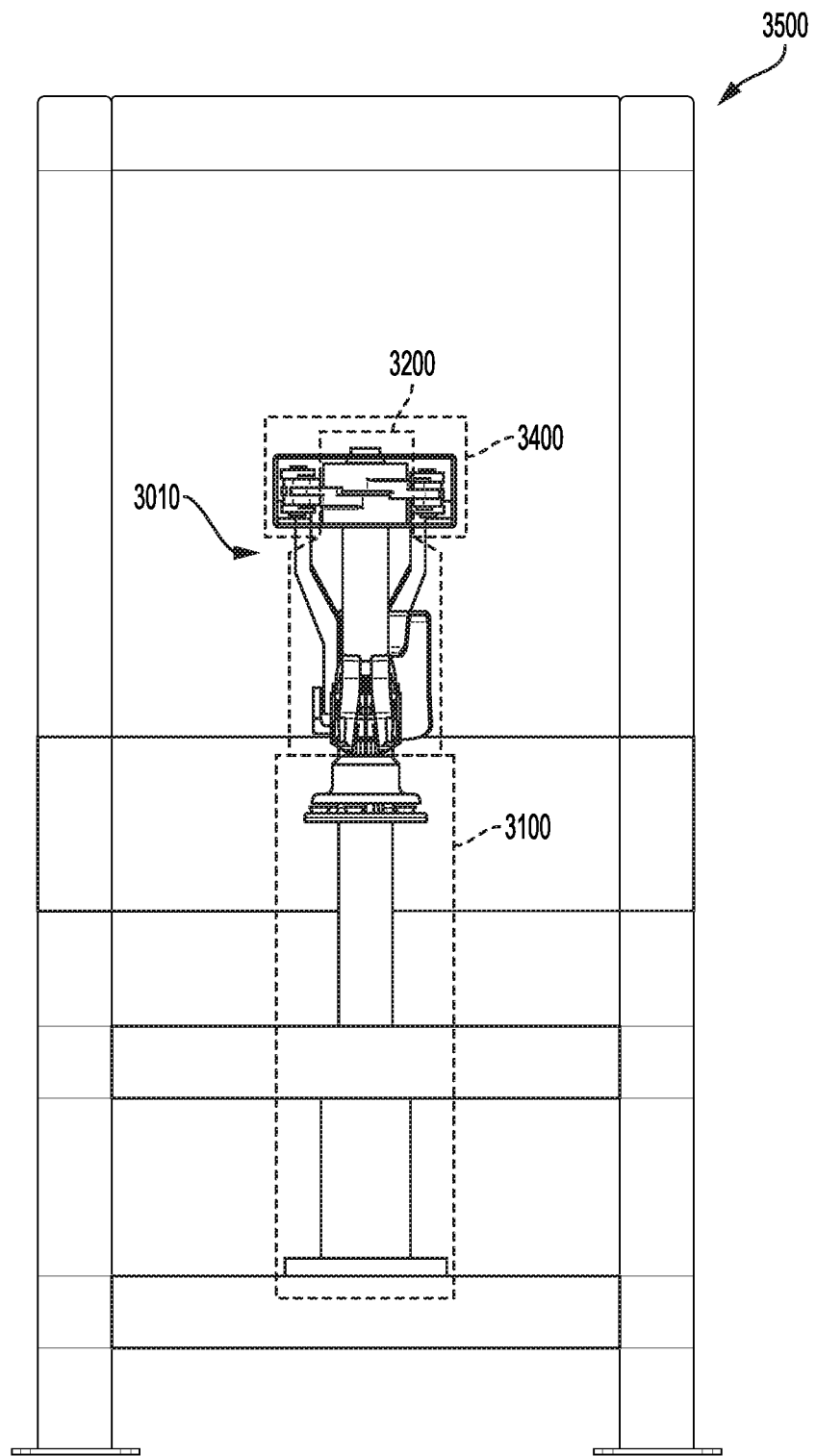
FIG. 26 is a front view of the embodiment of the apparatus shown in FIG. 25.
Figure 27:
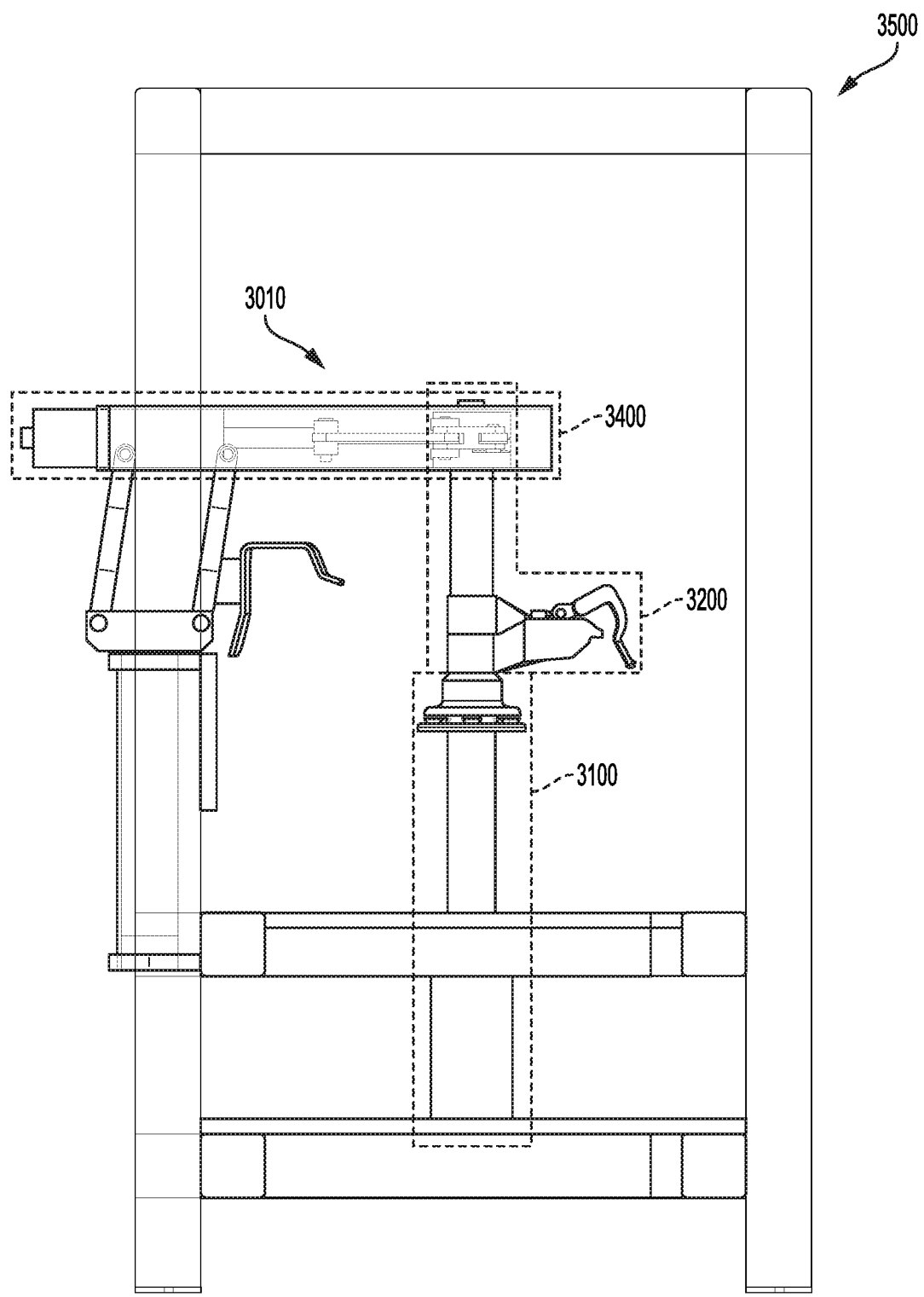
FIG. 27 is a side view of the embodiment of the apparatus shown in FIG. 25.

As shown in FIG. 25 to FIG. 27, the apparatus (3010) comprises a wheel alignment assembly (3100), a tire dismount assembly (3200), a bead lifter (3300 shown in FIG. 31A to 31D), and a rotation assembly (3400).

The wheel alignment assembly may form the bottom of a lock mechanism which locks the wheel to the rotation assembly so that the wheel does not rotate during dismounting of the tire and is properly aligned with the center of the rotation assembly.

The tire dismount assembly may use a bead lifter (3300) shown in FIG. 31A to FIG. 31D) to first enter the space between the two bead seats of a wheel under a tire bead and then lift a portion of the tire bead out from between the two bead seats of the wheel. The assembly is then split into two and rotated in opposite directions by the rotation assembly to remove the rest of the tire bead from between the two bead seats of the wheel.

The rotation assembly splits the tire dismount assembly in two halves rotating each half in the opposite rotational direction from the other as shown in FIG. 33A and FIG. 33B.

Figure 28:
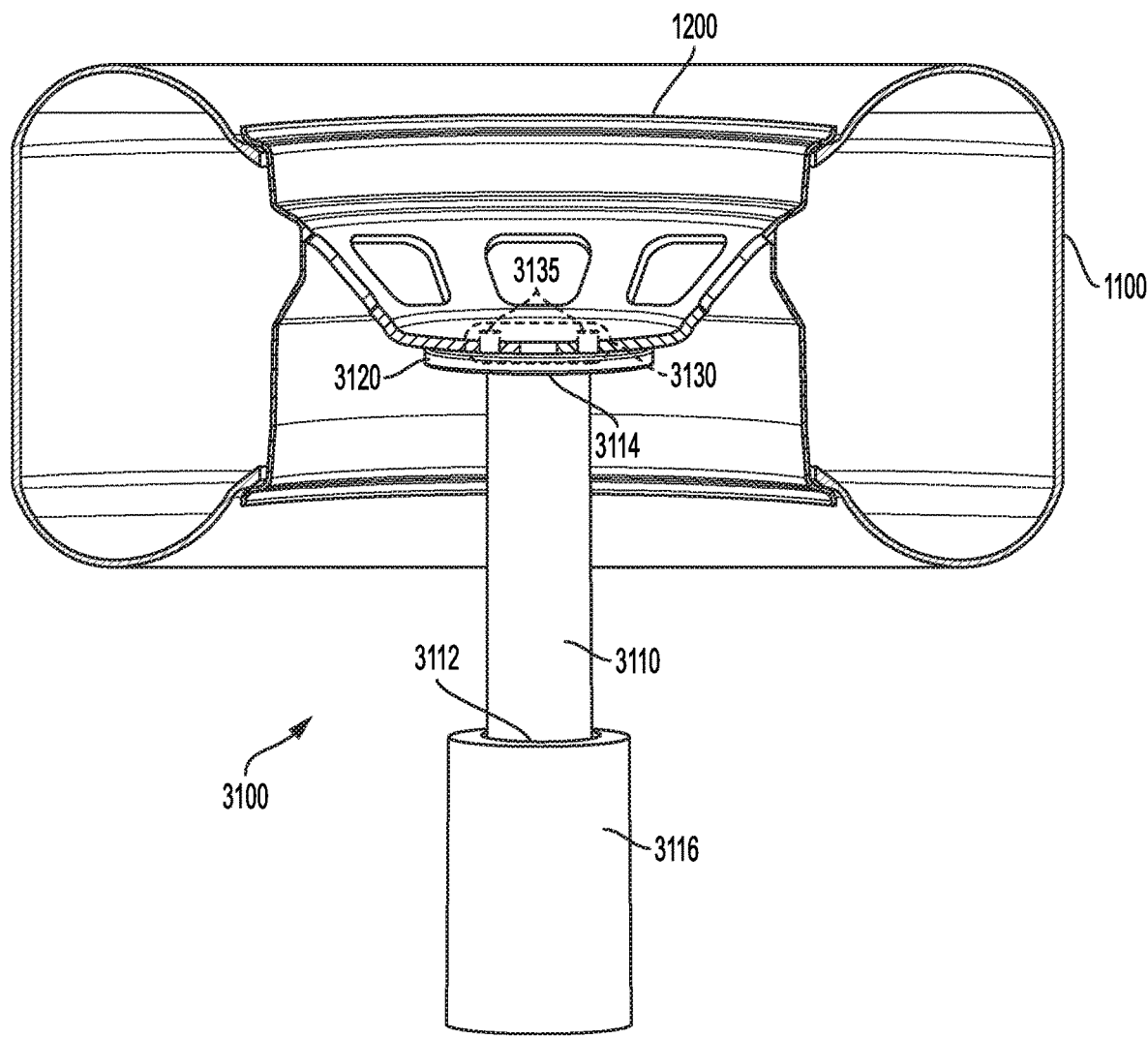
FIG. 28 is a cut-away view of an embodiment of a wheel alignment assembly disclosed herein.
Figure 30:
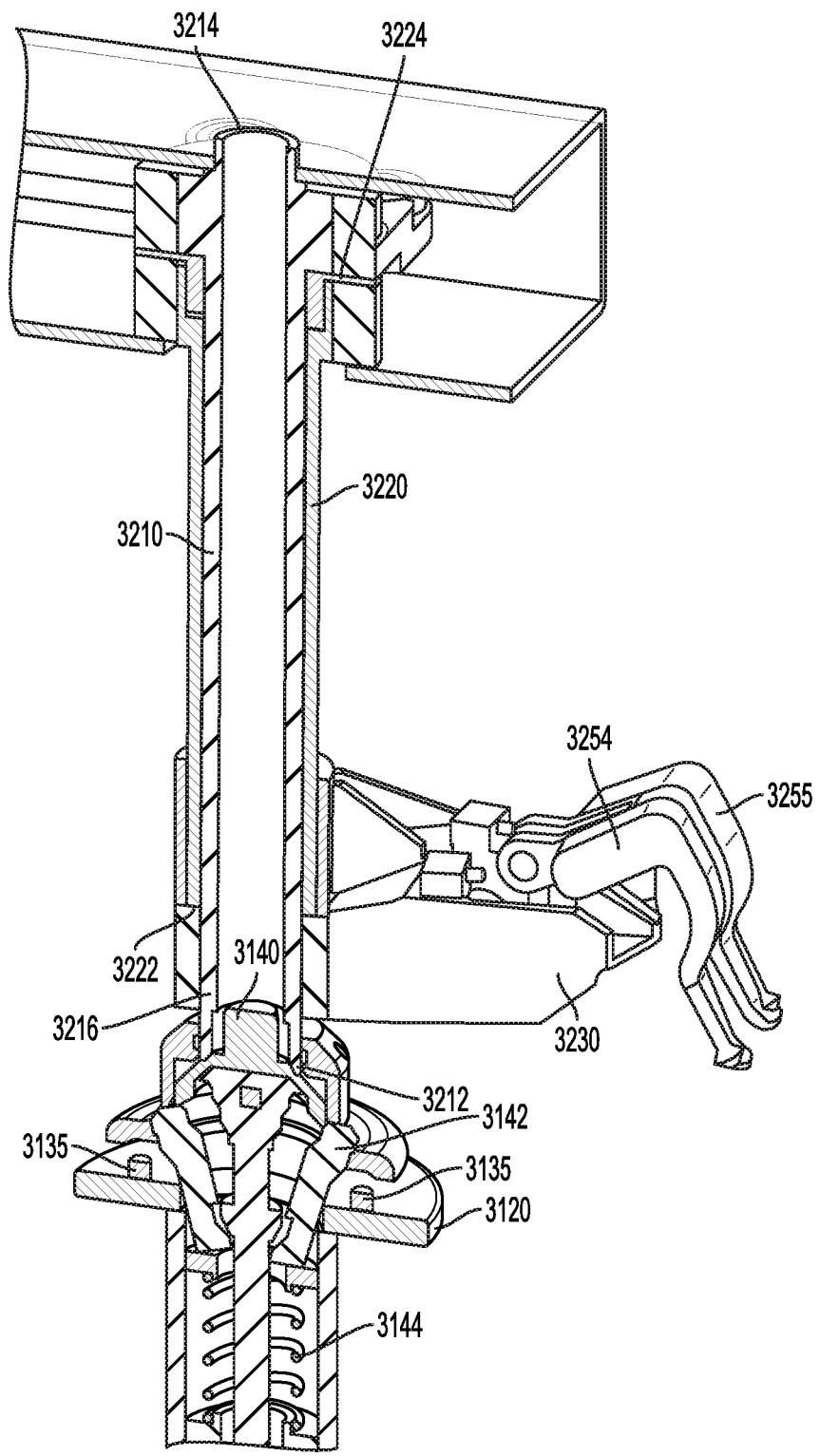
FIG. 30 is a cut-away perspective view of an embodiment of a tire dismount assembly interacting with a wheel alignment assembly.

FIG. 28 shows an embodiment of the wheel alignment assembly (3100) which may comprise a shaft (3110), a base pad (3120) which may comprise a hub (3130), and a first lock mechanism (3140 shown in FIG. 30). The shaft will have a shaft first end (3112) and a shaft second end (3114) opposite the shaft first end. The base pad may be connected to the shaft at a shaft location proximate to the shaft second end. By proximate to the shaft second end, it is meant that the base pad may connect to the shaft along a portion of the shaft length dimension which spans from the shaft first end to the shaft second end, and the portion of the shaft length dimension to which the base pad may be connected is closer to the shaft second end than the shaft first end. In some embodiments, the connection between the base pad and the shaft may be a non-permanent connection such as a clamp, a nut and bolt, a screw, a pin, or the like. In some embodiments, the connection between the base pad and the shaft may be a permanent connection such as welding the base pad to the shaft or manufacturing the shaft and the base pad from one unitary piece of material.

In some embodiments, the hub (3130) will comprise a series of studs (3135) arranged in a pattern corresponding to a series of bolt holes located in the center portion of the wheel assembly (1200). The base pad (3120) and the hub may be removably connected such as by a nut and bolt, a screw, or a pin to allow for the use of different hubs having different arrangements of studs corresponding to different bolt hole patterns of different wheels. During operation, each stud of the series of studs will pass through a corresponding bolt hole located in the center portion of the wheel. Preferably, the hub will comprise at least two studs corresponding to at least two bolt holes of the corresponding wheel. By passing at least two studs of the hub through corresponding bolt holes in the wheel, the hub can reduce or prevent rotation of the tire and wheel assembly during dismounting.

As shown in FIG. 28, the shaft (3110) of the wheel alignment assembly may further comprise a first linear force applicator (3116). When present, the first linear force applicator may be located at or connected to the shaft first end (3112). The first linear force applicator may be selected from the group consisting of a hydraulic cylinder and shaft, a gas charged hydraulic cylinder and a shaft, a pneumatic cylinder and shaft, a linear actuator, a machine screw linear actuator, a ball and screw linear actuator, and a roller screw linear actuator. During operation, the shaft of the first linear force applicator can be advanced or retracted in order to move the wheel alignment assembly towards or away from the tire dismount assembly (3200).

Figure 29:
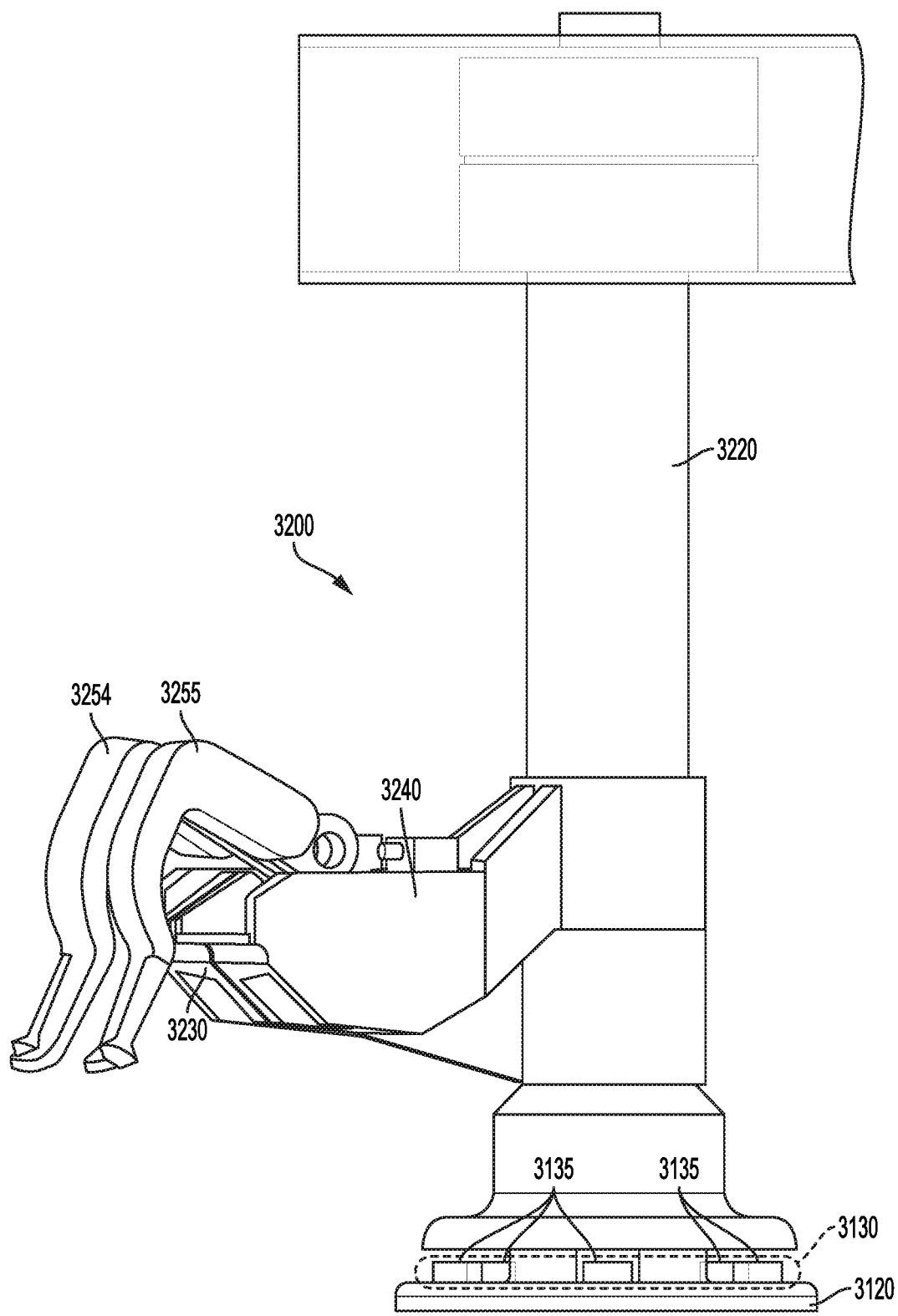
FIG. 29 is a detailed perspective view of an embodiment of a tire dismount assembly disclosed herein.

FIG. 29 and FIG. 30 shows an embodiment of the tire dismount assembly (3200) which may comprise an inner rotator shaft (3210 shown in FIG. 30), an outer rotator shaft (3220), a first sweeper arm (3230), a second sweeper arm (3240), and a finger assembly (3250 shown in FIG. 33A).

As shown in FIG. 30, the inner rotator shaft will have an inner rotator shaft first end (3212) and an inner rotator shaft second end (3214) opposite the inner rotator shaft first end which provides for an inner rotator shaft length dimension spanning from the inner rotator shaft first end to the inner rotator shaft second end. Similarly, the outer rotator shaft will have an outer rotator shaft first end (3222) and an outer rotator shaft second end (3224) opposite the outer rotator shaft first end which provides for an outer rotator shaft length dimension spanning from the outer rotator shaft first end to the outer rotator shaft second end. As shown in FIG. 30, the inner rotator shaft is nested inside of the outer rotator shaft. Preferably, the outer rotator shaft length dimension is less than the inner rotator shaft length dimension. More preferably, a first portion of the inner rotator shaft length dimension will extend past the outer rotator shaft first end, and a second portion of the inner rotator shaft length dimension will extend past the outer rotator shaft second end.

The first sweeper arm (3230) may be connected to the inner rotator shaft (3210) at an inner rotator shaft location proximate to the inner rotator shaft first end (3212). By proximate to the inner rotator shaft first end, it is meant that the first sweeper arm may connect to the inner rotator shaft along a portion of the inner rotator shaft length dimension closer to the inner rotator shaft first end than the inner rotator shaft second end (3214). Preferably the first sweeper arm will be connected to the portion of the inner rotator shaft first end which extends past the outer rotator shaft first end. The connection between the inner rotator shaft and the first sweeper arm may be a removable connection such as a clamp, a screw, a pin, or a nut and bolt; or it may be a permanent connection such as a weld, or manufacturing the inner rotator shaft and the first sweeper arm from one unitary piece of material.

The second sweeper arm (3240) may be connected to the outer rotator shaft (3220) at an outer rotator shaft location proximate to the outer rotator shaft first end (3222). By proximate to the outer rotator shaft first end, it is meant that the second sweeper arm may connect to the outer rotator shaft along a portion of the outer rotator shaft length dimension closer to the outer rotator shaft first end than the outer rotator shaft second end (3224). The connection between the outer rotator shaft and the second sweeper arm may be a removable connection such as a clamp or a nut and bolt, or it may be a permanent connection such as a weld, or manufacturing the outer rotator shaft and the second sweeper arm from one unitary piece of material.

FIG. 30 also shows the first lock mechanism (3140) of the shaft (3110) of the wheel alignment assembly (3100). The first lock mechanism may comprise at least one first lock mechanism tooth (3142). The one or more first lock mechanism teeth may extend or retract in an axial direction relative to the shaft to "lock" into a second lock mechanism of the inner rotator shaft. The extension or retraction of the first lock mechanism teeth may be achieved by any number of means including, but not limited to, an air cylinder, a spring, or a hydraulic cylinder. In the embodiment shown in FIG. 30, the extension or retraction of the first lock mechanism teeth is achieved by compressing or decompressing a spring which forces the teeth to extend or retract. The first lock mechanism may be located proximate to the shaft second end (3114).

The inner rotator shaft may comprise a second lock mechanism (3216) connected to the inner rotator shaft first end (3212) as shown in FIG. 30. The connection between the second lock mechanism and the inner rotator shaft may be a removable connection such as a clamp or a nut and bolt, or it may be a permanent connection such as a weld, or manufacturing the second lock mechanism and the inner rotator shaft from one unitary piece of material. In one embodiment, the second lock mechanism may be a radial groove (3218) within the inside diameter of the inner rotator shaft. When the first lock mechanism teeth extend in an axial direction they may be disposed into the radial groove of the second lock mechanism, thereby securing the wheel and tire assembly.

FIG. 31A to FIG. 31D shows the bead lifter (3300). As shown in the Figures, the bead lifter (3300) comprises a vertical actuator (3310), a vertical cam (3320), a vertical cam guide (3330), a horizontal actuator (3340), a horizontal cam (3350), and a horizontal cam guide (3360).

In the embodiments shown in FIG. 31A to FIG. 31D, the vertical actuator (3310) comprises a vertical piston (3312) disposed within a vertical piston chamber (3314). The vertical piston chamber is disposed around an outer surface of the outer rotator shaft proximate to the outer rotator shaft second end. In this embodiment, the vertical actuator operates pneumatically to move the vertical piston towards or away from the outer rotator shaft second end. While the embodiment shown comprises a pneumatic vertical actuator, one of ordinary skill will recognize that other vertical actuators may be utilized. Examples of such vertical actuators include a hydraulic cylinder and a piston, a gas charged hydraulic cylinder and a piston, a linear actuator, a machine screw linear actuator, a ball and screw linear actuator, and a roller screw linear actuator.

In the embodiment shown in FIG. 31A to FIG. 31D, the vertical cam (3320) comprises a vertical cam first section (3322) mounted parallel to or substantially parallel to the vertical actuator, and a vertical cam second section (3324) extending inwardly from the vertical cam first section towards the outer rotator shaft. The first section may be attached to the vertical actuator, while the second section may be attached to the vertical cam guide (3330). The vertical cam guide may include a vertical cam guide slot (3332) through which the vertical cam second section may be attached to the finger assembly. In some embodiments, the vertical cam second section may be attached to the shoe wing of the finger assembly by passing a vertical cam pin (3334) through the vertical cam guide slot and a corresponding hole in the shoe wing. The vertical cam may be connected to the outer rotator shaft by the vertical cam guide with the vertical cam guide extending between the outer rotator shaft and the vertical cam.

In the embodiment shown in FIG. 31A to FIG. 31D, the horizontal actuator (3340) comprises a horizontal piston (3342) disposed within a horizontal piston chamber (3344) having a horizontal piston chamber first end (3346) and a horizontal piston chamber second end (3348). In this embodiment, the horizontal actuator operates pneumatically to move the horizontal piston between the horizontal piston chamber first end (3346) and the horizontal piston chamber second end (3348). While the embodiment shown comprises a pneumatic horizontal actuator, one of ordinary skill will recognize that other horizontal actuators may be utilized.

Examples of such horizontal actuators include a hydraulic cylinder and a piston, a gas charged hydraulic cylinder and a piston, a linear actuator, a machine screw linear actuator, a ball and screw linear actuator, and a roller screw linear actuator.

The horizontal actuator may be connected at one end to the horizontal cam guide (3360) (the horizontal cam guide being connected to the vertical piston (3312)), and at an opposite end to the finger assembly. The horizontal cam (3350) may comprise a first horizontal cam slot (3352) and a second horizontal cam slot (3356). The first horizontal cam slot may have a first end (3353) and a second end (3354). Similarly, the second horizontal cam slot may have a first end (3357) and a second end (3358). The first horizontal cam slot may be attached to the finger assembly by a first pin (3370). In some embodiments, the horizontal actuator may be attached to the finger assembly by passing the first pin through one end of the horizontal actuator shaft, through the first horizontal cam slot (3352) and then through a corresponding hole in the shoe wing. Similarly, the second horizontal cam slot (3356) may be attached to the finger assembly by a second pin (3380). In some embodiments, the second horizontal cam slot may be attached to the finger assembly by passing the second pin through the second horizontal cam slot and then through a corresponding hole in the shoe wing. The horizontal cam may be attached to the vertical piston by the horizontal cam guide (3360).

Figure 31B:
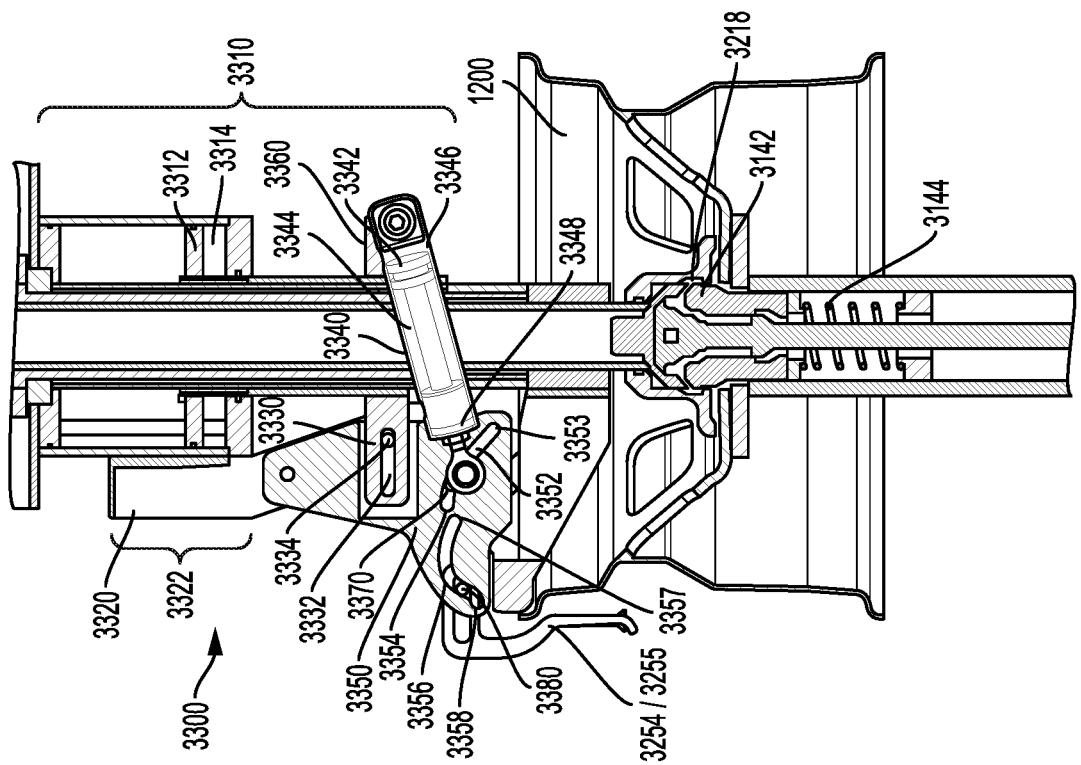
FIG. 31A to FIG. 31D are detailed perspective views of the motion of the bead lifter
Figure 31A:
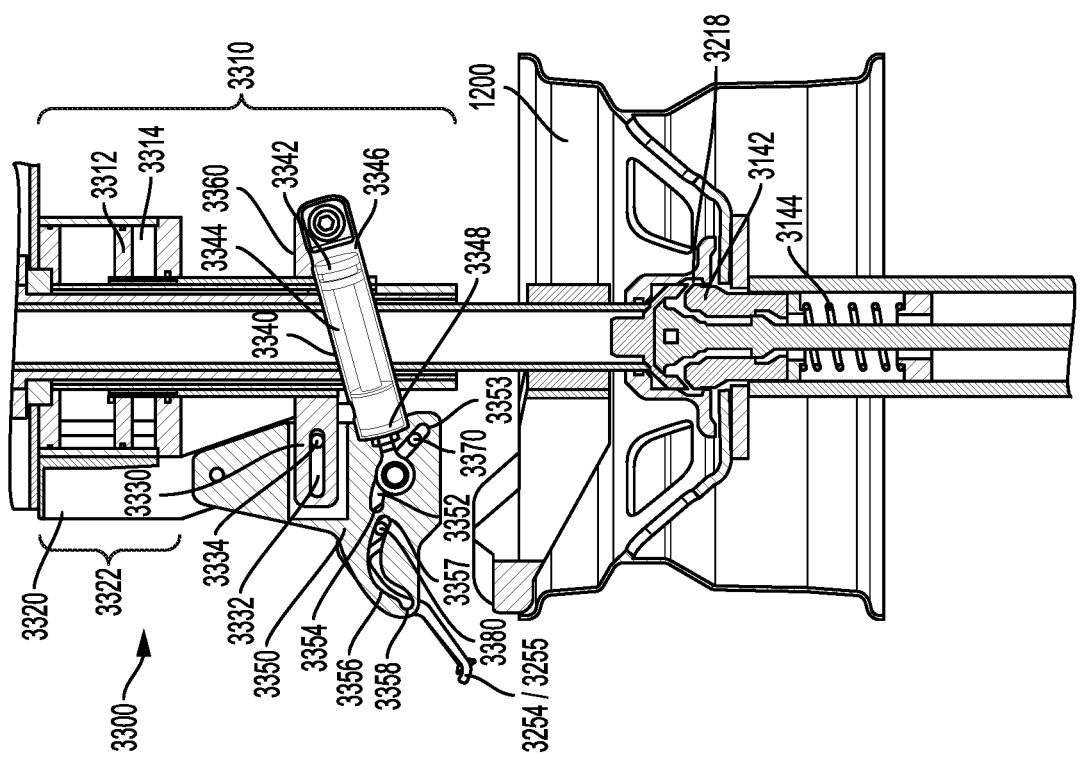
Figure 31D:
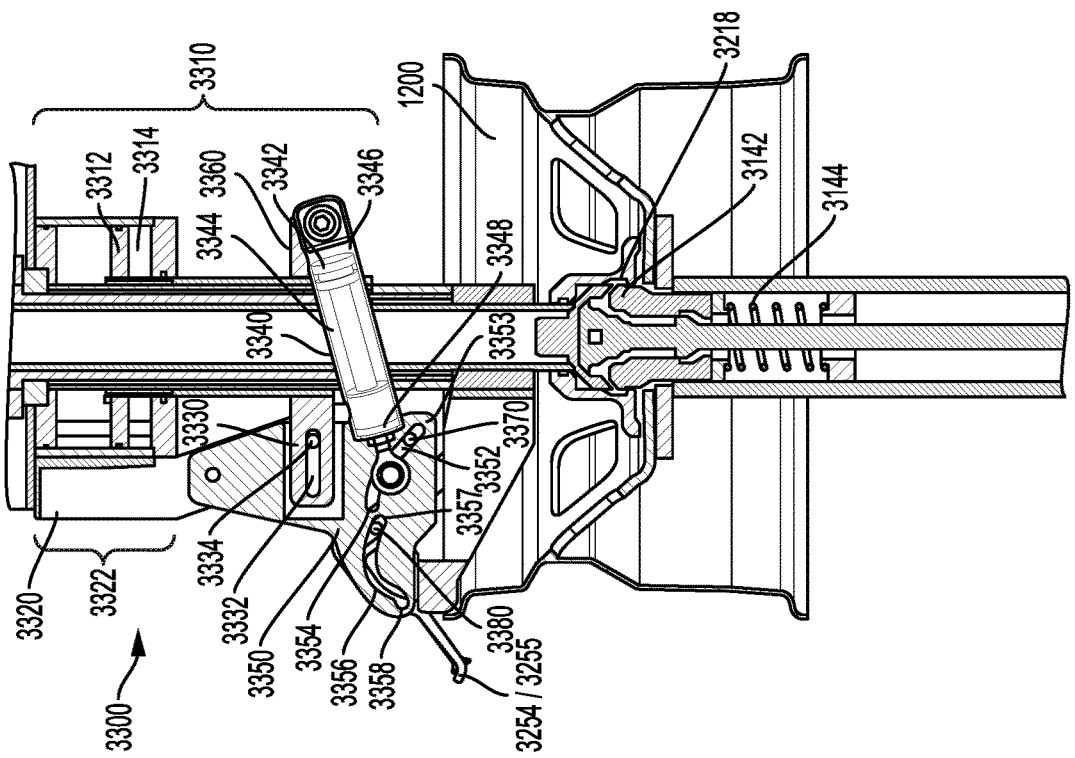
Figure 31C:
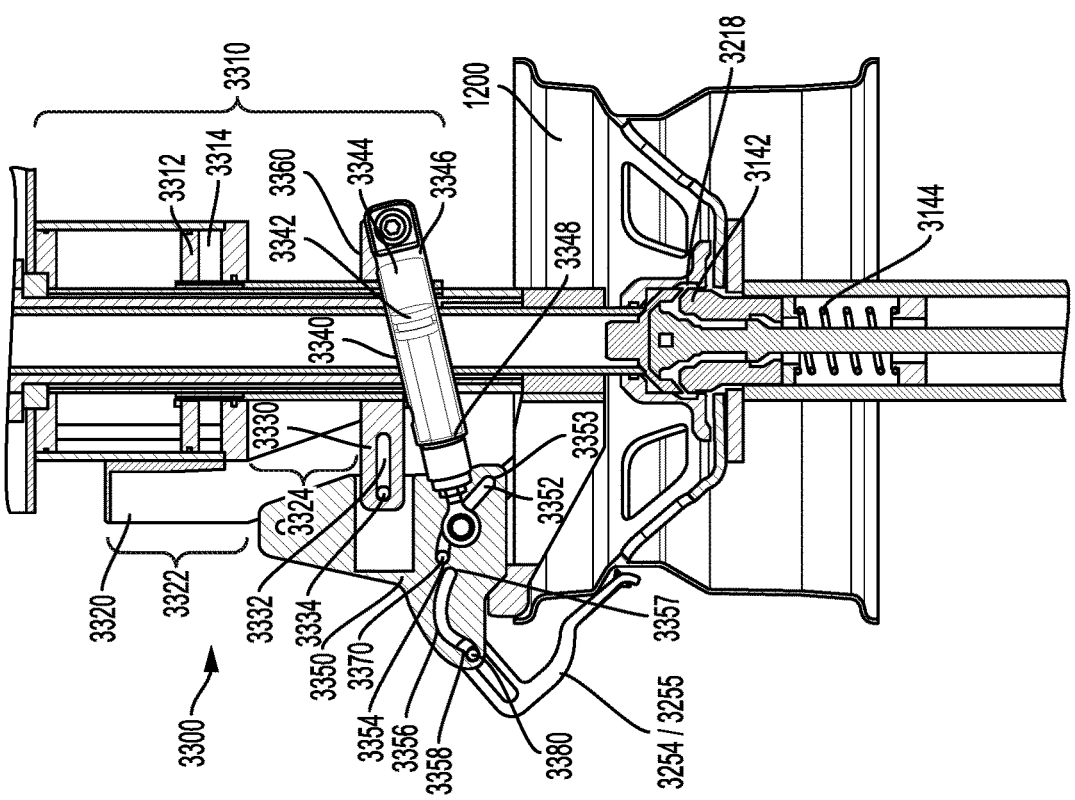

FIG. 31A shows the bead lifter in an up or resting position before being inserted into the tire and wheel assembly. FIG. 31B shows the bead lifter in a partially inserted position to advance the finger assembly partially between the two tire beads into the drop center of the wheel. FIG. 31C shows the bead lifter in a fully inserted position to advance the finger assembly fully between the two tire beads into the drop center of the wheel. FIG. 31D shows the bead lifter in a lifted position to articulate a tire bead above an outer flange of the wheel.

When the bead lifter is in the up or resting position as shown in FIG. 31A, the vertical piston (3312) of the vertical actuator (3310) extends towards the upper portion of the vertical piston chamber (3314). This operates to pull the entire bead lifter (3300) and finger assembly (3250) up and away from the tire and wheel assembly. At this stage, the horizontal actuator (3340) is in a retracted or partially retracted position with the first pin (3370) located at or about the first horizontal cam slot first end (3353) and the second pin (3380) located at or about the second horizontal cam slot second end (3358). At this point the first finger (3254) and the second finger (3255) of the finger assembly (3250) are substantially parallel to or parallel to the tire and wheel assembly. In this context, substantially parallel to means that the first finger and the second finger may be rotated no more than 50°, 35°, 20°, or 5° counterclockwise on an axis perpendicular to the first finger and/or second finger length relative to the bead seat of the wheel.

In the embodiments shown, the bead lifter is advanced from the up or resting position (FIG. 31A) to the partially inserted position (FIG. 31B) by first retracting the vertical piston (3312) of the vertical actuator (3310) towards the lower portion of the vertical piston chamber (3314). This operates to push the entire bead lifter (3300) and finger assembly (3250) down and towards the tire and wheel assembly. At this stage, the horizontal actuator (3340) remains in its retracted or partially retracted position, however, the motion of the vertical piston causes the first pin (3370) to advance away from the first horizontal cam slot first end (3353) and towards the first horizontal cam slot second end (3354). In preferred embodiments, the first pin only advances a portion of the distance from the first horizontal cam slot first end to the first horizontal cam slot second end with the portion selected from the group consisting of at least 50% of the distance, at least 60% of the distance, at least 70% of the distance, and at least 80% of the distance. Simultaneously, the motion of the vertical piston also causes the second pin (3380) to advance away from the second horizontal cam slot first end (3357) and towards the second horizontal cam slot second end (3358). In preferred embodiments, the second pin only advances a portion of the distance from the second horizontal cam slot first end to the second horizontal cam slot second end with the portion selected from the group consisting of at least 50% of the distance, at least 60% of the distance, at least 70% of the distance, and at least 80% of the distance. At this point the first finger (3254) and the second finger (3255) of the finger assembly (3250) are substantially perpendicular to or perpendicular to the tire and wheel assembly. In other words, the first finger and the second finger may be rotated at or about 90° counterclockwise on an axis perpendicular to the first finger and/or second finger length relative to the bead seat of the wheel.

In the embodiment shown, the bead lifter is advanced from the partially inserted position (FIG. 31B) to the fully inserted position (FIG. 31C) by extending the horizontal piston (3342) of the horizontal actuator (3340). This operates to advance the first pin further towards the first horizontal cam slot second end and simultaneously advance the second pin further towards the second horizontal cam slot second end. In preferred embodiments, the first pin advances all the way to the first horizontal cam slot second end and the second pin advances all the way to the second horizontal cam slot second end, however, embodiments may exist where the first pin and/or the second pin only advance at least 85% of the distance towards their respective horizontal cam slot second end, at least 90% of the distance towards their respective horizontal cam slot second end, or at least 95% of the distance towards their respective horizontal cam slot second end. This causes the first finger (3254) and the second finger (3255) of the finger (3250) to rotate counterclockwise on an axis perpendicular to the first finger and/or second finger length past perpendicular or substantially perpendicular relative to the tire and wheel assembly as shown in FIG. 31C. In preferred embodiments, the degree of rotation past perpendicular is between 5° and 25° past perpendicular, between 5° and 20° past perpendicular, between 5° and 15° past perpendicular, or between 5° and 10° past perpendicular. At this point, the first finger and the second finger are considered to have been inserted into the drop center of the wheel in the void encompassed by the wheel assembly and the tire between the first tire bead and the first bead seat In the embodiments shown, the bead lifter is advanced from the fully inserted position (FIG. 31C) to the lifted position (FIG. 31D) by retracting the horizontal piston (3342) of the horizontal actuator (3340) and simultaneously at least partially retracting the vertical piston (3312) of the vertical actuator (3310) towards the upper portion of vertical piston chamber. This operates to advance the first pin (3370) away from the first horizontal cam slot second end (3354) and back towards the first horizontal cam slot first end (3353) while simultaneously advancing the second pin (3380) away from the second horizontal cam slot second end (3358) and back towards the second horizontal cam slot first end (3357). This will cause the first finger (3254) and the second finger (3255) to rotate clockwise on an axis perpendicular to the first finger and/or second finger length back to their original position which is parallel to or substantially parallel to the tire and wheel assembly. In this context, substantially parallel to means that the first finger and the second finger may be rotated no more than 30°, 20°, 10°, or 5° counterclockwise on an axis perpendicular to the first finger and/or second finger length relative to the bead seat of the wheel. During this rotation, the first finger and the second finger will "grab" a portion of the respective tire bead and lift it past the outer edge of the bead seat of the wheel.

While the Figures show the bead lifter comprising a pneumatic vertical actuator, a pneumatic vertical actuator, a vertical cam, a vertical cam guide, a horizontal cam, and a horizontal cam guide (3360), other bead lifters may be used. For instance, the pneumatic vertical actuator may be replaced by a hydraulic vertical actuator, a gear and gear rack, or a ball and screw vertical actuator. Similarly, the pneumatic horizontal actuator may be replaced by a hydraulic horizontal actuator, a gas charged hydraulic horizontal actuator, a gear and gear rack, or a ball and screw horizontal actuator. In some embodiments, the vertical cam and vertical cam guide and/or the horizontal cam and horizontal cam guide (3360) may be replaced by a series of actuators (i.e.—pneumatic actuators, hydraulic actuators, gas charged hydraulic actuators, ball and screw actuators, or the like) which attach to the finger assembly at varying angles in order to apply a series of linear forces to the finger assembly.

After advancing to the lifted position, the first finger is disposed into the first sweeper arm and the second finger is disposed into the second sweeper arm. The first finger and the second finger are then disengaged from the shoe wing by a pair of pin locks (3260A and 3260B shown in FIG. 33A) which engage with a pair of pin holes located in the end of the first finger and the second finger by a spring mechanism as in a door latch. This allows the fingers to disengage from the shoe wing and rotate in opposite directions to advance the tire bead above the bead seat as described herein. After advancing the tire bead above the bead seat, the first sweeper arm and the second sweeper arm return to substantially their original lifted position where they are re-engaged to the shoe wing by releasing the pair of pin locks from the pair of pin holes. The process is then repeated for additional tire bead(s) until the entire tire has been removed above the wheel bead seat.

Figure 32:
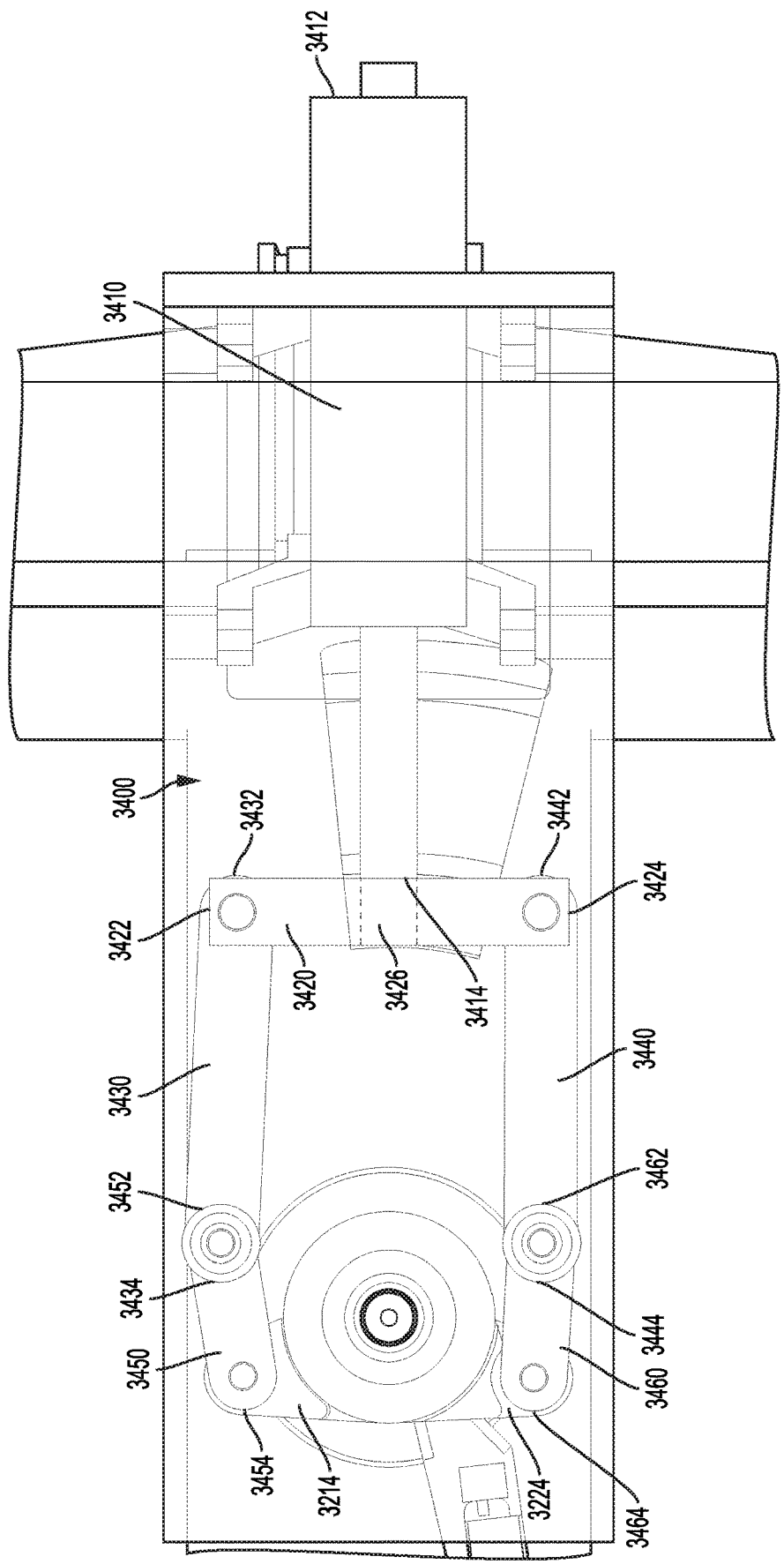
FIG. 32 is a top view of an embodiment of a rotation assembly disclosed herein.

FIG. 32 shows a close up top view of one embodiment of the rotation assembly (400). The embodiment of the rotation assembly shown in FIG. 32 comprises a second linear force applicator (3410), a yoke (3420), a first draw bar (3430), a second draw bar (3440), a first link (3450), and a second link (3460).

The second linear force applicator (3410) will have a second linear force applicator first end (3412) and a second linear force applicator second end (3414). The yoke will have a yoke first end (3422), a yoke second end (3424) located opposite the yoke first end, and a yoke attachment point (3426) located between the yoke first end and the yoke second end. The first draw bar will have a first draw bar first end (3432) and a first draw bar second end (3434) opposite the first draw bar first end. Similarly, the second draw bar will have a second draw bar first end (3442) and a second draw bar second end (3444) opposite the second draw bar first end. The first link will have a first link first end (3452) and a first link second end (3454) opposite the first link first end. Similarly, the second link will have a second link first end (3462) and a second link second end (3464) opposite the second link first end.

In the rotation assembly embodiment shown in FIG. 32, the second linear force applicator second end (3414) may be attached to the yoke attachment point (3426). The yoke first end (3422) may be pivotably connected to the first draw bar first end (3432). The yoke second end (3424) may be pivotably connected to the second draw bar first end (3442). The first draw bar second end (3434) may be pivotably connected to the first link first end (3452). The second draw bar second end (3444) may be pivotably connected to the second link first end (3462). The first link second end (3454) may be pivotably connected to the inner rotator shaft (3210) at a location proximate to the inner rotator shaft second end (3214). Similarly, the second link second end (3464) may be pivotably connected to the outer rotator shaft (3220) at a location proximate to the outer rotator shaft second end (3224).

The pivotable connections between the various components of the rotation assembly can be accomplished in several manners. In some embodiments, the pivotable connection will comprise a bearing through which a bolt connecting one component to the other may pass. Examples of exemplary bearings include a spherical bearing, a needle bearing, a roller bearing, a ball bearing, or a bushing.

The second linear force applicator may be selected from the group consisting of a hydraulic cylinder, a gas charged hydraulic cylinder, a pneumatic cylinder, a linear actuator, a machine screw linear actuator, a ball and screw linear actuator, and a roller screw linear actuator. While FIG. 32 shows a preferred embodiment of a rotation assembly, other rotation assemblies are possible. Preferably, the rotation assembly is capable of applying a first rotational force in a first rotational direction to the inner rotator shaft and is also capable of applying a second rotational force in a second rotational direction to the outer rotator shaft. Preferably, the first rotational direction is opposite the second rotational direction. The first rotational force and the second rotational force may be applied simultaneously. By simultaneously, it is meant that during at least one period of time, the first rotational force is being applied to the inner rotator shaft while the second rotational force is also being applied to the outer rotator shaft. It is not required—but is preferred—that the first rotational force begins and ends at the same or approximately the same time as the second rotational force. In some instances, the first rotational force and the second rotational force may be applied sequentially. For instance, the first rotational force may be applied before the second rotational force is applied or vice versa. In some embodiments, the first rotational force and/or the second rotational force may be applied in a series of pulses.

During operation, the second linear force applicator (3410) will apply an initial force against the yoke (3420) at the yoke attachment point (3426) which advances the yoke towards the tire dismount assembly (3200). The yoke then transfers a portion of said force to the first draw bar first end (3432) while simultaneously transferring a portion of the force to the second draw bar first end (3442). This then transfers a portion of the force to the first draw bar second end (3434) while simultaneously transferring a portion of the force to the second draw bar second end (3444). Next, a portion of the force is transferred to the first link first end (3452) while simultaneously a portion of the force is transferred to the second link first end (3462). This then transfers a portion of the force to the first link second end (3454) while simultaneously transferring a portion of the force to the second link second end (3464). Finally, a portion of the force is transferred to the inner rotator shaft (3210) causing the inner rotator shaft to advance the first sweeper arm in a first rotational direction while simultaneously a portion of the force is transferred to the outer rotator shaft (3220) causing the outer rotator shaft to advance the second sweeper arm in a second rotational direction opposite that of the first rotational direction.

In one alternative embodiment (not shown), the rotation assembly may comprise a first electric motor and a second electric motor. The first electric motor may be connected to a first gear which may be connected to a first rotation device. Similarly, the second electric motor may be connected to a second gear which may be connected to a second rotation device. The first rotation device and the second rotation device may each independently be selected from the group consisting of a gear rack, a fiber strap, and a chain. In such an embodiment, the inner rotator shaft second end may comprise an inner rotator shaft gear with the inner rotator shaft gear connected to the first rotation device. Similarly, in such an embodiment, the outer rotator shaft second end may comprise an outer rotator shaft gear with the outer rotator shaft gear connected to the second rotation device.

FIG. 33A and FIG. 33B show a close up views of the finger assembly (3250). As shown in FIG. 33A, the finger assembly may comprise a shoe wing (3251) connected to a bead lifter (3300), a first finger (3254), and a second finger (3255). The shoe wing may comprise a first wing (3252) and a second wing (3253) located opposite of the first wing as shown in FIG. 33B. The first finger may comprise a first void which allows the first finger to slide onto and off of the first wing thereby making the first finger removably connected to the first wing. Similarly, the second finger may comprise a second void which allows the second finger to slide onto and off of the second wing thereby making the second finger removably connected to the second wing.

FIG. 33A and FIG. 33B also show the horizontal cam. As shown in FIG. 33A, the horizontal cam may be disposed within a slot in the shoe wing (3251) with the shoe wing connected to the horizontal cam by the first pin (3370) which passes through the first horizontal cam slot (3352) and a corresponding first shoe wing hole, and by the second pin (3380) which passes through the second horizontal cam slot (3356). While the bead lifter is in the process of lifting the tire bead above the bead seat, the horizontal cam assists in guiding the finger assembly along the path to allow the fingers to lift the tire bead above the bead seat as shown in FIG. 31A to 31D. At this point, the first finger (3254) and the second finger (3255) remain connected to the shoe wing via the respective first wing (3252) and second wing (3253) as shown in FIG. 33A. Once the finger assembly has lifted the tire bead above the bead seat, the fingers are deposited into their respective sweeper arms which are rotated in opposite directions by the rotation assembly while the shoe wing remains connected to the horizontal cam as shown in FIG. 33B.

FIG. 33A also shows the first sweeper arm (3230) and the second sweeper arm (3240) connected to the inner and outer rotator shafts in an offset position relative to one another. In the embodiment of FIG. 33A, the second sweeper arm is connected to the outer rotator shaft proximate to the outer rotator shaft first end. In this embodiment, the first sweeper arm is connected to the portion of the inner rotator shaft which extends past the outer rotator shaft first end. Accordingly, in some embodiments, one or both of the first sweeper arm and the second sweeper arm will include an extension portion extending from the sweeper arm to the corresponding rotator shaft. The configuration of the extension portions is preferably such that the first sweeper arm and the second sweeper arm may move the fingers in the same plane during rotation.

Comparing FIG. 33A to FIG. 33B one can see how the first finger (3254) and the second finger (3255) move when the inner rotator shaft and the outer rotator shaft are rotated by the rotation assembly. First, the first finger and the second finger are deposited into the respective sweeper arm after having lifted a portion of a tire bead above a flange of the wheel. The first finger may lock into the first sweeper arm by advancing the first pin lock (3260A) into the first pin hole as in a door lock. Similarly, the second finger may lock into the second sweeper arm by advancing the second pin lock (3260B) into the second pin hole as in a door lock. Then, as the rotation assembly rotates the inner and outer rotator shafts in opposite directions, the sweeper arms advance the fingers in opposite direction, forcing additional portions of said tire bead above the flange of the wheel until the entire bead has been removed from the wheel assembly.

FIG. 34A to FIG. 34E and FIG. 35A to FIG. 35D show cross sectional views of the apparatus in use removing a tire (1100) from a wheel assembly (1200). As shown in FIG. 34A to FIG. 34D, the apparatus may further comprise a first bead positioner (3600). The first bead positioner operates to compress at least a portion of a first bead of the tire (1100) into a void between the two flanges of the wheel—also known as the "drop center" of the wheel. This may be accomplished by a stationary bead positioner, which is shown in the Figure, that advances the first bead into the drop center as the first linear force applicator advances the wheel and tire assembly towards the tire dismount assembly, or by a movable bead positioner, which is not shown in the Figure activated by a third linear force applicator which advances the first bead into the drop center independent of the movement of the wheel alignment assembly and/or the tire dismount assembly. When used, the third linear force applicator may be selected from the group consisting of a hydraulic cylinder, a gas charged hydraulic cylinder, a pneumatic cylinder, a linear actuator, a machine screw linear actuator, a ball and screw linear actuator and a roller screw linear actuator. The first bead positioner may be a piece of solid material which attaches to the frame at one end while the opposite end may contact the top side of the tire.

To remove a tire (1100) from a wheel assembly (1200), first the first bead positioner (3600) advances the top bead of the tire into the drop center of the wheel (see FIG. 34B). Next, the first finger (3254) and the second finger (3255) are inserted between the top bead and the top bead seat inside a void encompassed by the wheel assembly, the top bead, and the bottom bead (see FIG. 34C). Next the first finger and the second finger are articulated to pull a portion of at least the top bead past a plane defined by the outer edge of the top bead seat (see FIG. 34D). Finally, the first finger is moved in a first rotational direction away from the second finger without crossing the plane defined by the outer edge of the top bead seat (see FIG. 34E). In some embodiments, the second finger may also be moved in a second rotational direction opposite that of the first rotational direction, also without crossing the plane defined by the outer edge of the top bead seat (see FIG. 34E). The rotation of the first finger (and optionally the second finger) will pull the entirety of the top bead past the plane defined by the outer edge of the top bead seat.

As shown in FIG. 35A to FIG. 35D, the apparatus may further comprise a second bead positioner (3700). The second bead positioner operates to advance the second bead of the tire (1100) on the other side of the wheel into the void between the two flanges of the wheel—also known as the "drop center" of the wheel. This may be accomplished by a stationary bead positioner that advances the second bead into the drop center as the first linear force applicator advances the wheel away from the tire dismount assembly, or by a movable bead positioner activated by a fourth linear force applicator which advances the second bead into the drop center independent of the movement of the wheel alignment assembly and/or the tire dismount assembly. When used, the fourth linear force applicator may be selected from the group consisting of a hydraulic cylinder, a gas charged hydraulic cylinder, a pneumatic cylinder, a linear actuator, a machine screw linear actuator, a ball and screw linear actuator and a roller screw linear actuator. In a preferred embodiment, the second bead positioner may comprise at least two rods which attached to the frame at one end while the opposite end may contact the bottom side of the tire. In some embodiments, the first bead positioner (3600) may further assist in positioning the second bead into the drop center of the wheel.

After pulling the entirety of the top bead past the top bead seat, the apparatus may pull the entirety of the bottom bead past the top bead seat as shown in FIG. 35A to FIG. 35D. First, the second bead positioner (3700) advances the bottom bead of the tire into the drop center of the wheel (see FIG. 35B). Next, the first finger (3254) and the second finger (3255) are inserted between the top bead seat and the bottom bead (see FIG. 35B). Then the first finger and the second finger are articulated to pull a portion of the bottom bead past the plane defined by the outer edge of the top bead seat (see FIG. 35C). Finally, the first finger is moved in a first rotational direction away from the second finger without crossing the plane defined by the outer edge of the top bead seat (see FIG. 35D). In some embodiments, the second finger may also be moved in a second rotational direction opposite that of the first rotational direction, also without crossing the plane defined by the outer edge of the top bead seat (see FIG. 35D). The rotation of the first finger (and optionally the second finger) will pull the entirety of the bottom bead past the plane defined by the outer edge of the top bead seat, at which point the tire will be entirely removed from the wheel.

Figure 36:
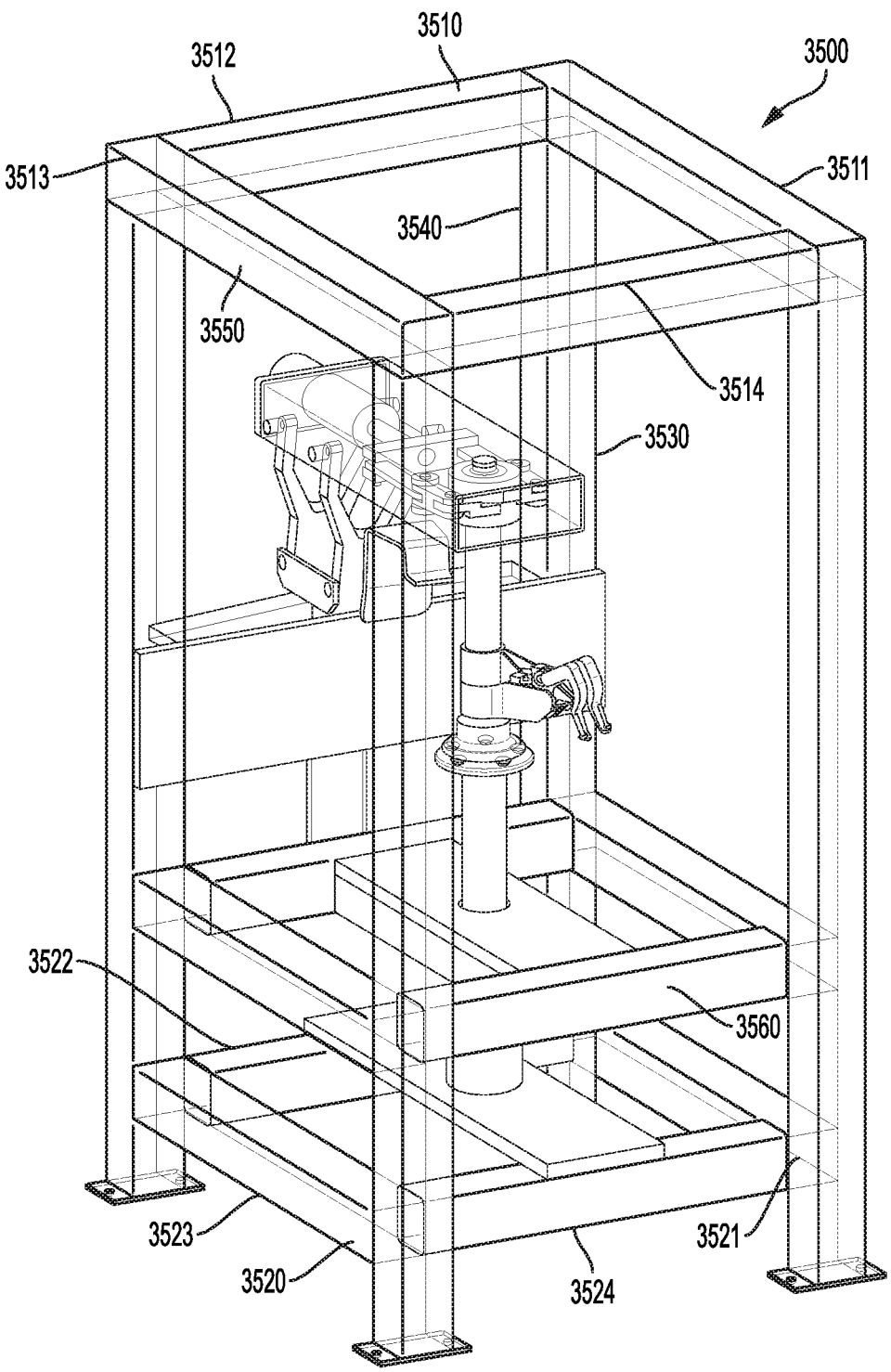
FIG. 36 is a perspective view of the apparatus mounted in a frame as disclosed herein.

As shown in FIG. 36, the apparatus may also comprise a frame (3500). The frame can take many forms. In the embodiments shown in FIG. 36, the frame comprises a top (3510), and a bottom (3520) opposite of and substantially parallel to or parallel the top. The frame depicted in the Figures also comprises a first side (3530) attached to and spanning a first distance between a first edge of the top (3511) and a first edge of the bottom (3521). The frame depicted in the Figures further comprises a second side (3540) attached to and spanning a second distance between a second edge of the top (3512) and a second edge of the bottom (3522). As depicted in the Figures, the frame may also comprise a third side (3550) attached to and spanning a third distance between a third edge of the top (3513) and a third edge of the bottom (3523). As also depicted in the Figures, the frame may further comprise a fourth side (3560) attached to and spanning a fourth distance between a fourth edge of the top (3514) and a fourth edge of the bottom (3524). One of ordinary skill will recognize that the attachment between any of the sides and the top and/or bottom may be a removable attachment such as by one or more fasteners—i.e. nuts and bolts, clamps, screws; or the attachment may be a permanent attachment such as by welding or manufacturing as an integral piece of material. The various sides, top, and bottom are preferably fabricated of a rigid structural material such as steel, iron, aluminum, titanium, or the like.

The top (3510) and bottom (3520) of the frame (3500) may have a variety of shapes selected from the group consisting of polygons, circles, and ovals. Polygon shapes may be selected from the group consisting of triangles, squares, rectangles, heptagons, hexagons, and octagons. The shape of the polygon may determine the number of sides of the frame. For instances, if the top and bottom have a triangle shape, then the frame may only have three sides (a first side, a second side, and a third side). If the top and bottom are shaped as a circle or an oval then the frame may include one continuous wall that extends around the entire perimeter of the circle or oval; or the frame may include a number of walls (such as a first wall, a second wall, a third wall, and a fourth wall) with each wall extending around a separate portion of the perimeter of the circle or oval.

The preferred frame (3500) will have a square or rectangular top and a square or rectangular bottom. In such an embodiment, the shaft first end (3112) may be connected to the frame at or near a first location corresponding to one of the top, the bottom, the first side (3530), the second side (3540), the third side (3550), or the fourth side (3560). As shown in the Figures, the shaft first end is connected to the frame at a first location at the bottom of the frame. Similarly, the rotation assembly (3400) may be connected to the frame at or near a second location corresponding to one of the top, the bottom, the first side, the second side, the third side, or the fourth side. As shown in the Figures, the rotation assembly is connected to the frame at a second location near the top of the frame. Preferably, the first location at which the shaft first end is connected to the frame opposes the second location at which the rotation assembly is connected to the frame. For instance, if the shaft first end were connected to the frame at or near the first side, then the rotation assembly would preferably be connected to the frame at or near the third side.

One of ordinary skill will recognize that any or all of the top (3510), the bottom (3520), the first side (3530), the second side (3540), the third side (3550), and/or the fourth side (3560) may be enclosed or unenclosed. By enclosed it is meant that the applicable side, top, and/or bottom is fully covered from edge to edge by a material. This may be accomplished by manufacturing the applicable side, top, and/or bottom of one integral piece of rigid structural material such as iron, steel, aluminum, titanium, or the like. Alternatively, this may be accomplished by manufacturing the edges of the applicable side, top, and/or bottom of a rigid structural material, and then overlaying or inlaying a piece of material such as sheet metal, sheet aluminum, plastic, or glass on top of or inside of the edges. By unenclosed it is meant that the applicable side, top, and/or bottom is not fully covered from edge to edge by a material as shown in FIG. 36. This may be accomplished by manufacturing the edges of the applicable side, top, and/or bottom of a rigid structural material without overlaying or inlaying a piece of material on top of or inside of the edges.

One of ordinary skill will recognize that the apparatus may not comprise a frame, but instead may be mounted to a single-post as in a drill press.

One advantage of the method and apparatus for removing a tire from a wheel is that it may remove a tire from a wheel more quickly than prior art methods and apparatus for removing a tire from a wheel. The time which it takes to remove the tire from the wheel may be controlled, at least in part, by controlling the speed and positioning of the various actuators of the apparatus. In this regard, each actuator may comprise a speed control.

What is claimed is:

1. An apparatus (3010) for removing a tire (1100) from a wheel assembly (1200) comprising:
   a wheel alignment assembly (3100) comprising a shaft (3110), a base pad (3120) comprising a hub (3130), and a first lock mechanism (3140), said shaft having a shaft first end (3112) and a shaft second end (3114) opposite the shaft first end wherein said base pad is connected to the shaft at a shaft location proximate to the shaft second end, and said first lock mechanism is located at the shaft second end;
   a tire dismount assembly (3200) comprising an inner rotator shaft (3210) having an inner rotator shaft first end (3212) and an inner rotator shaft second end (3214), an outer rotator shaft (3220) having an outer rotator shaft first end (3222) and an outer rotator shaft second end (3224), a first sweeper arm (3230) connected to the inner rotator shaft at an inner rotator shaft location proximate to the inner rotator shaft first end, a second sweeper arm (3240) connected to the outer rotator shaft at an outer rotator shaft location proximate to the outer rotator shaft first end, a finger assembly (3250) connected to a bead lifter (3300) said finger assembly comprising a shoe wing (3251) said shoe wing comprising a first wing (3252) and a second wing (3253) said finger assembly further comprising a first finger (3254) removably connected to the first wing, a second finger (3255) removably connected to the second wing, wherein said bead lifter is capable of applying a series of linear forces to the finger assembly;
   a rotation assembly (3400) wherein said rotation assembly is capable of applying a first rotational force in a first rotational direction to the inner rotator shaft and said rotation assembly is capable of applying a second rotational force in a second rotational direction to the outer rotator shaft wherein the first rotational direction is opposite the second rotational direction; and
wherein the inner rotator shaft comprises a second lock mechanism (3216) located at the inner rotator shaft first end, said second lock mechanism configured to interact with the first lock mechanism.

2. The apparatus of claim 1, wherein the bead lifter comprises:
   a vertical actuator (3310) comprising a vertical piston (3312) disposed within a vertical piston chamber (3314),
   a vertical cam (3320) comprising a vertical cam first section (3322) connected parallel to or substantially parallel to the vertical actuator and a vertical cam second section (3324) extending inwardly from the vertical cam first section towards the outer rotator shaft,
   a vertical cam guide (3330) comprising a vertical cam guide slot (3332) said vertical cam guide connected to and spanning a distance between the vertical piston and the vertical cam second section,
   a horizontal actuator (3340) comprising a horizontal piston (3342) disposed within a horizontal piston chamber (3344) having a horizontal piston chamber first end (3346) and a horizontal piston chamber second end (3348),
   a horizontal cam (3350) comprising a first horizontal cam slot (3352) having a first horizontal cam slot first end (3353) and a first horizontal cam slot second end (3354), and a second horizontal cam slot (3356) having a second horizontal cam slot first end (3357) and a second horizontal cam slot second end (3358), and
   a horizontal cam guide (3360) connected to the vertical piston and the horizontal actuator,
wherein the horizontal cam is attached to the finger assembly by a first pin (3370) passing through the first horizontal cam slot and a second pin (3380) passing through the second horizontal cam slot.

3. The apparatus of claim 2, wherein the vertical actuator is a type of actuator selected from the group consisting of a pneumatic actuator, a hydraulic actuator, a gas charged hydraulic actuator, a linear actuator, a machine screw linear actuator, a ball and screw linear actuator, and a roller screw linear actuator.

4. The apparatus of claim 2, wherein the horizontal actuator is a type of actuator selected from the group consisting of a pneumatic actuator, a hydraulic actuator, a gas charged hydraulic actuator, a linear actuator, a machine screw linear actuator, a ball and screw linear actuator, and a roller screw linear actuator.

5. The apparatus of claim 2, wherein the rotation assembly comprises:
   a second linear force applicator (3410) having a second linear force applicator first end (3412) and a second linear force applicator second end (3414);
   a yoke (3420) having a yoke first end (3422), a yoke second end (3424), and a yoke attachment point (3426) located between the yoke first end and the yoke second end;
   a first draw bar (3430) having a first draw bar first end (3432) and a first draw bar second end (3434);
   a second draw bar (3440) having a second draw bar first end (3442) and a second draw bar second end (3444);
   a first link (3450) having a first link first end (3452) and a first link second end (3454); and
   a second link (3460) having a second link first end (3462) and a second link second end (3464); and
wherein the second linear force applicator second end is connected to the yoke attachment point, the yoke first end is pivotably connected to the first draw bar first end, the yoke second end is pivotably connected to the second draw bar first end, the first draw bar first end is pivotably connected to the first link first end, the second draw bar first end is pivotably connected to the second link first end, the first link second end is pivotably connected to the inner rotator shaft second end, and the second link second end is pivotably connected to the outer rotator shaft second end.

6. The apparatus of claim 5, further comprising a frame (3500) comprising a top (3510), a bottom (3520) opposite of and substantially parallel to the top, a first side (3530) attached to and spanning a first distance between a first edge of the top (3511) and a first edge of the bottom (3521), a second side (3540) substantially perpendicular to the first side and attached to and spanning a second distance between a second edge of the top (3512) and a second edge of the bottom (3522), a third side (3550) substantially perpendicular to the second side and attached to and spanning a third distance between a third edge of the top (3513) and a third edge of the bottom (3523), and a fourth side (3560) substantially perpendicular to the third side and attached to and spanning a fourth distance between a fourth edge of the top (3514) and a fourth edge of the bottom (3524); wherein the shaft first end is connected to the frame at or near a first location corresponding to one of the top, the bottom, the first side, the second side, the third side, or the fourth side; and the rotation assembly is connected to the frame at or near a second location corresponding to one of the top, the bottom, the first side, the second side, the third side, or the fourth side with a limitation that the first location opposes the second location.

7. The apparatus of claim 2, wherein the rotation assembly comprises
a first electric motor connected to a first gear which is connected to a first rotation device selected from the group consisting of a gear rack, a fiber strap, and a chain; and
a second electric motor connected to a second gear which is connected to a second rotation device selected from the group consisting of a gear rack, a fiber strap, and a chain; and
wherein the inner rotator shaft second end comprises an inner rotator shaft gear connected to the first rotation device, and the outer rotator shaft second end comprises an outer rotator shaft gear connected to the second rotation device.

8. The apparatus of claim 7, further comprising a frame (3500) comprising a top (3510), a bottom (3520) opposite of and substantially parallel to the top, a first side (3530) attached to and spanning a first distance between a first edge of the top (3511) and a first edge of the bottom (3521), a second side (3540) substantially perpendicular to the first side and attached to and spanning a second distance between a second edge of the top (3512) and a second edge of the bottom (3522), a third side (3550) substantially perpendicular to the second side and attached to and spanning a third distance between a third edge of the top (3513) and a third edge of the bottom (3523), and a fourth side (3560) substantially perpendicular to the third side and attached to and spanning a fourth distance between a fourth edge of the top (3514) and a fourth edge of the bottom (3524); wherein the shaft first end is connected to the frame at or near a first location corresponding to one of the top, the bottom, the first side, the second side, the third side, or the fourth side; and the rotation assembly is connected to the frame at or near a second location corresponding to one of the top, the bottom, the first side, the second side, the third side, or the fourth side with a limitation that the first location opposes the second location.

9. The apparatus of claim 1, further comprising a frame (3500) comprising a top (3510), a bottom (3520) opposite of and substantially parallel to the top, a first side (3530) attached to and spanning a first distance between a first edge of the top (3511) and a first edge of the bottom (3521), a second side (3540) substantially perpendicular to the first side and attached to and spanning a second distance between a second edge of the top (3512) and a second edge of the bottom (3522), a third side (3550) substantially perpendicular to the second side and attached to and spanning a third distance between a third edge of the top (3513) and a third edge of the bottom (3523), and a fourth side (3560) substantially perpendicular to the third side and attached to and spanning a fourth distance between a fourth edge of the top (3514) and a fourth edge of the bottom (3524); wherein the shaft first end is connected to the frame at or near a first location corresponding to one of the top, the bottom, the first side, the second side, the third side, or the fourth side; and the rotation assembly is connected to the frame at or near a second location corresponding to one of the top, the bottom, the first side, the second side, the third side, or the fourth side with a limitation that the first location opposes the second location.

10. The apparatus of claim 1, further comprising a first bead positioner (3600).

11. The apparatus of claim 10, further comprising a second bead positioner (3700).

12. The apparatus of claim 1, wherein the shaft comprises a first linear force applicator (3116) located at the shaft first end.

13. The apparatus of claim 12, wherein the first linear force applicator is selected from the group consisting of a hydraulic cylinder, a gas charged hydraulic cylinder, a pneumatic cylinder, a linear actuator, a machine screw linear actuator, a ball and screw linear actuator and a roller screw linear actuator.

14. The apparatus of claim 1, wherein the first lock mechanism comprises at least one first lock mechanism tooth (3142), the second lock mechanism comprises a radial groove within an inside diameter of the inner rotator shaft, and each first lock mechanism tooth is configured to interact with the radial groove.

15. The apparatus of claim 1, wherein the rotation assembly comprises:
a second linear force applicator (3410) having a second linear force applicator first end (3412) and a second linear force applicator second end (3414);
a yoke (3420) having a yoke first end (3422), a yoke second end (3424), and a yoke attachment point (3426) located between the yoke first end and the yoke second end;
a first draw bar (3430) having a first draw bar first end (3432) and a first draw bar second end (3434);
a second draw bar (3440) having a second draw bar first end (3442) and a second draw bar second end (3444);
a first link (3450) having a first link first end (3452) and a first link second end (3454); and
a second link (3460) having a second link first end (3462) and a second link second end (3464); and
wherein the second linear force applicator second end is connected to the yoke attachment point, the yoke first end is pivotably connected to the first draw bar first end, the yoke second end is pivotably connected to the second draw bar first end, the first draw bar first end is pivotably connected to the first link first end, the second draw bar first end is pivotably connected to the second link first end, the first link second end is pivotably connected to the inner rotator shaft second end, and the second link second end is pivotably connected to the outer rotator shaft second end.

16. The apparatus of claim 15, wherein the second linear force applicator is selected from the group consisting of a hydraulic cylinder, a gas charged hydraulic cylinder, a pneumatic cylinder, a linear actuator, a machine screw linear actuator, a ball and screw linear actuator and a roller screw linear actuator.

17. The apparatus of claim 1, wherein the rotation assembly comprises
a first electric motor connected to a first gear which is connected to a first rotation device selected from the group consisting of a gear rack, a fiber strap, and a chain; and
a second electric motor connected to a second gear which is connected to a second rotation device selected from the group consisting of a gear rack, a fiber strap, and a chain; and
wherein the inner rotator shaft second end comprises an inner rotator shaft gear connected to the first rotation device, and the outer rotator shaft second end comprises an outer rotator shaft gear connected to the second rotation device.

* * * * *